United States Patent
Gusmeroli et al.

(10) Patent No.: US 12,454,507 B2
(45) Date of Patent: Oct. 28, 2025

(54) COMPOUNDS HAVING A FUNGICIDAL ACTIVITY, THEIR AGRONOMIC COMPOSITIONS AND USE THEREOF FOR THE CONTROL OF PHYTOPATHOGENIC FUNGI

(71) Applicant: ISAGRO S.p.A., Milan (IT)

(72) Inventors: Marilena Gusmeroli, Monza (IT); Silvia Mormile, Novara (IT); Alexia Elmini, Cigliano (IT); Paolo Boggio, Turin (IT); Paolo Bellandi, Carcare (IT); Matteo Vazzola, Cogliate (IT); Giovanni Venturini, Cassano d'Adda (IT); Riccardo Liguori, Monza (IT); Christian Badaracco, Vittuone (IT)

( * ) Notice: Subject to any disclaimer, the term of this patent is extended or adjusted under 35 U.S.C. 154(b) by 834 days.

(21) Appl. No.: 17/767,752

(22) PCT Filed: Jul. 7, 2020

(86) PCT No.: PCT/IB2020/056385
§ 371 (c)(1),
(2) Date: Apr. 8, 2022

(87) PCT Pub. No.: WO2021/005512
PCT Pub. Date: Jan. 14, 2021

(65) Prior Publication Data
US 2024/0116855 A1    Apr. 11, 2024

(30) Foreign Application Priority Data

Jul. 8, 2019   (IT) ................. 102019000011127

(51) Int. Cl.
| | | |
|---|---|---|
| C07C 233/81 | (2006.01) | |
| A01N 37/20 | (2006.01) | |
| A01P 3/00 | (2006.01) | |
| C07C 237/44 | (2006.01) | |
| C07C 237/46 | (2006.01) | |

(52) U.S. Cl.
CPC ............ *C07C 233/81* (2013.01); *A01N 37/20* (2013.01); *A01P 3/00* (2021.08); *C07C 237/44* (2013.01); *C07C 237/46* (2013.01)

(58) Field of Classification Search
CPC ................ C07C 233/81; C07C 237/44; C07C 237/46; A01N 37/20; A01P 3/00
See application file for complete search history.

(56) References Cited

FOREIGN PATENT DOCUMENTS

| JP | 2002212157 A | * | 7/2002 | |
|---|---|---|---|---|
| WO | 2001/12587 A1 | | 2/2001 | |
| WO | WO-2016109257 A1 | * | 7/2016 | ............... A01G 7/06 |

OTHER PUBLICATIONS

English machine translation of JP 2002-212157 A made Jan. 10, 2025. (Year: 2025).*
Baston, Eckhard: "International Search Report and Written Opinion of the International Searching Authority for International Application No. PCT/IB2020/056385," European Patent Office, Aug. 18, 2020.
Zhao Shizhen et al: "Design, synthesis and evaluation of biphenyl imidazole analogues as potent antifungal agents," Bioorganic & Medicinal Chemistry Letters, Amsterdam, NL, vol. 29, No. 17, Jul. 23, 2019 (Jul. 23, 2019), pp. 2448-2451, XP08578056, ISSN: 0960-894X, DOI: http://dx.doi.org/10.1016/j.bmcl.2019.07.037 [retrieved on Jul. 23, 2019] compounds 12e, 12f, 12m, 12n, 12u, 12v.
Thornton T J; et al: "Quinazoline Antifolate Thymidylate Synthase Inhibitors: Difluoro-Substituted Benzene Ring Analogues," Journal of Medicinal Chemistry, American Chemical Society, US, col. 35, No. 12, Jan. 1, 1992 (Jan. 1, 1192), pp. 2321-2327, XP002179828, ISSN: 0022-2623, DOI: http://dx.doi.org/10.1021/jm00090a024 compound 14.
Barr; N; et al: "Palladium-assisted organic reactions: VIII. Simple syntheses of 2,3-disubstituted phthalimidines," Journal of Organometallic Chemistry, vol. 302, No. 1, 1986, pp. 117-126, XP002798000 compounds 2(e), (f).

* cited by examiner

*Primary Examiner* — Michael B. Pallay
(74) *Attorney, Agent, or Firm* — Florek & Endres PLLC

(57) ABSTRACT

Compounds having general formula (I) with a high fungicidal activity are described, and their use for the control of phytopathogenic fungi of important agricultural crops.

14 Claims, No Drawings

COMPOUNDS HAVING A FUNGICIDAL ACTIVITY, THEIR AGRONOMIC COMPOSITIONS AND USE THEREOF FOR THE CONTROL OF PHYTOPATHOGENIC FUNGI

The present invention relates to amides having a high fungicidal activity; in particular, it relates to suitably substituted compounds having a high fungicidal activity, the relative agronomic compositions and their use for the control of phytopathogenic fungi of important agricultural crops.

Amides with a fungicidal activity have been described in literature and in particular they are described in patent applications WO99/27783, WO01/14339, WO01/12587 and WO01/05769.

The products described in these documents however are often unsatisfactory in terms of effectiveness against various phytopathogenic fungi of interest in important agricultural crops.

The Applicant has now surprisingly found that the combination of specific substituents in these compounds allows the spectrum of action already known previously on similar compounds to be broadened, without showing symptoms of phytotoxicity in the agricultural crops of interest.

The present invention therefore relates to new amides having general formula (I):

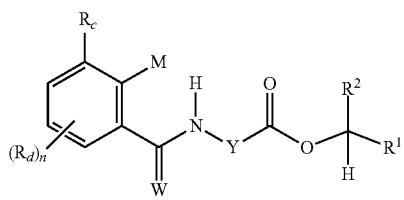

(I)

wherein:
$R_c$ represents a formylamine group, an amine group, a nitro group, a hydrogen atom, a halogen atom selected from fluorine, chlorine, bromine or iodine, a $C_1$-$C_{12}$-alkyl carbonyl group, a benzoyl group, said groups being optionally substituted with one or more $R_d$ groups, the same as or different from each other;
M represents a $W^1$-$R^6$ group or a halogen atom selected from fluorine, chlorine, bromine or iodine;
W and $W^1$, the same as or different from each other, represent an oxygen atom or a sulfur atom;
$R_d$ represents a hydrogen atom, a halogen atom selected from fluorine, chlorine, bromine or iodine, a nitro group, an amino group, a formylamine group, a cyano group, a $C_1$-$C_{18}$ alkyl group, a $C_3$-$C_{18}$ cycloalkyl group, a $C_3$-$C_{18}$ cyclo alkyl-$C_1$-$C_{12}$-alkyl group, $C_1$-$C_{18}$ halo alkyl group, a $C_2$-$C_{18}$ alkenyl group, a $C_2$-$C_{18}$ haloalkenyl group, a $C_3$-$C_{18}$ cycloalkenyl group, a $C_1$-$C_{18}$ alkoxyl group, a $C_1$-$C_{18}$ haloalkoxyl group, a $C_1$-$C_{18}$ alkylsulfonyl group, a $C_1$-$C_{18}$ alkylsulfinyl group, a $C_3$-$C_{18}$ cycloalkoxyl group, an aryl group, a phenoxyl group, a benzyloxy group, an aryl-$C_1$-$C_{18}$-alkyl group, a heterocyclic group, penta- or hexa-atomic, aromatic or non-aromatic, also benzocondensed or heterobicyclic, containing at least one heteroatom selected from oxygen, sulfur, possibly oxidized to sulfoxide or to sulfone, nitrogen, possibly oxidized to N-oxide or a heterocyclyl-$C_1$-$C_{18}$-alkyl group wherein the heterocyclic group is as defined above; a C(=$W^1$)$R^8$ group, a C(=O)O$R^8$ group, a C(=O)N$R^8$ $R^9$ group, a S(=O)$_2$N$R^8R^9$ group, an OC(=O)$R^8$ group, an O(CH$_2$CH$_2$O)$_n$CH$_3$ group;
n represents a number ranging from 0 to 2;
$R^6$ represents a hydrogen atom, a CH$_2$ O$R^7$ group, a CH$_2$ S$R^7$ group, a CO$R^7$ group, a CH$_2$ OCO$R^7$ group;
$R^7$ represents a $C_1$-$C_{18}$ alkyl group, a $C_3$-$C_{18}$ cycloalkyl group, a $C_1$-$C_{18}$ haloalkyl group, a $C_1$-$C_{18}$ alkoxyl group, an aryl group, a benzyl group, said groups being optionally substituted with one or more $R_d$ groups the same as or different from each other;
$R^8$ and $R^9$, the same as or different from each other, represent a hydrogen atom, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_3$-$C_{18}$ halocycloalkyl group, an aryl group, an aryl-$C_1$-$C_{18}$-alkyl group, each of said groups $R^8$ and $R^9$ can be possibly substituted by 0, 1 or multiples of $R_d$;
Y represents one of the following $Y^1$ or $Y^2$ groups

wherein:
$R_a$ and $R_b$, the same as or different from each other, represent a hydrogen atom, a $C_1$-$C_{18}$ alkyl group, a $C_1$-$C_{18}$ haloalkyl group, a $C_3$-$C_{18}$ cycloalkyl group, an aryl group, an aryl-$C_1$-$C_{18}$-alkyl group, a heterocyclic group, penta- or hexa-atomic, aromatic or non-aromatic, containing at least one heteroatom selected from oxygen, sulfur, possibly oxidized to sulfoxide or to sulfone, nitrogen, possibly oxidized to N-oxide, a heterocyclyl-$C_1$-$C_{18}$-alkyl group wherein the heterocyclic group is as defined above; said groups being optionally substituted with one or more $R_d$ groups, the same as or different from each other;
or $R_a$ and $R_b$ together with the carbon atom to which they are bound form a $C_3$-$C_{18}$ cycloalkyl ring;
$R_e$ and $R_f$, the same as or different from each other, represent a hydrogen atom, a $C_1$-$C_{18}$ alkyl group, a $C_1$-$C_{18}$ haloalkyl group, said groups being optionally substituted with one or more $R_d$ groups the same as or different from each other;
$R^1$ represents a hydrogen atom, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_2$-$C_{18}$ alkynyl group, a $C_3$-$C_{18}$ cycloalkyl group, a $C_3$-$C_{18}$ cycloalkenyl group, a $C_3$-$C_{18}$ cycloalkyl-$C_1$-$C_{18}$-alkyl group, an aryl group, an aryl-$C_1$-$C_{18}$-alkyl group, a heterocyclic group, penta- or hexa-atomatic, aromatic or non-aromatic, also benzocondensed or heterobicyclic, containing at least one heteroatom selected from oxygen, sulfur, possibly oxidized to sulfoxide or sulfone, nitrogen, possibly oxidized to N-oxide or a heterocyclyl-$C_1$-$C_{18}$-alkyl group wherein the heterocyclic group is as defined above; said groups being optionally substituted with one or more $R_d$ groups, the same as or different from each other;

$R^2$ represents a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_3$-$C_{18}$ cycloalkenyl group, a $C_3$-$C_{18}$ cycloalkyl -$C_1$-$C_{18}$-alkyl group, an aryl group, an aryl-$C_1$-$C_{18}$-alkyl group, a heterocyclic group, penta- or hexa-atomatic, aromatic or non-aromatic, also benzocondensed or heterobicyclic, containing at least one heteroatom selected from oxygen, sulfur, possibly oxidized to sulfoxide or to sulfone, nitrogen, possibly oxidized to N-oxide or a heterocyclyl-$C_1$-$C_{18}$-alkyl group wherein the heterocyclic group is as defined above, a $COOR^2$ group, a $CONHR^2$ group, a $CONR^1$ $R^2$ group; said groups being optionally substituted with one or more $R_d$ groups, the same as or different from each other, or $R^2$ represents the following T group:

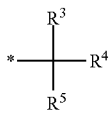

wherein:

$R^3$, $R^5$, the same as or different from each other, represent a $C_1$-$C_{18}$ alkyl group, a $C_1$-$C_{18}$ haloalkyl group, a $C_1$-$C_{18}$ alkoxyl group, a $C_2$-$C_{18}$ alkenyl group, a $C_2$-$C_{18}$ haloalkenyl group, a $C_3$-$C_{18}$ cycloalkyl group, a $C_3$-$C_{18}$ cycloalkoxyl group, an $NHR^1$ group, an $NR^{1\,2}$ group, an aryl group, a phenoxyl group, an aryl-$C_1$-$C_{18}$-alkyl group, an aryl-$C_1$-$C_{18}$-alkoxyl group, a heterocyclic group, penta- or hexa-atomic, aromatic or non-aromatic, also benzocondensed or heterobicyclic, containing at least one heteroatom selected from oxygen, sulfur, nitrogen, wherein the sulfur atom can be possibly oxidized to sulfoxide or to sulfone and the nitrogen atom possibly oxidized to N-oxide or a heterocyclyl-$C_1$-$C_{18}$-alkyl group, said groups being optionally substituted with one or more $R_d$ groups, the same as or different from each other;

$R^4$ represents a hydrogen atom, a hydroxyl, a halogen atom selected from fluorine, chlorine, bromine or iodine, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_1$-$C_{18}$ alkoxyl group;

or $R^3$ and $R^4$ together with the carbon atom to which they are bound, form a $C_3$-$C_{18}$ cycloalkyl group or a heterocyclic group, penta- or hexa-atomic, containing at least one heteroatom selected from oxygen, sulfur, possibly oxidized to sulfoxide or to sulfone, nitrogen, possibly oxidized to N-oxide, said groups being optionally substituted with one or more R d groups the same as or different from each other;

or $R^1$ and $R^2$ together with the carbon atom to which they are bound, form a $C_3$-$C_{18}$ cycloalkyl ring;

with the proviso that:

when $R_c$ represents a hydrogen atom, n is equal to 0, W and $W^1$ are both oxygen, Y represents the group $Y^1$ wherein $R_a$ and $R_b$, different from each other, have the meaning of hydrogen and methyl, $R^1$ represents a methyl group, $R^2$ is a T group wherein $R^4$ is a hydrogen atom, $R^3$ and $R^5$ both represent a 4-fluorophenyl group, then $R^6$ is different from hydrogen or is different from a $CH_2OCOR^7$ group wherein $R^7$ is a methyl.

Particularly preferred compounds having general formula (I) are those wherein:

$R_c$ represents a formylamine group;

M represents an O—$R^7$ group;

Y represents a $Y^1$ group wherein $R_a$ is H and $R_b$ is (S)—$CH_3$;

$R_d$ represents a hydrogen atom;

W represents an oxygen atom.

In the present description, when a numerical range is indicated, the extremes are also meant to be included in the same.

Examples of $C_1$-$C_{18}$ alkyls, which can be linear or branched, are methyl, ethyl, n-propyl, isopropyl, n-butyl, isobutyl, sec-butyl, tert-butyl, n-pentyl, 3-methylbutyl, n-hexyl, 3,3-dimethylbutyl.

Examples of $C_1$-$C_{18}$ haloalkyls are fluoromethyl, difluoromethyl, trifluoromethyl, chloromethyl, dichloromethyl, 2,2,2-trifluoroethyl, 1,1,2,2-tetrafluoroethyl, pentafluoroethyl, heptafluoropropyl, 4,4,4-trichloro-butyl, 4,4-difluoropentyl, 5,5-difluorohexyl.

Examples of $C_2$-$C_{18}$ alkenyls, which can be linear or branched, are vinyl, allyl, 3-butenyl, 4-pentyl.

Examples of $C_2$-$C_{18}$ haloalkenyls are 1-(1,1,2-trifluoro)-butenyl, 1-(2,2-difluoro)-butenyl.

Examples of $C_2$-$C_{18}$ alkynyls, which can be linear or branched are 1-proninyl, 2-butinyl, 4-methyl-2-pentinyl.

Examples of $C_3$-$C_{18}$ cycloalkyls are cyclopropyl, cyclobutyl, cyclopentyl, cyclohexyl.

Examples of $C_3$-$C_{18}$ cycloalkenyls are cyclopropenyl, cyclopentenyl, cyclohexenyl.

Examples of $C_3$-$C_{18}$ halocycloalkyls are 2,2-dichlorocyclopropyl, 2,2-difluorocyclopropyl, 2,2,3,3-tetrafluorocyclobutyl, 3,3-difluorocyclopentyl, 2-fluorocyclohexyl.

Examples of $C_3$-$C_{18}$ cycloalkyl-$C_1$-$C_{18}$-akyls are cyclopropylmethyl, 2-cyclopentylethyl, 2-cyclohexylpropyl.

Examples of $C_1$-$C_{18}$ alkoxyls are methoxyl, ethoxyl, isopropoxyl, tert-butoxyl.

Examples of $C_1$-$C_{18}$ thioalkoxyls are thiomethoxyl, thioethoxyl, iso-thiopropoxyl.

Examples of $C_3$-$C_{18}$ cycloalkoxyls are cyclopropoxyl, cyclopentoxyl.

Examples of phenoxyl groups are 4-chloro-phenoxyl, 2,4-difluoro-phenoxyl, 3-methyl phenoxyl.

Examples of aryls, referring to aromatic systems, consisting of carbon atoms alone, are phenyl, naphthyl.

Examples of heterocyclic rings, referring to cyclic systems with 5 or 6 terms, aromatic or non-aromatic, possibly benzocondensed containing from 1 to 3 heteroatoms selected from O, N, S, are: thiazole, 1,3,4 thiadiazole, pyrrolidine, piperidine, morpholine, pyrazole etc.

Examples of an aryl-$C_1$-$C_{18}$-alkyl group are benzyl, phenylethyl, 2-phenyl-propyl, 3-(2-fluoro)-phenyl-butyl.

Examples of a heterocyclyl-$C_1$-$C_{18}$-alkylene group are 2-(1,3,4-thiadiazolyl)-methyl, 4-pyrazolyl-methyl, 2-[3-(N-methyl)-pyrrolidinyl]-propyl.

The following are also intended to fall within the spirit of the present invention:

a) all possible geometric isomers of the compounds having general formula (I) and all stereoisomers determined by the chiral centres present in the molecules having general formula (I);

b) salts of the compounds having formula (I) obtained by the addition of inorganic or organic acids;

c) any possible hydrated forms of the compounds having formula (I);
d) any possible oxidized forms on the sulfur and nitrogen atoms of the compounds having general formula (I).

Specific examples of compounds having general formula (I) interesting for their fungicidal activity are compounds wherein Y has the meaning of $Y^1$ and $R_d$, $R_e$, M, $R_1$, $R_2$, W, n, $R_a$ and $R_b$ have the meanings indicated in Table 1:

TABLE 1

(I)

[Structure of compound with formula (I) showing a phenyl ring with $R_c$, M, $(R_d)_n$ substituents, connected via C(=W) to NH-Y-C(=O)-O-CH($R^1$)($R^2$)]

| Comp. | n | $R_d$ | $R_c$ | W | M | $R_a$ | $R_b$ | $R^1$ | $R^2$ |
|---|---|---|---|---|---|---|---|---|---|
| 1 | 0 | — | $NH_2$ | O | OH | H | H | 3,3,5,5-tetramethyl-cyclohexyl | |
| 2 | 0 | — | NHCHO | O | OH | H | H | 3,3,5,5-tetramethyl-cyclohexyl | |
| 3 | 0 | — | NHCHO | O | OH | (S)-$CH_3$ | H | 3,3,5,5-tetramethyl-cyclohexyl | |
| 4 | 0 | — | NHCHO | O | OH | H | H | 3-ethyl-3,5,5-trimethyl-cyclohexyl | |
| 5 | 0 | — | NHCHO | O | OH | (S)-$CH_3$ | H | 3-ethyl-3,5,5-trimethyl-cyclohexyl | |
| 6 | 0 | — | $NH_2$ | O | OH | (S)-$CH_3$ | H | 3-ethyl-3,5,5-trimethyl-cyclohexyl | |
| 7 | 0 | — | $NH_2$ | O | OCOOEt | (S)-$CH_3$ | H | 3,3,5,5-tetramethyl-cyclohexyl | |
| 8 | 0 | — | NHCHO | O | OCOOEt | (S)-$CH_3$ | H | 3,3,5,5-tetramethyl-cyclohexyl | |
| 9 | 0 | — | NHCHO | O | OCOOMe | (S)-$CH_3$ | H | 3,3,5,5-tetramethyl-cyclohexyl | |
| 10 | 0 | — | NHCHO | O | OCOOEt | (S)-$CH_3$ | H | 3-ethyl-3,5,5-trimethyl-cyclohexyl | |
| 11 | 0 | — | NHCHO | O | OCOOMe | (S)-$CH_3$ | H | 3-ethyl-3,5,5-trimethyl-cyclohexyl | |
| 12 | 0 | — | $NH_2$ | O | OCCi-Bu | $CF_3$ | H | 3-ethyl-3,5,5-trimethyl-cyclohexyl | |
| 13 | 0 | — | NHCHO | O | OCOOi-Bu | $CF_3$ | H | 3-ethyl-3,5,5-trimethyl-cyclohexyl | |
| 14 | 0 | — | NHCHO | O | OCOOi-Bu | 4-$OCH_3$-phenyl | H | 3,3,5,5-tetramethyl-cyclohexyl | |
| 15 | 0 | — | NHCHO | O | OCOOMe | 4-$OCH_3$-phenyl | H | 3,3,5,5-tetramethyl-cyclohexyl | |
| 16 | 0 | — | NHCHO | O | $OCOCH_3$ | 4-$OCH_3$-phenyl | H | 3-ethyl-3,5,5-trimethyl-cyclohexyl | |
| 17 | 0 | — | $NH_2$ | O | $OCOCH_3$ | 4-Cl-phenyl | H | 3-ethyl-3,5,5-trimethyl-cyclohexyl | |
| 18 | 0 | — | $NH_2$ | O | $OCOCH_3$ | 4-$OCH_3$-phenyl | H | 3-ethyl-3,5,5-trimethyl-cyclohexyl | |
| 19 | 0 | — | NHCHO | O | $OCOCH_3$ | 4-Cl-phenyl | H | 3-ethyl-3,5,5-trimethyl-cyclohexyl | |
| 20 | 0 | — | NHCHO | O | $OCOCH_3$ | $CH_3$ | $CH_3$ | 3,3,5,5-tetramethyl-cyclohexyl | |
| 21 | 0 | — | NHCHO | O | $OCOCH_3$ | $CH_3$ | $CH_3$ | 3-ethyl-3,5,5-trimethyl-cyclohexyl | |
| 22 | 0 | — | $NH_2$ | O | $OCH_2OCOCH_3$ | (S)-$CH_3$ | H | 3-ethyl-3,5,5-trimethyl-cyclohexyl | |
| 23 | 0 | — | NHCHO | O | $OCH_2OCOCH_3$ | (S)-$CH_3$ | H | 3-ethyl-3,5,5-trimethyl-cyclohexyl | |
| 24 | 0 | — | NHCHO | O | $OCH_2OCOi$-Pr | (S)-$CH_3$ | H | 3-ethyl-3,5,5-trimethyl-cyclohexyl | |
| 25 | 0 | — | $NH_2$ | O | $OCH_2OCOCH_3$ | (S)-$CH_3$ | H | 3,3,5,5-tetramethyl-cyclohexyl | |
| 26 | 0 | — | NHCHO | O | $OCH_2OCOCH_3$ | (S)-$CH_3$ | H | 3,3,5,5-tetramethyl-cyclohexyl | |
| 27 | 0 | — | NHCHO | O | $OCH_2OCOi$-Pr | (S)-$CH_3$ | H | 3,3,5,5-tetramethyl-cyclohexyl | |
| 28 | 0 | — | NHCHO | O | $OCH_2OCOCH_3$ | $CH_3$ | $CH_3$ | 3,3,5,5-tetramethyl-cyclohexyl | |
| 29 | 0 | — | NHCHO | O | $OCH_2OCOCH_3$ | $CH_3$ | $CH_3$ | 3-ethyl-3,5,5-trimethyl-cyclohexyl | |
| 30 | 0 | — | NHCHO | O | OH | (S)-$CH_3$ | H | $CH_3$ | 1-hexyl |
| 31 | 0 | — | $NH_2$ | O | OH | (S)-$CH_3$ | H | $CH_3$ | 1-hexyl |
| 32 | 0 | — | NHCHO | O | $OCH_2OCOi$-Pr | (S)-$CH_3$ | H | $CH_3$ | 1-hexyl |
| 33 | 0 | — | $NH_2$ | O | OH | H | H | $CH_3$ | 1-octyl |
| 34 | 0 | — | NHCHO | O | OH | H | H | $CH_3$ | 1-octyl |
| 35 | 0 | — | NHCHO | O | $OCH_2OCOi$-Pr | (S)-$CH_3$ | H | menthyl | |
| 36 | 0 | — | NHCHO | O | $OCOCH_3$ | (S)-$CH_3$ | H | menthyl | |
| 37 | 0 | — | $NH_2$ | O | OH | (S)-$CH_3$ | H | borneyl | |
| 38 | 0 | — | NHCHO | O | OH | (S)-$CH_3$ | H | borneyl | |
| 39 | 0 | — | NHCHO | O | OH | (S)-CH3 | H | $CH_3$ | 3-dimethyl-2-dimethyl-1-propyl |
| 40 | 0 | — | NHCHO | O | $OCH_2OCOi$-Pr | (S)-$CH_3$ | H | $CH_3$ | 3-dimethyl-2-dimethyl-1-propyl |
| 41 | 0 | — | NHCHO | O | OH | (S)-$CH_3$ | H | isomentyl | |
| 42 | 0 | — | NHCHO | O | $OCH_2OCOi$-Pr | (S)-$CH_3$ | H | isomenthyl | |
| 43 | 0 | — | NHCHO | O | OH | (S)-$CH_3$ | H | $CH_3$ | 1-adamantyl |
| 44 | 0 | — | $NH_2$ | O | OCOOEt | (S)-$CH_3$ | H | $CH_3$ | 1-heptyl |
| 45 | 0 | — | NHCHO | O | OCOOEt | (S)-$CH_3$ | H | $CH_3$ | 1-heptyl |
| 46 | 0 | — | NHCHO | O | OH | (S)-$CH_3$ | H | $CH_3$ | 1-heptyl |
| 47 | 0 | — | NHCHO | O | $OCOCH_3$ | (S)-$CH_3$ | H | $CH_3$ | 1-heptyl |
| 48 | 0 | — | NHCHO | O | $OCOCH_3$ | $CH_3$ | $CH_3$ | $CH_3$ | 1-heptyl |
| 49 | 0 | — | NHCHO | S | $OCOCH_3$ | (S)-$CH_3$ | H | $CH_3$ | 1-heptyl |
| 50 | 0 | — | NHCHO | O | $OCOCH_3$ | 4-$OCH_3$-phenyl | H | $CH_3$ | 1-heptyl |

TABLE 1-continued (I)

| Comp. | n | $R_d$ | $R_c$ | W | M | $R_a$ | $R_b$ | $R^1$ | $R^2$ |
|---|---|---|---|---|---|---|---|---|---|
| 51 | 0 | — | NHCHO | O | OCH$_2$OCOi-Pr | (S)-CH$_3$ | H | CH$_3$ | 1-heptyl |
| 52 | 0 | — | NH$_2$ | S | OH | H | H | cyclohexyl | cyclohexyl |
| 53 | 0 | — | NHCHO | O | OH | (S)-CH$_3$ | H | cyclohexyl | cyclohexyl |
| 54 | 0 | — | NHCHO | S | OCOCH$_3$ | (S)-CH$_3$ | H | cyclohexyl | cyclohexyl |
| 55 | 0 | — | NHCHO | O | OCOCH$_3$ | (S)-CH$_3$ | H | cyclohexyl | cyclohexyl |
| 56 | 0 | — | NH$_2$ | O | OH | H | H | cyclohexyl | cyclohexyl |
| 57 | 0 | — | NHCHO | S | OCH$_2$OCOi-Pr | (S)-CH$_3$ | H | cyclohexyl | cyclohexyl |
| 58 | 0 | — | NH$_2$ | S | OCOCH$_3$ | CH$_3$ | CH$_3$ | cyclohexyl | cyclohexyl |
| 59 | 0 | — | NHCHO | S | OCOCH$_3$ | CH$_3$ | CH$_3$ | cyclohexyl | cyclohexyl |
| 60 | 0 | — | NHCHO | 0 | OCOCH$_3$ | CH$_3$ | CH$_3$ | cyclohexyl | cyclohexyl |
| 61 | 0 | — | NHCHO | S | OCOCH$_3$ | H | H | cyclohexyl | phenyl |
| 62 | 0 | — | NHCHO | O | OCOCH$_3$ | H | H | cyclohexyl | phenyl |
| 63 | 0 | — | NH$_2$ | O | SH | (S)-CH$_3$ | H | cyclohexyl | phenyl |
| 64 | 0 | — | NHCHO | O | OH | (S)-CH$_3$ | H | cyclohexyl | phenyl |
| 65 | 0 | — | NHCHO | O | SH | CH$_3$ | CH$_3$ | cyclohexyl | phenyl |
| 66 | 0 | — | NH$_2$ | S | SH | H | H | cyclohexyl | benzyl |
| 67 | 0 | — | NHCHO | S | SH | H | H | cyclohexyl | benzyl |
| 68 | 0 | — | NH$_2$ | O | OH | (S)-CH$_3$ | H | 2-(4-fluorophenyl)cyclobutyl | |
| 69 | 0 | — | NHCHO | O | OH | (S)-CH$_3$ | H | 2-(4-fluorophenyl)cyclobutyl | |
| 70 | 0 | — | NHCHO | S | SH | (S)-CH$_3$ | H | cyclohexyl | benzyl |
| 71 | 0 | — | NHCHO | O | OH | (S)-CH$_3$ | H | cyclohexyl | benzyl |
| 72 | 1 | 5-Me | NH$_2$ | O | OH | H | H | H | 3-cyclohexen-1-yl |
| 73 | 1 | 5-Me | NHCHO | O | OH | H | H | H | 3-cyclohexen-1-yl |
| 74 | 1 | 5-Me | NHCHO | O | OH | (S)-CH$_3$ | H | H | 3-cyclohexen-1-yl |
| 75 | 1 | 5-Me | NH$_2$ | O | OCOCH$_3$ | H | H | CH$_3$ | 2,4-dichlorophenyl |
| 76 | 1 | 5-Me | NHCHO | O | OCOCH$_3$ | H | H | CH$_3$ | 2,4-dichlorophenyl |
| 77 | 1 | 5-Me | NHCHO | O | OCOCH$_3$ | (S)-CH$_3$ | H | CH$_3$ | 2,4-dichlorophenyl |
| 78 | 1 | 5-Me | NHCHO | O | OCH$_2$OCOi-Pr | (S)-CH$_3$ | H | CH$_3$ | 2,4-dichlorophenyl |
| 79 | 1 | 5-t-butyl | NH$_2$ | O | OH | H | H | CH$_3$ | 3,5-ditrifluoromethylphenyl |
| 80 | 1 | 5-t-butyl | NHCHO | O | OH | H | H | CH$_3$ | 3,5-ditrifluoromethylphenyl |
| 81 | 1 | 5-t-butyl | NHCHO | O | OCH$_2$OCOi-Pr | H | H | CH$_3$ | 3,5-ditrifluoromethylphenyl |
| 82 | 1 | 5-t-butyl | NHCHO | O | OCOCH$_3$ | H | H | CH$_3$ | 3,5-ditrifluoromethylphenyl |
| 83 | 1 | 5-t-butyl | NHCHO | O | OH | (S)-CH$_3$ | H | CH$_3$ | 3,5-ditrifluoromethylphenyl |
| 84 | 1 | 5-t-butyl | NHCHO | O | OCH$_2$OCOi-Pr | (S)-CH$_3$ | H | CH$_3$ | 3,5-ditrifluoromethylphenyl |
| 85 | 1 | 5-t-butyl | NHCHO | O | OCOCH$_3$ | (S)-CH$_3$ | H | CH$_3$ | 3,5-ditrifluoromethylphenyl |
| 86 | 1 | 5-t-butyl | NH$_2$ | O | OCOCH$_3$ | (S)-CH$_3$ | H | H | 1-octyl |
| 87 | 1 | 5-t-butyl | NHCHO | O | OCOCH$_3$ | (S)-CH$_3$ | H | H | 1-octyl |
| 88 | 1 | 5-t-butyl | NHCHO | O | OCH$_2$OCOi-Pr | (S)-CH$_3$ | H | H | 1-octyl |
| 89 | 1 | 5-t-butyl | NHCHO | O | OCOCH$_3$ | H | H | 3-trifluoromethylphenyl | 3-trifluoromethylphenyl |

TABLE 1-continued

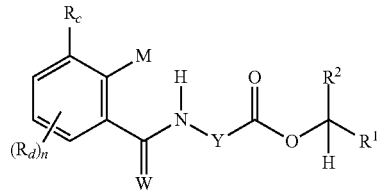

(I)

| Comp. | n | $R_d$ | $R_c$ | W | M | $R_a$ | $R_b$ | $R^1$ | $R^2$ |
|---|---|---|---|---|---|---|---|---|---|
| 90 | 1 | 5-t-butyl | NHCHO | O | OCOCH$_3$ | (S)-CH$_3$ | H | 3-trifluoromethylphenyl | 3-trifluoromethylphenyl |
| 91 | 1 | 5-CH$_3$CO | NH$_2$ | O | OH | (S)-CH$_3$ | H | 3-trifluoromethylphenyl | 3-trifluoromethylphenyl |
| 92 | 1 | 5-CH$_3$CO | NHCHO | O | OH | (S)-CH$_3$ | H | 3-trifluoromethylphenyl | 3-trifluoromethylphenyl |
| 93 | 1 | 5-CH$_3$CO | NHCHO | O | OH | (S)-CH$_3$ | H | (S)-CH$_3$ | 1-heptyl |
| 94 | 1 | 5-CH$_3$CO | NHCOCH$_3$ | O | OCOCH$_3$ | (S)-CH$_3$ | H | (S)-CH$_3$ | 1-heptyl |
| 95 | 1 | 5-CH$_3$CO | NHCHO | O | OCOCH$_3$ | (S)-CH$_3$ | H | (S)-CH$_3$ | 1-heptyl |
| 96 | 1 | 5-CH$_3$CO | NH$_2$ | O | OCH$_2$OCOi-Pr | (S)-CH$_3$ | H | (S)-CH$_3$ | 1-heptyl |
| 97 | 1 | 5-CH$_3$CO | NHCHO | O | OCH$_2$OCOi-Pr | (S)-CH$_3$ | H | (S)-CH$_3$ | 1-heptyl |
| 98 | 1 | 5-CH$_3$CO | NHCHO | O | OCOCH$_3$ | (S)-CH$_3$ | H | CH$_3$ | 1-adamantyl |
| 99 | 1 | 5-CH$_3$CO | NHCHO | O | OCH$_2$OCOi-Pr | (S)-CH$_3$ | H | CH$_3$ | 1-adamantyl |
| 100 | 0 | — | NO$_2$ | O | OH | H | H | CH$_3$ | 1-adamantyl |
| 101 | 0 | — | NO$_2$ | O | OH | (S)-CH$_3$ | H | CH$_3$ | 1-adamantyl |
| 102 | 0 | — | NH$_2$ | O | OH | (S)-CH$_3$ | H | CH$_3$ | 1-adamantyl |
| 103 | 0 | — | NHCHO | O | OCH$_2$SCH$_3$ | (S)-CH$_3$ | H | CH$_3$ | 1-adamantyl |
| 104 | 0 | — | NHCOCH$_2$Ph | O | OH | (S)-CH$_3$ | H | CH$_3$ | 1-adamantyl |
| 105 | 0 | — | NHCOPh | O | OH | (S)-CH$_3$ | H | CH$_3$ | 1-adamantyl |
| 106 | 0 | — | NO$_2$ | O | OCOOi-Bu | H | H | CH$_3$ | Dicyclohexylmethyl |
| 107 | 0 | — | NO$_2$ | O | OCOOi-Bu | (S)-CH$_3$ | H | CH$_3$ | Dicyclohexylmethyl |
| 108 | 0 | — | NH$_2$ | O | OCOOi-Bu | (S)-CH$_3$ | H | CH$_3$ | Dicyclohexylmethyl |
| 109 | 0 | — | NHCHO | O | OCOOi-Bu | (S)-CH$_3$ | H | CH$_3$ | Dicyclohexylmethyl |
| 110 | 0 | — | NHCHO | O | OCOCH$_3$ | (S)-CH$_3$ | H | CH$_3$ | Dicyclohexylmethyl |
| 111 | 0 | — | NHCHO | O | OCH$_2$OCOi-Pr | (S)-CH$_3$ | H | CH$_3$ | Dicyclohexylmethyl |
| 112 | 0 | — | NH$_2$ | O | OCH$_2$OCOi-Pr | (S)-CH$_3$ | H | CH$_3$ | Dicyclohexylmethyl |
| 113 | 0 | — | NHCHO | O | OCH$_2$OCOi-Pr | (S)-CH$_3$ | H | CH$_3$ | Dicyclohexylmethyl |
| 114 | 0 | — | NHCHO | O | OCOOEt | (S)-CH$_3$ | H | CH$_3$ | Dicyclohexylmethyl |
| 115 | 0 | — | NHCOPh | O | OCOOEt | (S)-CH$_3$ | H | CH$_3$ | Dicyclohexylmethyl |
| 116 | 1 | 5-Me | NO$_2$ | O | OH | CH$_3$ | CH$_3$ | CH$_3$ | Dicyclohexylmethyl |
| 117 | 1 | 5-Me | NH$_2$ | O | OH | CH$_3$ | CH$_3$ | CH$_3$ | Dicyclohexylmethyl |
| 118 | 1 | 5-Me | NHCHO | O | OH | CH$_3$ | CH$_3$ | CH$_3$ | Dicyclohexylemthyl |
| 119 | 0 | — | NO$_2$ | S | OH | phenyl | H | CH$_3$ | Dicyclohexylmethyl |
| 120 | 0 | — | NH$_2$ | S | OH | phenyl | H | CH$_3$ | Dicyclohexylmethyl |
| 121 | 0 | — | NHCHO | S | OH | phenyl | H | CH$_3$ | Dicyclohexylmethyl |
| 122 | 0 | — | H | O | OH | H | H | CH$_3$ | 1-cyclohexyl-2-methyl-1-propyl |
| 123 | 0 | — | H | O | OCOCH$_3$ | H | H | CH$_3$ | 1-cyclohexyl-2-methyl-1-propyl |
| 124 | 0 | — | NHCHO | O | OCOCH$_3$ | H | H | CH$_3$ | 1-cyclohexyl-2-methyl-1-propyl |
| 125 | 0 | — | H | O | OCOCH$_3$ | (S)-CH$_3$ | H | CH$_3$ | 1-cyclohexyl-2-methyl-1-propyl |
| 126 | 0 | — | NHCHO | O | OCOCH$_3$ | (S)-CH$_3$ | H | CH$_3$ | 1-cyclohexyl-2-methyl-1-propyl |
| 127 | 0 | — | NHCHO | O | OCH$_2$OCOi-Pr | (S)-CH$_3$ | H | CH$_3$ | 1-cyclohexyl-2-methyl-1-propyl |
| 128 | 0 | — | H | O | OCOOi-Bu | CH$_3$ | CH$_3$ | CH$_3$ | 1-cyclohexyl-2-methyl-1-propyl |
| 129 | 0 | — | NHCHO | O | OH | CH$_3$ | CH$_3$ | CH$_3$ | 1-cyclohexyl-2-methyl-1-propyl |
| 130 | 0 | — | H | O | OCH$_2$OCOi-Pr | phenyl | H | CH$_3$ | 1-cyclohexyl-2-methyl-1-propyl |

TABLE 1-continued (I)

| Comp. | n | R_d | R_c | W | M | R_a | R_b | R^1 | R^2 |
|---|---|---|---|---|---|---|---|---|---|
| 131 | 0 | — | NHCHO | O | OCH₂OCOi-Pr | phenyl | H | CH₃ | 1-cyclohexyl-2-methyl-1-propyl |
| 132 | 0 | — | H | O | F | H | H | CH₃ | 3,5-diethyl-4-heptyl |
| 133 | 0 | — | NHCHO | O | F | H | H | CH₃ | 3,5-diethyl-4-heptyl |
| 134 | 0 | — | NHCHO | O | OCOCH₃ | H | H | CH₃ | 3,5-diehtyl-4-heptyl |
| 135 | 0 | — | NHCHO | O | OCH₂OCOi-Pr | (S)-CH₃ | H | CH₃ | 3,5-diethyl-4-heptyl |
| 136 | 0 | — | NHCHO | O | OCH₂OCOi-Pr | (S)-CH₃ | H | CH₃ | 3,5-diethyl-4-heptyl |
| 137 | 1 | 5-F | F | O | OH | (S)-CH₃ | H | CH₃ | 3,5-diethyl-4-heptyl |
| 138 | 1 | 5-F | NHCHO | O | OH | (S)-CH₃ | H | CH₃ | 3,5-diethyl-4-heptyl |
| 139 | 1 | 5-Cl | H | O | OH | CH₃ | CH₃ | CH₃ | 3,5-diethyl-4-heptyl |
| 140 | 1 | 5-Cl | NHCHO | O | OCOCH₃ | CH₃ | CH₃ | CH₃ | 3,5-diethyl-4-heptyl |
| 141 | 1 | 5-Cl | H | O | OCOCH₃ | 4-CH₃-phenyl | H | CH₃ | 3,5-diethyl-4-heptyl |
| 142 | 1 | 5-Cl | NHCHO | O | OCOCH₃ | 4-CH₂-phenyl | H | CH₃ | 3,5-diethyl-4-heptyl |
| 143 | 1 | 4-Cl | H | O | OH | (S)-CH₃ | H | CH₃ | Dicyclohexylmethyl |
| 144 | 1 | 4-Cl | H | O | OCOCH₃ | (S)-CH₃ | H | CH₃ | Dicyclohexylmethyl |
| 145 | 0 | — | NHCHO | O | OCH₂SCH₃ | (S)-CH₃ | H | CH₃ | Dicyclohexylmethyl |
| 146 | 0 | — | NHCHO | O | OCH₂SCH₃ | (S)-CH₃ | H | CH₃ | 1-heptyl |
| 147 | 0 | — | H | O | OCH₂SCH₃ | (S)-CH₃ | H | CH₃ | 1-heptyl |
| 148 | 0 | — | NHCHO | O | OCH₂OCH₃ | (S)-CH₃ | H | CH₃ | 1-heptyl |
| 149 | 0 | — | NHCHO | O | OCH₂OCH₃ | (S)-CH₃ | H | CH₃ | Dicyclohexylmethyl |
| 150 | 0 | — | H | O | OCH₂OCH₃ | (S)-CH₃ | H | CH₃ | Dicyclohexylmethyl |
| 151 | 0 | — | NH₂ | O | OCH₂OCH₃ | (S)-CH₃ | H | CH₃ | Dicyclohexylmethyl |
| 152 | 0 | — | NHCHO | O | OCOCH₃ | (S)-CH₃ | H | H | diphenylmethyl |
| 153 | 0 | — | NHCHO | O | OCOCH₃ | (S)-CH₃ | H | H | diphenylmethyl |
| 154 | 0 | — | NHCHO | O | OCH₂SCH₃ | (S)-CH₃ | H | (S)-CH₃ | diphenylmethyl |
| 155 | 0 | — | NHCHO | O | OCOCH₃ | (S)-CH₃ | H | (S)-CH₃ | diphenylmethyl |
| 156 | 0 | — | NHCHO | O | OCH₂OCOi-Pr | (S)-CH₃ | H | (S)-CH₃ | diphenylmethyl |
| 157 | 0 | — | NHCHO | O | OCOCH₃ | CF₃ | H | H | diphenylmethyl |
| 158 | 0 | — | NHCHO | O | OCH₂OCOi-Pr | (S)-CH₃ | H | H | diphenylmethyl |
| 159 | 0 | — | NHCHO | O | OCH₂OCOi-Pr | CH₃ | CH₃ | H | diphenylmethyl |
| 160 | 0 | — | NHCHO | O | OCOOEt | (S)-CH₃ | H | (S)-CH₃ | Bis(4-Fluoro)-phenylmethyl |
| 161 | 0 | — | NHCHO | O | OCOCH₃ | (S)-CH₃ | H | H | Bis(4-Fluoro)-phenylmethyl |
| 162 | 0 | — | NHCHO | O | OCH₂OCOCH₃ | (S)-CH₃ | H | (S)-CH₃ | Bis(4-Fluoro)-phenylmethyl |
| 163 | 0 | — | NHCOPh | O | OCH₂OCOCH₃ | (S)-CH₃ | H | (S)-CH₃ | Bis(4-Fluoro)-phenylmethyl |
| 164 | 0 | — | NH₂ | O | OH | (S)-CH₃ | H | (S)-CH₃ | Bis(4-Fluoro)-phenylmethyl |
| 165 | 0 | — | NHCHO | O | OH | (S)-CH₃ | H | (S)-CH₃ | Bis(4-Fluoro)-phenylmethyl |
| 166 | 0 | — | NHCHO | O | OCH₂OCH₃ | (S)-CH₃ | H | (S)-CH₃ | Bis(4-Fluoro)-phenylmethyl |
| 167 | 0 | — | NHCHO | O | OH | H | H | (S)-CH₃ | Bis(4-Fluoro)-phenylmethyl |
| 168 | 0 | — | NHCHO | O | OCOCH₃ | H | H | (S)-CH₃ | Bis(4-Fluoro)-phenylmethyl |
| 169 | 0 | — | NHCHO | O | OCH₂OCOi-Pr | H | H | (S)-CH₃ | Bis(4-Fluoro)-phenylmethyl |
| 170 | 1 | 5-CH₃CO | NHCOCH₃ | O | OCOCH₃ | (S)-CH₃ | H | (S)-CH₃ | Bis(4-Fluoro)-phenylmethyl |
| 171 | 0 | — | NHCHO | O | OCOOi-Bu | (S)-CH₃ | H | (S)-CH₃ | Bis(4-Fluoro)-phenylmethyl |
| 172 | 0 | — | OCH₃ | O | OH | (S)-CH₃ | H | (S)-CH₃ | Bis(4-Fluoro)-phenylmethyl |
| 173 | 0 | — | F | O | OH | CH₃ | CH₃ | (S)-CH₃ | Bis(4-Fluoro)-phenylmethyl |
| 174 | 0 | — | NHCHO | O | OCH₃ | CF₃ | H | (S)-CH₃ | Bis(4-Fluoro)-phenylmethyl |
| 175 | 0 | — | NHCHO | O | OCOCH₃ | 4-Cl-phenyl | H | (S)-CH₃ | Bis(4-Fluoro)-phenylmethyl |
| 176 | 0 | — | NHCHO | O | OCOCH₃ | H | H | (S)-CH₃ | Bis(2,4-difluoro)-phenylmethyl |

TABLE 1-continued (I)

| Comp. | n | $R_d$ | $R_c$ | W | M | $R_a$ | $R_b$ | $R^1$ | $R^2$ |
|---|---|---|---|---|---|---|---|---|---|
| 177 | 0 | — | NHCHO | O | OCH$_2$SCH$_3$ | (S)-CH$_3$ | H | (S)-CH$_3$ | Bis(2,4-difluoro)-phenylmethyl |
| 178 | 0 | — | NHCHO | O | OCH$_2$OCOi-Pr | (S)-CH$_3$ | H | (S)-CH$_3$ | Bis(2,4-difluoro)-phenylmethyl |
| 179 | 0 | — | NHCHO | O | OH | (S)-CH$_3$ | H | (S)-CH$_3$ | Bis(2,4-difluoro)-phenylmethyl |
| 180 | 0 | — | NHCHO | O | OCOCH$_3$ | (S)-CH$_3$ | H | (S)-CH$_3$ | Bis(4-fluoro-2-methyl)-phenylmethyl |
| 181 | 0 | — | NHCHO | O | OCH$_2$OCOi-Pr | (S)-CH$_3$ | H | (S)-CH$_3$ | Bis(4-fluoro-2-methyl)-phenylmethyl |
| 182 | 0 | — | NHCHO | O | OH | (S)-CH$_3$ | H | (S)-CH$_3$ | Bis(4-fluoro-2-methyl)-phenylmethyl |
| 183 | 0 | — | NHCHO | O | OCH$_2$OCOi-Pr | CF$_3$ | H | (S)-CH$_3$ | Bis(4-fluoro-2-methyl)-phenylmethyl |
| 184 | 0 | — | NHCHO | O | OCOCH$_3$ | 4-OCH$_3$-phenyl | H | (S)-CH$_3$ | Bis(4-fluoro-2-methyl)-phenylmethyl |
| 185 | 0 | — | NHCHO | O | OCOCH$_3$ | H | H | (S)-CH$_3$ | Dicyclohexylmethyl |
| 186 | 0 | — | NHCHO | O | OCH$_2$SCH$_3$ | (S)-CH$_3$ | H | (S)-CH$_3$ | Dicyclohexylmethyl |
| 187 | 0 | — | NHCHO | O | OCOCH$_3$ | phenyl | H | (S)-CH$_3$ | Dicyclohexylmethyl |
| 188 | 0 | — | NHCHO | O | OCOCH$_3$ | H | H | (S)-CH$_3$ | 1-(4-fluro-2-methyl)-phenyl-2-methyl-1-propyl |
| 189 | 0 | — | NHCHO | O | OCH$_2$SCH$_3$ | (S)-CH$_3$ | H | (S)-CH$_3$ | 1-(4-fluoro-2-methyl)-phenyl-2-methyl-1-propyl |
| 190 | 0 | — | NHCHO | O | OCOCH$_3$ | 4-OCH$_3$-phenyl | H | (S)-CH$_3$ | 1-(4-fluoro-2-methyl)-phenyl-2-methyl-1-propyl |
| 191 | 0 | — | NHCHO | O | OCOCH$_3$ | H | H | (S)-CH$_3$ | 2-ethyl-1-phenyl-1-butyl |
| 192 | 0 | — | NHCHO | O | OCOCH$_3$ | (S)-CH$_3$ | H | (S)-CH$_3$ | 2-ethyl-1-phenyl-1-butyl |
| 193 | 0 | — | NHCHO | O | OCOCH$_3$ | CF$_3$ | H | (S)-CH$_3$ | 2-ethyl-1-phenyl-1-butyl |
| 194 | 0 | — | NHCHO | O | OCOCH$_3$ | 4-Cl-phenyl | H | (S)-CH$_3$ | 2-ethyl-1-phenyl-1-butyl |
| 195 | 0 | — | NHCHO | O | OH | (S)-CH$_3$ | H | (S)-CH$_3$ | (4-fluoro-2-emthyl)-phenyl-cyclopentylmethyl |
| 196 | 0 | — | NHCHO | O | OCOCH$_3$ | (S)-CH$_3$ | H | (S)-CH$_3$ | (4-fluoro-2-methyl)-phenyl-cyclopentylmethyl |
| 197 | 0 | — | NHCHO | O | OCOCH$_3$ | 3-F-phenyl | H | (S)-CH$_3$ | (4-fluoro-2-methyl)-phenyl-cyclopentylmethyl |
| 198 | 0 | — | NHCHO | O | OCOCH$_3$ | H | H | (S)-CH$_3$ | 1-cyclohexyl-2-methyl-1-propyl |
| 199 | 0 | — | NHCHO | O | OCOCH$_3$ | (S)-CH$_3$ | H | (S)-CH$_3$ | 1-cyclohexyl-2-methyl-1-propyl |
| 200 | 0 | — | NHCHO | O | OCOCH$_3$ | CF$_3$ | H | (S)-CH$_3$ | 1-cyclohexyl-2-methyl-1-propyl |
| 201 | 0 | — | NHCHO | O | OCOCH$_3$ | phenyl | H | (S)-CH$_3$ | 1-cyclohexyl-2-methyl-1-propyl |
| 202 | 0 | — | NHCHO | O | OCOCH$_3$ | 4-Cl-phenyl | H | (S)-CH3 | 1-cyclohexyl-2-methyl-1-propyl |
| 203 | 0 | — | NHCHO | O | OCH$_2$OCOi-Pr | (S)-CH$_3$ | H | (S)-CH$_3$ | 1-cyclohexyl-2-methyl-1-propyl |
| 204 | 0 | — | NHCHO | O | OH | (S)-CH$_3$ | H | (S)-CH$_3$ | 1-cyclohexyl-2-methyl-1-propyl |
| 205 | 0 | — | NHCHO | O | OCOOEt | (S)-CH$_3$ | H | (S)-CH$_3$ | 1-cyclohexyl-2-methyl-1-propyl |
| 206 | 0 | — | NHCHO | O | OCOOi-Bu | (S)-CH$_3$ | H | (S)-CH$_3$ | 1-cyclohexyl-2-methyl-1-propyl |
| 207 | 0 | — | NHCHO | O | OCOCH$_3$ | H | H | (S)-CH$_3$ | 3,5-diethyl-4-heptyl |
| 208 | 0 | — | NHCHO | O | OCH$_2$SCH$_3$ | (S)-CH$_3$ | H | (S)-CH$_3$ | 3,5-diethyl-4-heptyl |
| 209 | 0 | — | NHCHO | O | OCOCH$_3$ | CF$_3$ | H | (S)-CH$_3$ | 3,5-diethyl-4-heptyl |
| 210 | 0 | — | NHCHO | O | OCOCH$_3$ | 4-CH$_3$-phenyl | H | (S)-CH$_3$ | 3,5-diethyl-4-heptyl |
| 211 | 0 | — | NHCHO | O | OCH$_2$OCOi-Pr | (S)-CH$_3$ | H | (S)-CH$_3$ | 3,5-diethyl-4-heptyl |
| 212 | 0 | — | NHCHO | O | OH | (S)-CH$_3$ | H | (S)-CH$_3$ | 3,5-diethyl-4-heptyl |
| 213 | 0 | — | H | O | F | (S)-CH$_3$ | H | (S)-CH$_3$ | 3,5-diethyl-4-heptyl |
| 214 | 1 | 5-F | F | O | OH | (S)-CH$_3$ | H | (S)-CH$_3$ | 3,5-diethyl-4-heptyl |

TABLE 1-continued

(I)

| Comp. | n | $R_d$ | $R_c$ | W | M | $R_a$ | $R_b$ | $R^1$ | $R^2$ |
|---|---|---|---|---|---|---|---|---|---|
| 215 | 0 | — | NHCHO | O | OCOCH$_3$ |  | | (S)-CH$_3$ | diphenylmethyl |
| 216 | 0 | — | NHCHO | O | OCOCH$_3$ |  | | H | diphenylmethyl |
| 217 | 0 | — | NHCHO | O | OCH$_2$SCH$_3$ |  | | (S)-CH$_3$ | Bis(4-Fluoro)-phenylmethyl |
| 218 | 0 | — | NHCHO | O | OCOCH$_3$ |  | | (S)-CH$_3$ | Bis(4-Fluoro)-phenylmethyl |
| 219 | 0 | — | NHCHO | O | OCOCH$_3$ | (S)-CH$_3$ | H | CH$_3$ | 1-(1,3-benzothiazol-2-yl)-1-ethyl |
| 220 | 0 | — | NHCHO | O | OCH$_2$OCOi-Pr | (S)-CH$_3$ | H | CH$_3$ | 1-(1,3-benzothiazol-2-yl)-1-ethyl |
| 221 | 0 | — | NHCHO | O | OH | (S)-CH$_3$ | H | CH$_3$ | 1-(1,3-benzothiazol-2-yl)-1-ethyl |
| 222 | 0 | — | NHCHO | O | OCH$_2$SCH$_3$ | (S)-CH$_3$ | H | CH$_3$ | 1-(5-chloro-2H-isoindol-2-yl)-1-ethyl |
| 223 | 0 | — | NHCHO | O | OCH$_2$OCOi-Pr | (S)-CH$_3$ | H | CH$_3$ | 1-(5-chloro-2H-isoindolin-2-yl)-1-ethyl |
| 224 | 0 | — | NHCHO | O | OH | (S)-CH$_3$ | H | CH$_3$ | 1-(5-chloro-2H-isoindol-2-yl)-1-ethyl |
| 225 | 0 | — | NHCHO | O | OCOCH$_3$ | (S)-CH$_3$ | H | CH$_3$ | 1,2-diphenyl-1-cyclopropyl |
| 226 | 0 | — | NHCHO | O | OCH$_2$OCOi-Pr | (S)-CH$_3$ | H | CH$_3$ | 1,2-diphenyl-1-cyclopropyl |
| 227 | 0 | — | NHCHO | O | OH | (S)-CH$_3$ | H | CH$_3$ | 1,2-diphenyl-1-cyclopropyl |
| 228 | 0 | — | NHCHO | O | OCOCH$_3$ | (S)-CH$_3$ | H | CH$_3$ | 1-methyl-1-(4-fluoro)-phenyl)-1-ethyl |
| 229 | 0 | — | NHCHO | O | OCH$_2$OCOi-Pr | (S)-CH$_3$ | H | CH$_3$ | 1-methyl-1-(4-fluoro)-phenyl)-1-ethyl |
| 230 | 0 | — | NHCHO | O | OH | (S)-CH$_3$ | H | CH$_3$ | 1-methyl-1-(4-fluoro)-phenyl)-1-ethyl |
| 231 | 0 | — | NHCHO | O | OCH$_2$SCH$_3$ | (S)-CH$_3$ | H | CH$_3$ | 1-(4-chloro)-phenyl-1-cyclopentyl |
| 232 | 0 | — | NHCHO | O | OCH$_2$OCOi-Pr | (S)-CH$_3$ | H | CH$_3$ | 1-(4-chloro)-phenyl-1-cyclopentyl |
| 233 | 0 | — | NHCHO | O | OH | (S)-CH$_3$ | H | CH$_3$ | 1-(4-chloro)-phenyl-1-cyclopentyl |
| 234 | 0 | — | NHCHO | O | OCOCH$_3$ | (S)-CH$_3$ | H | (S)-CH$_3$ | butoxycarbonyl |
| 235 | 0 | — | NHCHO | O | OCH$_2$OCOi-Pr | (S)-CH$_3$ | H | (S)-CH$_3$ | butoxycarbonyl |
| 236 | 0 | — | NHCHO | O | OH | (S)-CH$_3$ | H | (S)-CH$_3$ | butoxycarbonyl |
| 237 | 0 | — | NHCHO | O | OCOCH$_3$ | (S)-CH$_3$ | H | (S)-CH$_3$ | 2-ethyl-hexyloxycarbonyl |
| 238 | 0 | — | NHCHO | O | OCH$_2$OCOi-Pr | (S)-CH$_3$ | H | (S)-CH$_3$ | butoxycarbonyl |
| 239 | 0 | — | NHCHO | O | OH | (S)-CH$_3$ | H | (S)-CH$_3$ | butoxycarbonyl |
| 240 | 0 | — | NHCHO | O | OCOCH$_3$ | (S)-CH$_3$ | H | (S)-CH$_3$ | butoxycarbonyl |
| 241 | 0 | — | NHCHO | O | OCOCH$_3$ | (S)-CH$_3$ | H | (S)-CH$_3$ | (S)-1-[bis(4-fluoro)-phenyl)]-2-propoxycarbonyl |
| 242 | 0 | — | NHCHO | O | OCH$_2$OCOi-Pr | (S)-CH$_3$ | H | (S)-CH$_3$ | (S)-1[bis(4-fluoro)-phenyl)]-2-propoxycarbonyl |
| 243 | 0 | — | NHCHO | O | OH | (S)-CH$_3$ | H | (S)-CH$_3$ | (S)-1-[bis(4-fluoro)-phenyl)]-2-propoxycarbonyl |
| 244 | 0 | — | NHCHO | O | OCH2SCH$_3$ | (S)-CH$_3$ | H | (S)-CH$_3$ | Bis(4-Fluoro)-phenylmethyl |

TABLE 1-continued (I)

| Comp. | n | $R_d$ | $R_c$ | W | M | $R_a$ | $R_b$ | $R^1$ | $R^2$ |
|---|---|---|---|---|---|---|---|---|---|
| 245 | 0 | — | NHCHO | O | OCH$_2$SCH$_3$ | (S)-CH$_3$ | H | CH$_3$ | hexadecyloxycarbonyl |
| 246 | 0 | — | NHCHO | O | OCH$_2$SCH$_3$ | (S)-CH$_3$ | H | (S)CH$_3$ | 1-(ethoxycarbonyl)-2-methyl-1-propyl |
| 247 | 0 | — | NHCHO | O | H | (S)-CH$_3$ | H | (S)-CH$_3$ | 3,7-dimethyloct-6-en-1-yloxycarobnyl |
| 248 | 0 | — | NHCHO | O | OH | (S)-CH$_3$ | H | (S)-CH$_3$ | benzyloxycarbonyl |
| 249 | 0 | — | NHCHO | O | OH | (S)-CH$_3$ | H | (S)-CH$_3$ | 1-heptyl |
| 250 | 0 | — | NHCHO | O | OCOCH$_3$ | (S)-CH$_3$ | H | (S)-CH$_3$ | 1-heptyl |
| 251 | 0 | — | NHCHO | O | OH | (S)-CH$_3$ | H | (R)-CH$_3$ | 1-heptyl |
| 252 | 0 | — | NHCHO | O | OCOCH$_3$ | (S)-CH$_3$ | H | (R)-CH$_3$ | 1-heptyl |
| 253 | 1 | 5-Cl | H | O | OCOCH$_3$ | (S)-CH$_3$ | H | (S)-CH$_3$ | Bis(4-Fluoro)-phenylmethyl |
| 254 | 0 | — | NHCHO | O | OCOOi-Bu | (S)-CH$_3$ | H | (S)-CH$_3$ | Butoxycarbonyl |
| 255 | 0 | — | NHCHO | O | OCOOi-Bu | (S)-CH$_3$ | H | (S)-CH$_3$ | 2-ethylhexyloxycarbonyl |
| 256 | 0 | — | NHCHO | O | OH | (S)-CH$_3$ | H | CH$_3$ | Dicyclohexylmethyl |
| 257 | 0 | — | NHCHO | O | OH | (S)-CH$_3$ | H | CH$_3$ | 3,5-diethyl-4-heptyl |
| 258 | 0 | — | NHCHO | O | OH | (S)-CH$_3$ | H | (S)-CH$_3$ | diphenylmethyl |
| 259 | 0 | — | NHCHO | O | OH | (S)-CH$_3$ | H | (S)-CH$_3$ | Dicyclohexylmethyl |
| 260 | 0 | — | NHCHO | O | OH | (S)-CH$_3$ | H | (S)-CH$_3$ | 1-(4-fluoro-2-methyl)-phenyl-2-methyl-1-propyl |
| 261 | 0 | — | NHCHO | O | OH | (S)-CH$_3$ | H | (S)-CH$_3$ | 1-phenyl-2-ethyl-1-butyl |
| 262 | 0 | — | NHCHO | O | OH | spiro-cyclopentyl | | (S)-CH$_3$ | diphenylmethyl |
| 263 | 0 | — | NHCHO | O | OH | spiro-cyclopropyl | | H | diphenylmethyl |
| 264 | 0 | — | NHCHO | O | OH | spiro-cyclopropyl | | (S)-CH$_3$ | Bis(4-Fluoro)-phenylmethyl |
| 265 | 0 | — | NHCHO | O | OH | spiro-cyclopentyl | | (S)-CH$_3$ | Bis(4-Fluoro)-phenylmethyl |
| 266 | 0 | — | NHCHO | O | OCOCH$_3$ | (S)-CH$_3$ | H | (S)-CH$_3$ | benzyloxycarbonyl |
| 267 | 0 | — | NHCHO | O | OCOCH(CH$_3$)$_2$ | (S)-CH$_3$ | H | (S)-CH$_3$ | Bis(4-Fluoro)-phenylmethyl |
| 268 | 0 | — | H | O | OH | (S)-CH$_3$ | H | CH$_3$ | 1-heptyl |
| 269 | 1 | 5-Cl | H | O | OH | (S)-CH$_3$ | H | CH$_3$ | 1-heptyl |
| 270 | 1 | 5-F | F | O | OH | (S)-CH$_3$ | H | (S)-CH$_3$ | Bis(4-Fluoro)-phenylmethyl |
| 271 | 1 | 5-Cl | H | O | OH | (S)-CH$_3$ | H | (S)-CH$_3$ | Bis(4-Fluoro)-phenylmethyl |
| 272 | 0 | — | NHCHO | O | OH | (S)-CH$_3$ | H | (R)-CH$_3$ | 1-hexyl |
| 273 | 0 | — | NHCHO | O | OH | (S)-CH$_3$ | H | CH$_3$ | (1R,2R,5S)-5-methyl-2-(propan-2-yl)-cyclohexyloxycarbonyl |
| 274 | 0 | — | NHCHO | O | OCOCH$_3$ | (S)-CH$_3$ | H | CH$_3$ | (1R,2R,5S)-5-methyl-2-(propan-2-il)-cyclohexyloxycarbonyl |
| 275 | 0 | — | NHCHO | O | OH | (S)-CH$_3$ | H | (S)-phenyl | benzyloxycarbonyl |
| 276 | 0 | — | NHCHO | O | OCOCH$_3$ | (S)-CH$_3$ | H | (S)-phenyl | benzyloxycarbonyl |
| 277 | 0 | — | NHCHO | O | OH | (S)-CH$_3$ | H | CH$_3$ | 2-phenyl-1-(isobutoxy-carbonyl)-1-ethyl |
| 278 | 0 | — | NHCHO | O | OH | (S)-CH$_3$ | H | (S)-CH$_3$ | 2-(4-fluoro)-phenyl-1-(iso-butoxycarbonyl)-1-ethyl |
| 279 | 0 | — | NHCHO | O | OCOCH(CH$_3$)$_2$ | (S)-CH$_3$ | H | (S)-CH$_3$ | 2-(4-fluoro)-phenyl-1-(iso-buxoycarbonyl)-1-ethyl |

TABLE 1-continued (I)

| Comp. | n | $R_d$ | $R_c$ | W | M | $R_a$ | $R_b$ | $R^1$ | $R^2$ |
|---|---|---|---|---|---|---|---|---|---|
| 280 | 0 | — | NHCHO | O | OCH$_2$OCOi-Pr | (S)-CH$_3$ | H | (S)-CH$_3$ | Bis(2-fluoro-4-methyl)-phenylmethyl |
| 281 | 0 | — | NHCHO | O | OH | (S)-CH$_3$ | H | (S)-CH$_3$ | Bis(2-fluoro-4-methyl)-phenylmethyl |
| 282 | 0 | — | NHCHO | O | OCH$_2$OCOi-Pr | (S)-CH$_3$ | H | (S)-CH$_3$ | Bis(thiomethyl)-phenylmethyl |
| 283 | 0 | — | NHCHO | O | OH | (S)-CH$_3$ | H | (S)-CH$_3$ | Bis(4-thiomethyl)-phenylmethyl |

Specific examples of compounds having general formula (I) interesting for their fungicidal activity are compounds wherein Y has the meaning of $Y^2$ and $R_d$, $R_c$, M, $R_1$, $R_2$, W, n, $R_a$ and $R_b$ have the meanings indicated in Table 2:

TABLE 2

(I)

| Comp. | n | $R_d$ | $R_c$ | W | M | $R_e$ | $R_f$ | $R^1$ | $R^2$ |
|---|---|---|---|---|---|---|---|---|---|
| 284 | 0 | — | NHCHO | O | OCOCH$_3$ | H | H | CH$_3$ | 1-heptyl |
| 285 | 0 | — | NHCHO | O | OCOCH$_3$ | CH$_3$ | CH$_3$ | CH$_3$ | 1-heptyl |
| 286 | 0 | — | NHCHO | S | OCOCH$_3$ | CH$_3$ | CH$_3$ | CH$_3$ | 1-heptyl |
| 287 | 0 | — | NHCHO | O | OCOCH$_3$ | CH$_3$ | CH$_3$ | cyclohexyl | cyclohexyl |
| 288 | 0 | — | NH$_2$ | O | OH | H | H | cyclohexyl | cyclohexyl |
| 289 | 0 | — | NH$_2$ | S | OCOCH$_3$ | CH$_3$ | CH$_3$ | cyclohexyl | cyclohexyl |
| 290 | 0 | — | NHCHO | S | OCOCH$_3$ | CH$_3$ | CH$_3$ | cyclohexyl | cyclohexyl |
| 291 | 0 | — | NHCHO | S | OCOCH$_3$ | H | H | cyclohexyl | phenyl |
| 292 | 0 | — | NH$_2$ | O | SH | H | H | cyclohexyl | phenyl |
| 293 | 0 | — | NHCHO | O | SH | H | H | cyclohexyl | phenyl |
| 294 | 0 | — | NHCHO | O | SH | CH$_3$ | CH$_3$ | cyclohexyl | phenyl |
| 295 | 1 | 5-Me | NH$_2$ | O | OH | H | H | H | 3-cyclohexen-1-yl |
| 296 | 1 | 5-Me | NHCHO | O | OH | H | H | H | 3-cyclohexen-1-yl |
| 297 | 1 | 5-Me | NH$_2$ | O | OCOCH$_3$ | H | H | CH$_3$ | 2,4-diclhorophenyl |
| 298 | 1 | 5-Me | NHCHO | O | OCOCH$_3$ | H | H | CH$_3$ | 2,4-diclhorophenyl |
| 299 | 1 | 5-Me | NHCHO | O | OCOCH$_3$ | CH$_3$ | CH$_3$ | CH$_3$ | 2,4-diclhorophenyl |
| 300 | 1 | 5-t-butyl | NHCHO | O | OCOCH$_3$ | H | H | CH$_3$ | 3,5-ditrifluoromethylphenyl |
| 301 | 1 | 5-t-butyl | NHCHO | O | OH | H | H | CH$_3$ | 3,5-ditrifluoromethylphenyl |
| 302 | 1 | 5-t-butyl | NHCHO | O | OCH$_2$OCOi-Pr | CH$_3$ | CH$_3$ | CH$_3$ | 3,5-ditrifluoro-methylphenyl |
| 303 | 1 | 5-t-butyl | NH$_2$ | O | OCOCH$_3$ | H | H | H | 1-octyl |
| 304 | 1 | 5-t-butyl | NHCHO | O | OCOCH$_3$ | H | H | H | 1-octyl |
| 305 | 0 | — | NO$_2$ | O | OH | H | H | H | 1-adamantyl |
| 306 | 0 | — | NH$_2$ | O | OH | H | H | H | 1-adamantyl |
| 307 | 0 | — | NHCHO | O | OH | CH$_3$ | CH$_3$ | H | 1-adamantyl |
| 308 | 0 | — | NH$_2$ | O | OCOOi-Bu | H | H | CH$_3$ | Dicyclohexylmethyl |
| 309 | 0 | — | NHCHO | O | OCOOi-Bu | H | H | CH$_3$ | Dicyclohexylmethyl |
| 310 | 0 | — | NHCHO | O | OH | H | H | CH$_3$ | Dicyclohexylmethyl |
| 311 | 0 | — | NHCHO | O | OCOCH$_3$ | CH$_3$ | CH$_3$ | CH$_3$ | Dicyclohexylmethyl |
| 312 | 0 | — | NHCHO | O | OH | CH$_3$ | CH$_3$ | CH$_3$ | Dicyclohexylmethyl |
| 313 | 0 | — | NHCHO | O | OCOOEt | CH$_3$ | H | CH$_3$ | Dicyclohexylmethyl |
| 314 | 0 | — | NHCHO | O | OH | CH$_3$ | H | CH$_3$ | Dicyclohexylmethyl |
| 315 | 0 | — | NHCHO | O | OCOCH$_3$ | H | H | CH$_3$ | 1-cyclohexyl-2-methyl-1-propyl |
| 316 | 0 | — | NHCHO | O | OH | H | H | CH$_3$ | 1-cyclohexyl-2-methyl-1-propyl |
| 317 | 0 | — | NHCHO | O | OCOCH$_3$ | CH$_3$ | CH$_3$ | CH$_3$ | 1-cyclohexyl-2-methyl-1-propyl |

TABLE 2-continued

| | | | | | | | | | |
|---|---|---|---|---|---|---|---|---|---|
| 318 | 0 | — | NHCHO | O | OH | CH₃ | CH₃ | CH₃ | 1-cyclohexyl-2-methyl-1-propyl |
| 319 | 0 | — | NHCHO | O | F | H | H | CH₃ | 3,5-diethyl-4-heptyl |
| 320 | 0 | — | NHCHO | O | OCOCH₃ | H | H | CH₃ | 3,5-diethyl-4-heptyl |
| 321 | 0 | — | NHCHO | O | OH | H | H | CH₃ | 3,5-diethyl-4-heptyl |
| 322 | 0 | — | NHCHO | O | OCOCH₃ | CH₃ | CH₃ | CH₃ | 3,5-diethyl-4-heptyl |
| 323 | 0 | — | NHCHO | O | OH | CH₃ | CH₃ | CH₃ | 3,5-diethyl-4-heptyl |
| 324 | 0 | — | NHCHO | O | OCOCH₃ | H | H | H | diphenylmethyl |
| 325 | 0 | — | NHCHO | O | OH | H | H | H | diphenylmethyl |
| 326 | 0 | — | NHCHO | O | OCH₂SCH₃ | CH₃ | CH₃ | (S)-CH₃ | diphenylmethyl |
| 327 | 0 | — | NHCHO | O | OH | CH₃ | CH₃ | (S)-CH₃ | diphenylmethyl |
| 328 | 0 | — | NHCHO | O | OCH₂SCH₃ | CH₃ | CH₃ | (S)-CH₃ | Bis (4-Fluoro)-phenylmethyl |
| 329 | 0 | — | NHCHO | O | OH | CH₃ | CH₃ | (S)-CH₃ | Bis (4-Fluoro)-phenylmethyl |
| 330 | 0 | — | NHCHO | O | OCH₂OCOi-Pr | H | H | (S)-CH₃ | Bis (4-Fluoro)-phenylmethyl |
| 331 | 0 | — | NHCHO | O | OH | H | H | (S)-CH₃ | Bis (4-Fluoro)-phenylmethyl |
| 332 | 0 | — | NHCHO | O | OCOOEt | CH₃ | CH₃ | (S)-CH₃ | Bis (4-Fluoro)-phenylmethyl |
| 333 | 0 | — | NHCHO | O | OCOCH₃ | CH₃ | H | H | Bis (4-Fluoro)-phenylmethyl |
| 334 | 0 | — | NHCHO | O | OH | CH₃ | H | H | Bis (4-Fluoro)-phenylmethyl |
| 335 | 1 | 5-CH₃CO | NHCOCH₃ | O | OCH₂SCH₃ | CH₃ | CH₃ | (S)-CH₃ | Bis (4-Fluoro)-phenylmethyl |
| 336 | 1 | 5-CH₃CO | NHCOCH₃ | O | OH | CH₃ | CH₃ | (S)-CH₃ | Bis (4-Fluoro)-phenylmethyl |
| 337 | 0 | — | NHCHO | O | OCOCH₃ | CF₃ | CF₃ | (S)-CH₃ | Bis (4-Fluoro)-phenylmethyl |
| 338 | 0 | — | NHCHO | O | OH | CF₃ | CF₃ | (S)-CH₃ | Bis (4-Fluoro)-phenylmethyl |
| 339 | 1 | 5-Cl | NHCHO | O | OCOCH₃ | H | H | (S)-CH₃ | Bis (4-Fluoro)-phenylmethyl |
| 340 | 1 | 5-Cl | NHCHO | O | OH | H | H | (S)-CH₃ | Bis (4-Fluoro)-phenylmethyl |
| 341 | 0 | — | NHCHO | O | OCOCH₃ | H | H | (S)-CH₃ | Bis (2,4-difluoro)-phenylmethyl |
| 342 | 0 | — | NHCHO | O | OH | H | H | (S)-CH₃ | Bis (2,4-difluoro)-phenylmethyl |
| 343 | 0 | — | NHCHO | O | OCOCH₃ | CH₃ | CH₃ | (S)-CH₃ | Bis (2,4-difluoro)-phenylmethyl |
| 344 | 0 | — | NHCHO | O | OH | CH₃ | CH₃ | (S)-CH₃ | Bis (2,4-difluoro)-phenylmethyl |
| 345 | 0 | — | NHCHO | O | OCH₂OCOi-Pr | CF₃ | H | (S)-CH₃ | Bis (4-fluoro-2-methyl)-phenylmethyl |
| 346 | 0 | — | NHCHO | O | OH | CF₃ | H | (S)-CH₃ | Bis (4-fluoro-2-methyl)-phenylmethyl |
| 347 | 0 | — | NHCHO | O | OCOCH₃ | H | H | (S)-CH₃ | Dicyclohexylmethyl |
| 348 | 0 | — | NHCHO | O | OH | H | H | (S)-CH₃ | Dicyclohexylmethyl |
| 349 | 0 | — | NHCHO | O | OCOCH₃ | CH₃ | CH₃ | (S)-CH₃ | Dicyclohexylmethyl |
| 350 | 0 | — | NHCHO | O | OH | CH₃ | CH₃ | (S)-CH₃ | Dicyclohexylmethyl |
| 351 | 0 | — | NHCHO | O | OCOCH₃ | H | H | (S)-CH₃ | 1-(4-fluoro-2-methyl)-phenyl-2-methyl-1-propyl |
| 352 | 0 | — | NHCHO | O | OH | H | H | (S)-CH₃ | 1-(4-fluoro-2-methyl)-phenyl-2-methyl-1-propyl |
| 353 | 0 | — | NHCHO | O | OCOCH₃ | CH₃ | CH₃ | (S)-CH₃ | 1-(4-fluoro-2-methyl)-phenyl-2-methyl-1-propyl |
| 354 | 0 | — | NHCHO | O | OH | CH₃ | CH₃ | (S)-CH₃ | 1-(4-fluoro-2-methyl)-phenyl-2-methyl-1-propyl |
| 355 | 0 | — | NHCHO | O | OCOCH₃ | H | H | (S)-CH₃ | 2-ethyl-1-phenyl-1-butyl |
| 356 | 0 | — | NHCHO | O | OH | H | H | (S)-CH₃ | 2-ethyl-1-phenyl-1-butyl |
| 357 | 0 | — | NHCHO | O | OCH₂SCH₃ | CH₃ | CH₃ | (S)-CH₃ | 2-ethyl-1-phenyl-1-butyl |
| 358 | 0 | — | NHCHO | O | OH | CH₃ | CH₃ | (S)-CH₃ | 2-ethyl-1-phenyl-1-butyl |
| 359 | 0 | — | NHCHO | O | OCOCH₃ | H | H | (S)-CH₃ | (4-fluoro-2-methyl)-phenyl-cyclopentylmethyl |
| 360 | 0 | — | NHCHO | O | OH | H | H | (S)-CH₃ | (4-fluoro-2-methyl)-phenyl-cyclopentylmethyl |
| 361 | 0 | — | NHCHO | O | OCOCH₃ | CH₃ | CH₃ | (S)-CH₃ | (4-fluoro-2-methyl)-phenyl-cyclopentylmethyl |
| 362 | 0 | — | NHCHO | O | OH | CH₃ | CH₃ | (S)-CH₃ | (4-fluoro-2-methyl)-phenyl-cyclopentylmethyl |
| 363 | 0 | — | NHCHO | O | OCOCH₃ | H | H | (S)-CH₃ | 1-cyclohexyl-2-methyl-1-propyl |
| 364 | 0 | — | NHCHO | O | OH | H | H | (S)-CH₃ | 1-cyclohexyl-2-methyl-1-propyl |
| 365 | 0 | — | NHCHO | O | OCOCH₃ | CH₃ | CH₃ | (S)-CH₃ | 1-cyclohexyl-2-methyl-1-propyl |
| 366 | 0 | — | NHCHO | O | OH | CH₃ | CH₃ | (S)-CH₃ | 1-cyclohexyl-2-methyl-1-propyl |
| 367 | 0 | — | NHCHO | O | OCOCH₃ | CF₃ | H | (S)-CH₃ | 1-cyclohexyl-2-methyl-1-propyl |
| 368 | 0 | — | NHCHO | O | OH | CF₃ | H | (S)-CH₃ | 1-cyclohexyl-2-methyl-1-propyl |
| 369 | 0 | — | NHCHO | O | OCOCH₃ | H | H | (S)-CH₃ | 3,5-diethyl-4-heptyl |
| 370 | 0 | — | NHCHO | O | OH | H | H | (S)-CH₃ | 3,5-diethyl-4-heptyl |
| 371 | 0 | — | NHCHO | O | OCOCH₃ | CH₃ | CH₃ | (S)-CH₃ | 3,5-diethyl-4-heptyl |

TABLE 2-continued

| 372 | 0 | — | NHCHO | O | OH | CH₃ | CH₃ | (S)-CH₃ | 3,5-diethyl-4-heptyl |
| 373 | 0 | — | NHCHO | O | OCOCH₃ | CF₃ | H | (S)-CH₃ | 3,5-diethyl-4-heptyl |
| 374 | 0 | — | NHCHO | O | OH | CF₃ | H | (S)-CH₃ | 3,5-diethyl-4-heptyl |
| 375 | 0 | — | NHCHO | O | OCOCH₃ | H | H | CH₃ | 1-(1,3-benzothiazol-2-yl)-1-ethyl |
| 376 | 0 | — | NHCHO | O | OCH₂OCOi-Pr | CH₃ | CH₃ | CH₃ | 1-(1,3-benzothiazol-2-yl)-1-ethyl |
| 377 | 0 | — | NHCHO | O | OH | H | H | CH₃ | 1-(1,3-benzothiazol-2-yl)-1-ethyl |
| 378 | 0 | — | NHCHO | O | OCOCH₃ | H | H | CH₃ | 1-(5-chloro-2H-isoindol-2-yl)-1-ethyl |
| 379 | 0 | — | NHCHO | O | OCOCH₃ | CH₃ | CH₃ | CH₃ | 1-(5-chloro-2H-isoindol-2-yl)-1-ethyl |
| 380 | 0 | — | NHCHO | O | OH | CH₃ | CH₃ | CH₃ | 1-(5-chloro-2H-isoindol-2-y1)-1-ethyl |
| 381 | 0 | — | NHCHO | O | OCOCH₃ | H | H | CH₃ | 1,2-diphenyl-1-cyclopropyl |
| 382 | 0 | — | NHCHO | O | OH | H | H | CH₃ | 1,2-diphenyl-1-cyclopropyl |
| 383 | 0 | — | NHCHO | O | OCOCH₃ | CH₃ | CH₃ | CH₃ | 1,2-diphenyl-1-cyclopropyl |
| 384 | 0 | — | NHCHO | O | OH | CH₃ | CH₃ | CH₃ | 1,2-diphenyl-1-cyclopropyl |
| 385 | 0 | — | NHCHO | O | OCOCH₃ | H | H | CH₃ | 1-methyl-1-(4-fluoro)-phenyl-1-ethyl |
| 386 | 0 | — | NHCHO | O | OH | H | H | CH₃ | 1-methyl-1-(4-fluoro)-phenyl-1-ethyl |
| 387 | 0 | — | NHCHO | O | OCOCH₃ | CH₃ | CH₃ | CH₃ | 1-methyl-1-(4-fluoro)-phenyl-1-ethyl |
| 388 | 0 | — | NHCHO | O | OH | CH₃ | CH₃ | CH₃ | 1-methyl-1-(4-fluoro)-phenyl-1-ethyl |
| 389 | 0 | — | NHCHO | O | OCOCH₃ | H | H | CH₃ | 1-(4-chloro)-phenyl-1-cyclopentyl |
| 390 | 0 | — | NHCHO | O | OH | H | H | CH₃ | 1-(4-chloro)-phenyl-1-cyclopentyl |
| 391 | 0 | — | NHCHO | O | OCOCH₃ | CH₃ | CH₃ | CH₃ | 1-(4-chloro)-phenyl-1-cyclopentyl |
| 392 | 0 | — | NHCHO | O | OH | CH₃ | CH₃ | CH₃ | 1-(4-chloro)-phenyl-1-cyclopentyl |
| 393 | 0 | — | NHCHO | O | OCOCH₃ | H | H | (S)-CH₃ | butoxycarbonyl |
| 394 | 0 | — | NHCHO | O | OH | H | H | (S)-CH₃ | butoxycarbonyl |
| 395 | 0 | — | NHCHO | O | OH | CH₃ | CH₃ | (S)-CH₃ | butoxycarbonyl |
| 396 | 0 | — | NHCHO | O | OCOCH₃ | CH₃ | CH₃ | (S)-CH₃ | butoxycarbonyl |
| 397 | 0 | — | NHCHO | O | OCOCH₃ | CH₃ | CH₃ | (S)-CH₃ | 2-ethyl-hexyloxycarbonyl |
| 398 | 0 | — | NHCHO | O | OH | CH₃ | CH₃ | (S)-CH₃ | 2-ethyl-hexyloxycarbonyl |
| 399 | 0 | — | NHCHO | O | OCOCH₃ | H | H | (S)-CH₃ | 2-ethyl-hexyloxycarbonyl |
| 400 | 0 | — | NHCHO | O | OH | H | H | (S)-CH₃ | 2-ethyl-hexyloxycarbonyl |
| 401 | 0 | — | NHCHO | O | OCOCH₃ | H | H | (S)-CH₃ | (S)-1-[bis-(4-fluoro)-phenyl)]-2-propoxycarbonyl |
| 402 | 0 | — | NHCHO | O | OH | H | H | (S)-CH₃ | (S)-1-[bis-(4-fluoro)-phenyl)]-2-propoxycarbonyl |
| 403 | 0 | — | NHCHO | O | OH | CH₃ | CH₃ | (S)-CH₃ | (S)-1-[bis-(4-fluoro)-phenyl)]-2-propoxycarbonyl |
| 404 | 0 | — | NHCHO | O | OCOCH₃ | CH₃ | CH₃ | (S)-CH₃ | (S)-1-[bis-(4-fluoro)-phenyl)]-2-propoxycarbonyl |
| 405 | 0 | — | NHCHO | O | OH | H | H | CH₃ | 2-phenyl-1-(isobutoxycarbonyl)-1-ethyl |
| 406 | 0 | — | NHCHO | O | OH | CH₃ | CH₃ | CH₃ | 2-phenyl-1-(isobutoxycarbonyl)-1-ethyl |
| 407 | 0 | — | NHCHO | O | OH | H | H | (S)-CH₃ | 2-(4-fluoro)-phenyl-1-(isobutoxycarbonyl)-1-ethyl |
| 408 | 0 | — | NHCHO | O | OH | CH₃ | CH₃ | (S)-CH₃ | 2-(4-fluoro)-phenyl-1-(isobutoxycarbonyl)-1-ethyl |

Specific examples of compounds having general formula (I) particularly preferred for their fungicidal activity are compounds wherein Y has the meaning of $Y^1$ and $R_d$, $R_c$, M, $R_1$, $R_2$, W, n, $R_a$ and $R_b$ have the meanings indicated in Table 3:

TABLE 3

(I)

| Comp. | n | $R_d$ | $R_c$ | W | M | $R_a$ | $R_b$ | $R^1$ | $R^2$ |
|---|---|---|---|---|---|---|---|---|---|
| 30 | 0 | — | NHCHO | O | OH | (S)-$CH_3$ | H | $CH_3$ | 1-hexyl |
| 31 | 0 | — | $NH_2$ | O | OH | (S)-$CH_3$ | H | $CH_3$ | 1-hexyl |
| 32 | 0 | — | NHCHO | O | $OCH_2OCOi$-Pr | (S)-$CH_3$ | H | $CH_3$ | 1-hexyl |
| 39 | 0 | — | NHCHO | O | OH | (S)-$CH_3$ | H | $CH_3$ | 3-dimethyl-2-dimethyl-1-propyl |
| 40 | 0 | — | NHCHO | O | $OCH_2OCOi$-Pr | (S)-$CH_3$ | H | $CH_3$ | 3-dimethyl-2-dimethyl-1-propyl |
| 43 | 0 | — | NHCHO | O | OH | (S)-$CH_3$ | H | $CH_3$ | 1-adamantyl |
| 44 | 0 | — | $NH_2$ | O | OCOOEt | (S)-$CH_3$ | H | $CH_3$ | 1-heptyl |
| 45 | 0 | — | NHCHO | O | OCOOEt | (S)-$CH_3$ | H | $CH_3$ | 1-heptyl |
| 46 | 0 | — | NHCHO | O | OH | (S)-$CH_3$ | H | $CH_3$ | 1-heptyl |
| 47 | 0 | — | NHCHO | O | $OCOCH_3$ | (S)-$CH_3$ | H | $CH_3$ | 1-heptyl |
| 48 | 0 | — | NHCHO | O | $OCOCH_3$ | $CH_3$ | $CH_3$ | $CH_3$ | 1-heptyl |
| 49 | 0 | — | NHCHO | S | $OCOCH_3$ | (S)-$CH_3$ | H | $CH_3$ | 1-heptyl |
| 51 | 0 | — | NHCHO | O | $OCH_2OCOi$-Pr | (S)-$CH_3$ | H | $CH_3$ | 1-heptyl |
| 53 | 0 | — | NHCHO | O | OH | (S)-$CH_3$ | H | cyclohexyl | cyclohexyl |
| 54 | 0 | — | NHCHO | S | $OCOCH_3$ | (S)-$CH_3$ | H | cyclohexyl | cyclohexyl |
| 55 | 0 | — | NHCHO | O | $OCOCH_3$ | (S)-$CH_3$ | H | cyclohexyl | cyclohexyl |
| 57 | 0 | — | NHCHO | S | $OCH_2OCOi$-Pr | (S)-$CH_3$ | H | cyclohexyl | cyclohexyl |
| 64 | 0 | — | NHCHO | O | OH | (S)-$CH_3$ | H | cyclohexyl | phenyl |
| 70 | 0 | — | NHCHO | S | SH | (S)-$CH_3$ | H | cyclohexyl | benzyl |
| 71 | 0 | — | NHCHO | O | OH | (S)-$CH_3$ | H | cyclohexyl | benzyl |
| 74 | 1 | 5-Me | NHCHO | O | OH | (S)-$CH_3$ | H | H | 3-cyclohexen-1-yl |
| 77 | 1 | 5-Me | NHCHO | O | $OCOCH_3$ | (S)-$CH_3$ | H | $CH_3$ | 2,4-dichlorophenyl |
| 78 | 1 | 5-Me | NHCHO | O | $OCH_2OCOi$-Pr | (S)-$CH_3$ | H | $CH_3$ | 2,4-dichlorophenyl |
| 83 | 1 | 5-t-butyl | NHCHO | O | OH | (S)-$CH_3$ | H | $CH_3$ | 3,5-ditrifluoromethylphenyl |
| 84 | 1 | 5-t-butyl | NHCHO | O | $OCH_2OCOi$-Pr | (S)-$CH_3$ | H | $CH_3$ | 3,5-ditrifluoromethylphenyl |
| 85 | 1 | 5-t-butyl | NHCHO | O | $OCOCH_3$ | (S)-$CH_3$ | H | $CH_3$ | 3,5-ditrifluoromethylphenyl |
| 86 | 1 | 5-t-butyl | $NH_2$ | O | $OCOCH_3$ | (S)-$CH_3$ | H | H | 1-octyl |
| 87 | 1 | 5-t-butyl | NHCHO | O | $OCOCH_3$ | (S)-$CH_3$ | H | H | 1-octyl |
| 88 | 1 | 5-t-butyl | NHCHO | O | $OCH_2OCOi$-Pr | (S)-$CH_3$ | H | H | 1-octyl |
| 90 | 1 | 5-t-butyl | NHCHO | O | $OCOCH_3$ | (S)-$CH_3$ | H | 3-trifluoro-methylphenyl | 3-trifluoromethylphenyl |
| 91 | 1 | 5-$CH_3CO$ | $NH_2$ | O | OH | (S)-$CH_3$ | H | 3-trifluoro-methylphenyl | 3-trifluoromethylphenyl |
| 92 | 1 | 5-$CH_3CO$ | NHCHO | O | OH | (S)-$CH_3$ | H | 3-trifluoro-methylphenyl | 3-trifluoromethylphenyl |
| 93 | 1 | 5-$CH_3CO$ | NHCHO | O | OH | (S)-$CH_3$ | H | (S)-$CH_3$ | 1-heptyl |
| 95 | 1 | 5-$CH_3CO$ | NHCHO | O | $OCOCH_3$ | (S)-$CH_3$ | H | (S)-$CH_3$ | 1-heptyl |
| 96 | 1 | 5-$CH_3CO$ | $NH_2$ | O | $OCH_2OCOi$-Pr | (S)-$CH_3$ | H | (S)-$CH_3$ | 1-heptyl |
| 97 | 1 | 5-$CH_3CO$ | NHCHO | O | $OCH_2OCOi$-Pr | (S)-$CH_3$ | H | (S)-$CH_3$ | 1-heptyl |
| 98 | 1 | 5-$CH_3CO$ | NHCHO | O | $OCOCH_3$ | (S)-$CH_3$ | H | H | 1-adamantyl |
| 99 | 1 | 5-$CH_3CO$ | NHCHO | O | $OCH_2OCOi$-Pr | (S)-$CH_3$ | H | H | 1-adamantyl |
| 103 | 0 | — | NHCHO | O | OH | (S)-$CH_3$ | H | H | 1-adamantyl |
| 109 | 0 | — | NHCHO | O | OCOOi-Bu | (S)-$CH_3$ | H | $CH_3$ | Dicyclohexylmethyl |
| 110 | 0 | — | NHCHO | O | $OCOCH_3$ | (S)-$CH_3$ | H | $CH_3$ | Dicyclohexylmethyl |
| 111 | 0 | — | NHCHO | O | $OCH_2OCOi$-Pr | (S)-$CH_3$ | H | $CH_3$ | Dicyclohexylmethyl |
| 112 | 0 | — | $NH_2$ | O | $OCH_2OCOi$-Pr | (S)-$CH_3$ | H | $CH_3$ | Dicyclohexylmethyl |
| 113 | 0 | — | NHCHO | O | $OCH_2OCOi$-Pr | (S)-$CH_3$ | H | $CH_3$ | Dicyclohexylmethyl |
| 114 | 0 | — | NHCHO | O | OCOOEt | (S)-$CH_3$ | H | $CH_3$ | Dicyclohexylmethyl |
| 126 | 0 | — | NHCHO | O | $OCOCH_3$ | (S)-$CH_3$ | H | $CH_3$ | 1-cyclohexyl-2-methyl-1-propyl |
| 127 | 0 | — | NHCHO | O | $OCH_2OCOi$-Pr | (S)-$CH_3$ | H | $CH_3$ | 1-cyclohexyl-2-methyl-1-propyl |
| 135 | 0 | — | NHCHO | O | $OCOCH_3$ | (S)-$CH_3$ | H | $CH_3$ | 3,5-diethyl-4-heptyl |
| 136 | 0 | — | NHCHO | O | $OCH_2OCOi$-Pr | (S)-$CH_3$ | H | $CH_3$ | 3,5-diethyl-4-heptyl |
| 138 | 1 | 5-F | NHCHO | O | OH | (S)-$CH_3$ | H | $CH_3$ | 3,5-diethyl-4-heptyl |
| 145 | 0 | — | NHCHO | O | $OCH_2SCH_3$ | (S)-$CH_3$ | H | $CH_3$ | Dicyclohexylmethyl |
| 146 | 0 | — | NHCHO | O | $OCH_2SCH_3$ | (S)-$CH_3$ | H | $CH_3$ | 1-heptyl |
| 148 | 0 | — | NHCHO | O | $OCH_2OCH_3$ | (S)-$CH_3$ | H | $CH_3$ | 1-heptyl |
| 149 | 0 | — | NHCHO | O | $OCH_2OCH_3$ | (S)-$CH_3$ | H | $CH_3$ | Dicyclohexylmethyl |
| 151 | 0 | — | $NH_2$ | O | $OCH_2OCH_3$ | (S)-$CH_3$ | H | $CH_3$ | Dicyclohexylmethyl |
| 152 | 0 | — | NHCHO | O | $OCOCH_3$ | (S)-$CH_3$ | H | H | diphenylmethyl |
| 154 | 0 | — | NHCHO | O | $OCH_2SCH_3$ | (S)-$CH_3$ | H | (S)-$CH_3$ | diphenylmethyl |

TABLE 3-continued

| | | | | | | | | | |
|---|---|---|---|---|---|---|---|---|---|
| 155 | 0 | — | NHCHO | O | OCOCH$_3$ | (S)-CH$_3$ | H | (S)-CH$_3$ | Bis (4-Fluoro)-phenylmethyl |
| 156 | 0 | — | NHCHO | O | OCH$_2$OCOi-Pr | (S)-CH$_3$ | H | (S)-CH$_3$ | Bis (4-Fluoro)-phenylmethyl |
| 158 | 0 | — | NHCHO | O | OCH$_2$OCOi-Pr | (S)-CH$_3$ | H | H | diphenylmethyl |
| 161 | 0 | — | NHCHO | O | OCOCH$_3$ | (S)-CH$_3$ | H | H | Bis (4-Fluoro)-phenylmethyl |
| 162 | 0 | — | NHCHO | O | OCH$_2$OCOCH$_3$ | (S)-CH$_3$ | H | (S)-CH$_3$ | Bis (4-Fluoro)-phenylmethyl |
| 163 | 0 | — | NHCOPh | O | OCH$_2$OCOCH$_3$ | (S)-CH$_3$ | H | (S)-CH$_3$ | Bis (4-Fluoro)-phenylmethyl |
| 164 | 0 | — | NH$_2$ | O | OH | (S)-CH$_3$ | H | (S)-CH$_3$ | Bis (4-Fluoro)-phenylmethyl |
| 165 | 0 | — | NHCHO | O | OH | (S)-CH$_3$ | H | (S)-CH$_3$ | Bis (4-Fluoro)-phenylmethyl |
| 166 | 0 | — | NHCHO | O | OCH$_2$OCH$_3$ | (S)-CH$_3$ | H | (S)-CH$_3$ | Bis (4-Fluoro)-phenylmethyl |
| 170 | 1 | 5-CH$_3$CO | NHCOCH$_3$ | O | OCOCH$_3$ | (S)-CH$_3$ | H | (S)-CH$_3$ | Bis (4-Fluoro)-phenylmethyl |
| 171 | 0 | — | NHCHO | O | OCOOi-Bu | (S)-CH$_3$ | H | (S)-CH$_3$ | Bis (4-Fluoro)-phenylmethyl |
| 177 | 0 | — | NHCHO | O | OCH$_2$SCH$_3$ | (S)-CH$_3$ | H | (S)-CH$_3$ | Bis (2,4-difluoro)-phenylmethyl |
| 178 | 0 | — | NHCHO | O | OCH$_2$OCOi-Pr | (S)-CH$_3$ | H | (S)-CH$_3$ | Bis (2,4-difluoro)-phenylmethyl |
| 179 | 0 | — | NHCHO | O | OH | (S)-CH$_3$ | H | (S)-CH$_3$ | Bis (2,4-difluoro)-phenylmethyl |
| 180 | 0 | — | NHCHO | O | OCOCH$_3$ | (S)-CH$_3$ | H | (S)-CH$_3$ | Bis (4-fluoro-2-methyl)-phenylmethyl |
| 181 | 0 | — | NHCHO | O | OCH$_2$OCOi-Pr | (S)-CH$_3$ | H | (S)-CH$_3$ | Bis (4-fluoro-2-methyl)-phenylmethyl |
| 182 | 0 | — | NHCHO | O | OH | (S)-CH$_3$ | H | (S)-CH$_3$ | Bis (4-fluoro-2-methyl)-phenylmethyl |
| 186 | 0 | — | NHCHO | O | OCH$_2$SCH$_3$ | (S)-CH$_3$ | H | (S)-CH$_3$ | Dicyclohexylmethyl |
| 189 | 0 | — | NHCHO | O | OCH$_2$SCH$_3$ | (S)-CH$_3$ | H | (S)-CH$_3$ | 1-(4-fluoro-2-methyl)-phenyl-2-methyl-1-propyl |
| 192 | 0 | — | NHCHO | O | OCOCH$_3$ | (S)-CH$_3$ | H | (S)-CH$_3$ | 3,5-diethyl-4-heptyl |
| 195 | 0 | — | NHCHO | O | OH | (S)-CH$_3$ | H | (S)-CH$_3$ | 4-fluoro-2-methyl)-phenyl-ciclopentylmethyl |
| 196 | 0 | — | NHCHO | O | OCOCH$_3$ | (S)-CH$_3$ | H | (S)-CH$_3$ | 4-fluoro-2-methyl)-phenyl-cyclopentylmethyl |
| 199 | 0 | — | NHCHO | O | OCOCH$_3$ | (S)-CH$_3$ | H | (S)-CH$_3$ | 1-cyclohexyl-2-methyl-1-propyl |
| 203 | 0 | — | NHCHO | O | OCH$_2$OCOi-Pr | (S)-CH$_3$ | H | (S)-CH$_3$ | 1-cyclohexyl-2-methyl-1-propyl |
| 204 | 0 | — | NHCHO | O | OH | (S)-CH$_3$ | H | (S)-CH$_3$ | 1-cyclohexyl-2-methyl-1-propyl |
| 205 | 0 | — | NHCHO | O | OCOOEt | (S)-CH$_3$ | H | (S)-CH$_3$ | 1-cyclohexyl-2-methyl-1-propyl |
| 206 | 0 | — | NHCHO | O | OCOOi-Bu | (S)-CH$_3$ | H | (S)-CH$_3$ | 1-cyclohexyl-2-methyl-1-propyl |
| 208 | 0 | — | NHCHO | O | OCH$_2$SCH$_3$ | (S)-CH$_3$ | H | (S)-CH$_3$ | 3,5-diethyl-4-heptyl |
| 211 | 0 | — | NHCHO | O | OCH$_2$OCOi-Pr | (S)-CH$_3$ | H | (S)-CH$_3$ | 3,5-diethyl-4-heptyl |
| 212 | 0 | — | NHCHO | O | OH | (S)-CH$_3$ | H | (S)-CH$_3$ | 3,5-diethyl-4-heptyl |
| 217 | 0 | — | NHCHO | O | OCH$_2$SCH$_3$ |  | | (S)-CH$_3$ | Bis (4-Fluoro)-phenylmethyl |
| 218 | 0 | — | NHCHO | O | OCOCH$_3$ | 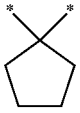 | | (S)-CH$_3$ | Bis (4-Fluoro)-phenylmethyl |
| 219 | 0 | — | NHCHO | O | OCOCH$_3$ | (S)-CH$_3$ | H | CH$_3$ | 1-(1,3-benzothiazol-2-yl)-1-ethyl |
| 220 | 0 | — | NHCHO | O | OCH$_2$OCOi-Pr | (S)-CH$_3$ | H | CH$_3$ | 1-(1,3-benzothiazol-2-yl)-1-ethyl |
| 221 | 0 | — | NHCHO | O | OH | (S)-CH$_3$ | H | CH$_3$ | 1-(1,3-benzothiazol-2-yl)-1-ethyl |
| 222 | 0 | — | NHCHO | O | OCH$_2$SCH$_3$ | (S)-CH$_3$ | H | CH$_3$ | 1-(5-chloro-2H-isoindol-2-yl)-1-ethyl |
| 223 | 0 | — | NHCHO | O | OCH$_2$OCOi-Pr | (S)-CH$_3$ | H | CH$_3$ | 1-(5-chloro-2H-isoindol-2-yl)-1-ethyl |
| 224 | 0 | — | NHCHO | O | OH | (S)-CH$_3$ | H | CH$_3$ | 1-(5-chloro-2H-isoindol-2-yl)-1-ethyl |
| 225 | 0 | — | NHCHO | O | OCOCH$_3$ | (S)-CH$_3$ | H | CH$_3$ | 1,2-diphenyl-1-cyclopropyl |
| 226 | 0 | — | NHCHO | O | OCH$_2$OCOi-Pr | (S)-CH$_3$ | H | CH$_3$ | 1,2-diphenyl-1-cyclopropyl |
| 227 | 0 | — | NHCHO | O | OH | (S)-CH$_3$ | H | CH$_3$ | 1,2-diphenyl-1-cyclopropyl |
| 228 | 0 | — | NHCHO | O | OCOCH$_3$ | (S)-CH$_3$ | H | CH$_3$ | 1-methyl-1-(4-fluoro)-phenyl-1-ethyl |
| 229 | 0 | — | NHCHO | O | OCH$_2$OCOi-Pr | (S)-CH$_3$ | H | CH$_3$ | 1-methyl-1-(4-fluoro)-phenyl-1-ethyl |
| 230 | 0 | — | NHCHO | O | OH | (S)-CH$_3$ | H | CH$_3$ | 1-methyl-1-(4-fluoro)-phenyl-1-ethyl |
| 231 | 0 | — | NHCHO | O | OCH$_2$SCH$_3$ | (S)-CH$_3$ | H | CH$_3$ | 1-(4-cloro)-phenyl-1-cyclopentyl |
| 232 | 0 | — | NHCHO | O | OCH$_2$OCOi-Pr | (S)-CH$_3$ | H | CH$_3$ | 1-(4-cloro)-phenyl-1-cyclopentyl |
| 233 | 0 | — | NHCHO | O | OH | (S)-CH$_3$ | H | CH$_3$ | 1-(4-cloro)-phenyl-1-cyclopentyl |
| 234 | 0 | — | NHCHO | O | OCOCH$_3$ | (S)-CH$_3$ | H | (S)-CH$_3$ | butoxycarbonyl |
| 235 | 0 | — | NHCHO | O | OCH$_2$OCOi-Pr | (S)-CH$_3$ | H | (S)-CH$_3$ | butoxycarbonyl |
| 236 | 0 | — | NHCHO | O | OH | (S)-CH$_3$ | H | (S)-CH$_3$ | butoxycarbonyl |
| 237 | 0 | — | NHCHO | O | OCOCH$_3$ | (S)-CH$_3$ | H | (S)-CH$_3$ | 2-ethyl-hexyloxycarbonyl |
| 238 | 0 | — | NHCHO | O | OCH$_2$OCOi-Pr | (S)-CH$_3$ | H | (S)-CH$_3$ | 2-ethyl-hexyloxycarbonyl |

TABLE 3-continued

| | | | | | | | | | |
|---|---|---|---|---|---|---|---|---|---|
| 239 | 0 | — | NHCHO | O | OH | (S)-CH$_3$ | H | (S)-CH$_3$ | 2-ethyl-hexyloxycarbonyl |
| 240 | 0 | — | NHCHO | O | OCOCH$_3$ | (S)-CH$_3$ | H | (S)-CH$_3$ | benzyloxycarbonyl |
| 241 | 0 | — | NHCHO | O | OCOCH$_3$ | (S)-CH$_3$ | H | (S)-CH$_3$ | (S)-1-[bis-(4-fluoro)-phenyl]-2-propoxycarbonyl |
| 242 | 0 | — | NHCHO | 0 | OCH$_2$OCOi-Pr | (S)-CH$_3$ | H | (S)-CH$_3$ | (S)-1-[bis-(4-fluoro)-phenyl]-2-propoxycarbonyl |
| 243 | 0 | — | NHCHO | O | OH | (S)-CH$_3$ | H | (S)-CH$_3$ | (S)-1-[bis-(4-fluoro)-phenyl]-2-propoxycarbonyl |
| 244 | 0 | — | NHCHO | O | OCH$_2$SCH$_3$ | (S)-CH$_3$ | H | (S)-CH$_3$ | Bis (4-Fluoro)-phenylmethyl |
| 245 | 0 | — | NHCHO | O | OCH$_2$SCH$_3$ | (S)-CH$_3$ | H | CH$_3$ | hexadecyloxycarbonyl |
| 246 | 0 | — | NHCHO | O | OCH$_2$SCH$_3$ | (S)-CH$_3$ | H | (S)-CH$_3$ | 1-(ethoxycarbonyl)-2-methyl-1-propyl |
| 247 | 0 | — | NHCHO | O | H | (S)-CH$_3$ | H | (S)-CH$_3$ | 3,7-dimethyloct-6-en-1-yloxycarbonyl |
| 248 | 0 | — | NHCHO | O | OH | (S)-CH$_3$ | H | (S)-CH$_3$ | benzyloxycarbonyl |
| 249 | 0 | — | NHCHO | O | OH | (S)-CH$_3$ | H | (S)-CH$_3$ | 1-heptyl |
| 250 | 0 | — | NHCHO | O | OCOCH$_3$ | (S)-CH$_3$ | H | (S)-CH$_3$ | 1-heptyl |
| 251 | 0 | — | NHCHO | O | OH | (S)-CH$_3$ | H | (R)-CH$_3$ | 1-heptyl |
| 252 | 0 | — | NHCHO | O | OCOCH$_3$ | (S)-CH$_3$ | H | (R)-CH$_3$ | 1-heptyl |
| 253 | 1 | 5-Cl | H | O | OCOCH$_3$ | (S)-CH$_3$ | H | (S)-CH$_3$ | Bis (4-Fluoro)-phenylmethyl |
| 254 | 0 | — | NHCHO | O | OCOOi-Bu | (S)-CH$_3$ | H | (S)-CH$_3$ | butoxycarbonyl |
| 255 | 0 | — | NHCHO | O | OCOOi-Bu | (S)-CH$_3$ | H | (S)-CH$_3$ | 2-ethyl-hexyloxycarbonyl |
| 256 | 0 | — | NHCHO | O | OH | (S)-CH$_3$ | H | CH$_3$ | Dicyclohexylmethyl |
| 257 | 0 | — | NHCHO | O | OH | (S)-CH$_3$ | H | CH$_3$ | 3,5-diethyl-4-heptyl |
| 258 | 0 | — | NHCHO | O | OH | (S)-CH$_3$ | H | (S)-CH$_3$ | diphenylmethyl |
| 259 | 0 | — | NHCHO | O | OH | (S)-CH$_3$ | H | (S)-CH$_3$ | Dicyclohexylmethyl |
| 260 | 0 | — | NHCHO | O | OH | (S)-CH$_3$ | H | (S)-CH$_3$ | 1-(4-fluoro-2-methyl)-phenyl-2-methyl-1-propyl |
| 261 | 0 | — | NHCHO | O | OH | (S)-CH$_3$ | H | (S)-CH$_3$ | 2-ethyl-1-phenyl-1-butyl |
| 264 | 0 | — | NHCHO | O | OH | | | (S)-CH$_3$ | Bis (4-Fluoro)-phenylmethyl |
| 265 | 0 | — | NHCHO | O | OH | | | (S)-CH$_3$ | Bis (4-Fluoro)-phenylmethyl |
| 266 | 0 | — | NHCHO | O | OCOCH$_3$ | (S)-CH$_3$ | H | (S)-CH$_3$ | benzyloxycrbonyl |
| 267 | 0 | — | NHCHO | O | OCOCH(CH$_3$)$_2$ | (S)-CH$_3$ | H | (S)-CH$_3$ | Bis (4-Fluoro)-phenylmethyl |
| 271 | 1 | 5-Cl | H | O | OH | (S)-CH$_3$ | H | (S)-CH$_3$ | Bis (4-Fluoro)-phenylmethyl |
| 273 | 0 | — | NHCHO | O | OH | (S)-CH | H | CH$_3$ | (1R,2R,5S)-5-methyl-2-(propan-2-yl)-cyclohexyloxycarbonyl |
| 274 | 0 | — | NHCHO | O | OCOCH$_3$ | (S)-CH$_3$ | H | CH$_3$ | (1R,2R,5S)-5-methyl-2-(propan-2-yl)-cyclohexyloxycarbonyl |
| 275 | 0 | — | NHCHO | O | OH | (S)-CH$_3$ | H | (S)-phenyl | benzyloxycrbonyl |
| 276 | 0 | — | NHCHO | O | OCOCH$_3$ | (S)-CH$_3$ | H | (S)-phenyl | benzyloxycrbonyl |
| 277 | 0 | — | NHCHO | O | OH | (S)-CH$_3$ | H | CH$_3$ | 2-phenyl-1-(isobutoxycarbonyl)-1-ethyl |
| 278 | 0 | — | NHCHO | O | OH | (S)-CH | H | (S)-CH$_3$ | 2-(4-fluoro)-phenyl-1-(isobutoxycarbonyl)-1-ethyl |
| 279 | 0 | — | NHCHO | O | OCOCH(CH$_3$)$_2$ | (S)-CH$_3$ | H | (S)-CH$_3$ | 2-(4-fluoro)-phenyl-1-(isobutoxycarbonyl)-1-ethyl |
| 280 | 0 | — | NHCHO | O | OCH$_2$OCOi-Pr | (S)-CH$_3$ | H | (S)-CH$_3$ | Bis (2-fluoro-4-methyl)-phenylmethyl |
| 281 | 0 | — | NHCHO | O | OH | (S)-CH | H | (S)-CH$_3$ | Bis (2-fluoro-4-methyl)-phenylmethyl |
| 282 | 0 | — | NHCHO | O | OCH$_2$OCOi-Pr | (S)-CH$_3$ | H | (S)-CH$_3$ | Bis (thiomethyl)-phenylmethyl |
| 283 | 0 | — | NHCHO | O | OH | (S)-CH$_3$ | H | (S)-CH$_3$ | Bis (4-thiomethyl)-phenylmethyl |

Specific examples of compounds having general formula (I) particularly preferred for their fungicidal activity are compounds wherein Y has the meaning of $Y^2$ and $R_d$, $R_c$, M, $R_1$, $R_2$, W, n, $R_a$ and $R_b$ have the meanings indicated in Table 4:

TABLE 4

(I)

| Comp. | n | $R_d$ | $R_c$ | W | M | $R_e$ | $R_f$ | $R^1$ | $R^2$ |
|---|---|---|---|---|---|---|---|---|---|
| 284 | 0 | — | NHCHO | O | OCOCH$_3$ | H | H | CH$_3$ | 1-heptyl |
| 285 | 0 | — | NHCHO | O | OCOCH$_3$ | CH$_3$ | CH$_3$ | CH$_3$ | -heptyl |
| 287 | 0 | — | NHCHO | O | OCOCH$_3$ | CH$_3$ | CH$_3$ | cicyclohexyl | cyclohexyl |
| 296 | 1 | 5-Me | NHCHO | O | OH | H | H | H | 3-cyclohexen-1-yl |
| 297 | 1 | 5-Me | NH$_2$ | O | OCOCH$_3$ | H | H | CH$_3$ | 2,4-dichlorophenyl |
| 298 | 1 | 5-Me | NHCHO | O | OCOCH$_3$ | H | H | CH$_3$ | 2,4-dichlorophenyl |
| 299 | 1 | 5-Me | NHCHO | O | OCOCH$_3$ | CH$_3$ | CH$_3$ | CH$_3$ | 2,4-dichlorophenyl |
| 300 | 1 | 5-t-butyl | NHCHO | O | OCOCH$_3$ | H | H | CH$_3$ | 3,5-ditrifluoromethylphenyl |
| 301 | 1 | 5-t-butyl | NHCHO | O | OH | H | H | CH$_3$ | 3,5-ditrifluoromethylphenyl |
| 302 | 1 | 5-t-butyl | NHCHO | O | OCH$_2$OCOi-Pr | CH$_3$ | CH$_3$ | CH$_3$ | 3,5-ditrifluoromethylphenyl |
| 303 | 1 | 5-t-butyl | NH$_2$ | O | OCOCH$_3$ | H | H | H | 1-octyl |
| 304 | 1 | 5-t-butyl | NHCHO | O | OCOCH$_3$ | H | H | H | 1-octyl |
| 307 | 0 | — | NHCHO | O | OH | CH$_3$ | CH$_3$ | H | 1-adamantyl |
| 308 | 0 | — | NHCHO | O | OCOOi-Bu | H | H | CH$_3$ | Dicyclohexylmethyl |
| 310 | 0 | — | NHCHO | O | OH | H | H | CH$_3$ | Dicyclohexylmethyl |
| 311 | 0 | — | NHCHO | O | OCOCH$_3$ | CH$_3$ | CH$_3$ | CH$_3$ | Dicyclohexylmethyl |
| 312 | 0 | — | NHCHO | O | OH | CH$_3$ | CH$_3$ | CH$_3$ | Dicyclohexylmethyl |
| 315 | 0 | — | NHCHO | O | OCOCH$_3$ | H | H | CH$_3$ | 1-cyclohexyl-2-methyl-1-propyl |
| 316 | 0 | — | NHCHO | O | OH | H | H | CH$_3$ | 1-cyclohexyl-2-methyl-1-propyl |
| 317 | 0 | — | NHCHO | O | OCOCH$_3$ | CH$_3$ | CH$_3$ | CH$_3$ | 1-cyclohexyl-2-methyl-1-propyl |
| 318 | 0 | — | NHCHO | O | OH | CH$_3$ | CH$_3$ | CH$_3$ | 1-cyclohexyl-2-methyl-1-propyl |
| 320 | 0 | — | NHCHO | O | OCOCH$_3$ | H | H | CH$_3$ | 3,5-diethyl-4-heptyl |
| 321 | 0 | — | NHCHO | O | OH | H | H | CH$_3$ | 3,5-diethyl-4-heptyl |
| 322 | 0 | — | NHCHO | O | OCOCH$_3$ | CH$_3$ | CH$_3$ | CH$_3$ | 3,5-diethyl-4-heptyl |
| 323 | 0 | — | NHCHO | O | OH | CH$_3$ | CH$_3$ | CH$_3$ | 3,5-diethyl-4-heptyl |
| 324 | 0 | — | NHCHO | O | OCH$_2$SCH$_3$ | CH$_3$ | CH$_3$ | (S)-CH$_3$ | diphenylmethyl |
| 327 | 0 | — | NHCHO | O | OH | CH$_3$ | CH$_3$ | (S)-CH$_3$ | diphenylmethyl |
| 328 | 0 | — | NHCHO | O | OCH$_2$SCH$_3$ | CH$_3$ | CH$_3$ | (S)-CH$_3$ | Bis (4-Fluoro)-phenylmethyl |
| 329 | 0 | — | NHCHO | O | OH | CH$_3$ | CH$_3$ | (S)-CH$_3$ | Bis (4-Fluoro)-phenylmethyl |
| 330 | 0 | — | NHCHO | O | OCH$_2$OCOi-Pr | H | H | (S)-CH$_3$ | Bis (4-Fluoro)-phenylmethyl |
| 331 | 0 | — | NHCHO | O | OH | H | H | (S)-CH$_3$ | Bis (4-Fluoro)-phenylmethyl |
| 332 | 0 | — | NHCHO | O | OCOOEt | CH$_3$ | CH$_3$ | (S)-CH$_3$ | Bis (4-Fluoro)-phenylmethyl |
| 333 | 0 | — | NHCHO | O | OCOCH$_3$ | H | H | (S)-CH$_3$ | Bis (2,4-difluoro)-phenylmethyl |
| 342 | 0 | — | NHCHO | O | OH | H | H | (S)-CH$_3$ | Bis (2,4-difluoro)-phenylmethyl |
| 347 | 0 | — | NHCHO | O | OCOCH$_3$ | H | H | (S)-CH$_3$ | Dicyclohexylmethyl |
| 348 | 0 | — | NHCHO | O | OH | H | H | (S)-CH$_3$ | Dicyclohexylmethyl |
| 349 | 0 | — | NHCHO | O | OCOCH$_3$ | CH$_3$ | CH$_3$ | (S)-CH$_3$ | Dicyclohexylmethyl |
| 350 | 0 | — | NHCHO | O | OH | CH$_3$ | CH$_3$ | (S)-CH$_3$ | Dicyclohexylmethyl |
| 351 | 0 | — | NHCHO | O | OCOCH$_3$ | H | H | (S)-CH$_3$ | 1-(4-fluoro-2-methyl)-phenyl-2-methyl-1-propyl |
| 352 | 0 | — | NHCHO | O | OH | H | H | (S)-CH$_3$ | 1-(4-fluoro-2-methyl)-phenyl-2-methyl-1-propyl |
| 353 | 0 | — | NHCHO | O | OCOCH$_3$ | CH$_3$ | CH$_3$ | (S)-CH$_3$ | 1-(4-fluoro-2-methyl)-phenyl-2-methyl-1-propyl |
| 354 | 0 | — | NHCHO | O | OH | CH$_3$ | CH$_3$ | (S)-CH$_3$ | 1-(4-fluoro-2-methyl)-phenyl-2-methyl-1-propyl |
| 355 | 0 | — | NHCHO | O | OCOCH$_3$ | H | H | (S)-CH$_3$ | 2-ethyl-1-phenyl-1-butyl |
| 356 | 0 | — | NHCHO | O | OH | H | H | (S)-CH$_3$ | 2-ethyl-1-phenyl-1-butyl |
| 357 | 0 | — | NHCHO | O | OCH$_2$SCH$_3$ | CH$_3$ | CH$_3$ | (S)-CH$_3$ | 2-ethyl-1-phenyl-1-butyl |
| 358 | 0 | — | NHCHO | O | OH | CH$_3$ | CH$_3$ | (S)-CH$_3$ | 2-ethyl-1-phenyl-1-butyl |
| 359 | 0 | — | NHCHO | O | OCOCH$_3$ | H | H | (S)-CH$_3$ | (4-fluoro-2-methyl)-phenyl-cyclopentylmethyl |
| 360 | 0 | — | NHCHO | O | OH | H | H | (S)-CH$_3$ | (4-fluoro-2-methyl)-phenyl-cyclopentylmethyl |
| 361 | 0 | — | NHCHO | O | OCOCH$_3$ | CH$_3$ | CH$_3$ | (S)-CH$_3$ | (4-fluoro-2-methyl)-phenyl-cyclopentylmethyl |
| 362 | 0 | — | NHCHO | O | OH | CH$_3$ | CH$_3$ | (S)-CH$_3$ | (4-fluoro-2-methyl)-phenyl-cyclopentylmethyl |
| 363 | 0 | — | NHCHO | O | OCOCH$_3$ | H | H | (S)-CH$_3$ | 1-cyclohexyl-2-methyl-1-propyl |
| 364 | 0 | — | NHCHO | O | OH | H | H | (S)-CH$_3$ | 1-cyclohexyl-2-methyl-1-propyl |

TABLE 4-continued

| | | | | | | | | | |
|---|---|---|---|---|---|---|---|---|---|
| 365 | 0 | — | NHCHO | O | OCOCH$_3$ | CH$_3$ | CH$_3$ | (S)-CH$_3$ | 1-cyclohexyl-2-methyl-1-propyl |
| 366 | 0 | — | NHCHO | O | OH | CH$_3$ | CH$_3$ | (S)-CH$_3$ | 1-cyclohexyl-2-methyl-1-propyl |
| 369 | 0 | — | NHCHO | O | OCOCH$_3$ | H | H | (S)-CH$_3$ | 3,5-diethyl-4-heptyl |
| 370 | 0 | — | NHCHO | O | OH | H | H | (S)-CH$_3$ | 3,5-diethyl-4-heptyl |
| 371 | 0 | — | NHCHO | O | OCOCH$_3$ | CH$_3$ | CH$_3$ | (S)-CH$_3$ | 3,5-diethyl-4-heptyl |
| 372 | 0 | — | NHCHO | O | OH | CH$_3$ | CH$_3$ | (S)-CH$_3$ | 3,5-diethyl-4-heptyl |
| 375 | 0 | — | NHCHO | O | OCOCH$_3$ | H | H | CH$_3$ | 1-(1,3-benzothiazol-2-yl)-1-ethyl |
| 376 | 0 | — | NHCHO | O | OCH$_2$OCOi-Pr | CH$_3$ | CH$_3$ | CH$_3$ | 1-(1,3- benzothiazol-2-yl)-1-ethyl |
| 377 | 0 | — | NHCHO | O | OH | CH$_3$ | CH$_3$ | CH$_3$ | 1-(1,3-benzothiazol-2-yl)-1-ethyl |
| 378 | 0 | — | NHCHO | O | OCOCH$_3$ | H | H | CH$_3$ | 1-(5-chloro-2H-isoindol-2-yl)-1-ethyl |
| 379 | 0 | — | NHCHO | O | OCOCH$_3$ | CH$_3$ | CH$_3$ | CH$_3$ | 1-(5-chloro-2H-isoindol-2-yl)-1-ethyl |
| 380 | 0 | — | NHCHO | O | OH | CH$_3$ | CH$_3$ | CH$_3$ | 1-(5-chloro-2H-isoindol-2-yl)-1-ethyl |
| 381 | 0 | — | NHCHO | O | OCOCH$_3$ | H | H | CH$_3$ | 1,2-diphenyl-1-cyclopropyl |
| 382 | 0 | — | NHCHO | O | OH | H | H | CH$_3$ | 1,2-diphenyl-1-cyclopropyl |
| 383 | 0 | — | NHCHO | O | OCOCH$_3$ | CH$_3$ | CH$_3$ | CH$_3$ | 1,2-diphenyl-1-cyclopropyl |
| 384 | 0 | — | NHCHO | O | OH | CH$_3$ | CH$_3$ | CH$_3$ | 1,2-diphenyl-1-cyclopropyl |
| 385 | 0 | — | NHCHO | O | OCOCH$_3$ | H | H | CH$_3$ | 1-methyl-1-(4-fluoro)-phenyl-1-ethyl |
| 386 | 0 | — | NHCHO | O | OH | H | H | CH$_3$ | 1-methyl-1-(4-fluoro)-phenyl-1-ethyl |
| 387 | 0 | — | NHCHO | O | OCOCH$_3$ | CH$_3$ | CH$_3$ | CH$_3$ | 1-methyl-1-(4-fluoro)-phenyl-1-ethyl |
| 388 | 0 | — | NHCHO | O | OH | CH$_3$ | CH$_3$ | CH$_3$ | 1-methyl-1-(4-fluoro)-phenyl-1-ethyl |
| 389 | 0 | — | NHCHO | O | OCOCH$_3$ | H | H | CH$_3$ | 1-(4-chloro)-phenyl-1-cyclopentyl |
| 390 | 0 | — | NHCHO | O | OH | H | H | CH$_3$ | 1-(4-chloro)-phenyl-1-cyclopentyl |
| 391 | 0 | — | NHCHO | O | OCOCH$_3$ | CH$_3$ | CH | CH$_3$ | 1-(4-chloro)-phenyl-1-cyclopentyl |
| 392 | 0 | — | NHCHO | O | OH | CH$_3$ | CH$_3$ | CH$_3$ | 1-(4-chloro)-phenyl-1-cyclopentyl |
| 393 | 0 | — | NHCHO | O | OCOCH$_3$ | H | H | (S)-CH$_3$ | butoxycarbonyl |
| 394 | 0 | — | NHCHO | O | OH | H | H | (S)-CH$_3$ | butoxycarbonyl |
| 395 | 0 | — | NHCHO | O | OH | CH$_3$ | CH$_3$ | (S)-CH$_3$ | butoxycarbonyl |
| 396 | 0 | — | NHCHO | O | OCOCH$_3$ | CH$_3$ | CH$_3$ | (S)-CH$_3$ | butoxycarbonyl |
| 397 | 0 | — | NHCHO | O | OCOCH$_3$ | CH$_3$ | CH$_3$ | (S)-CH$_3$ | 2-ethyl-hexyloxycarbonyl |
| 398 | 0 | — | NHCHO | O | OH | CH$_3$ | CH$_3$ | (S)-CH$_3$ | 2-ethyl-hexyloxycarbonyl |
| 399 | 0 | — | NHCHO | O | OCOCH$_3$ | H | H | (S)-CH$_3$ | 2-ethyl-hexyloxycarbonyl |
| 400 | 0 | — | NHCHO | O | OH | H | H | (S)-CH$_3$ | 2-ethyl-hexyloxycarbonyl |
| 401 | 0 | — | NHCHO | O | OCOCH$_3$ | H | H | (S)-CH$_3$ | (S)-1-[bis-(4-fluoro)-phenyl)]-2-propoxycarbonyl |
| 402 | 0 | — | NHCHO | O | OH | H | H | (S)-CH$_3$ | (S)-1-[bis-(4-fluoro)-phenyl)]-2-propoxycarbonyl |
| 403 | 0 | — | NHCHO | O | OH | CH$_3$ | CH$_3$ | (S)-CH$_3$ | (S)-1-[bis-(4-fluoro)-phenyl)]-2-propoxycarbonyl |
| 404 | 0 | — | NHCHO | O | OCOCH$_3$ | CH$_3$ | CH$_3$ | (S)-CH$_3$ | (S)-1-[bis-(4-fluoro)-phenyl)]-2-propoxycarbonyl |
| 405 | 0 | — | NHCHO | O | OH | H | H | CH$_3$ | 2-phenyl-1-(isobutoxycarbonyl)-1-ethyl |
| 406 | 0 | — | NHCHO | O | OH | CH$_3$ | CH$_3$ | CH$_3$ | 2-phenyl-1-(isobutoxycarbonyl)-1-ethyl |
| 407 | 0 | — | NHCHO | O | OH | H | H | (S)-CH$_3$ | 2-(4-fluoro)-phenyl-1-(isobutoxycarbonyl)-1-ethyl |
| 408 | 0 | — | NHCHO | O | OH | CH$_3$ | CH$_3$ | (S)-CH$_3$ | 2-(4-fluoro)-phenyl-1-(isobutoxycarbonyl)-1-ethyl |

The compounds having general formula (I) can be obtained using various synthetic methods; for example, for illustrative but non-limiting purposes, they can be prepared from the compounds having general formula (II) by reaction with an appropriate amine having formula (III) according to reaction scheme 1.

Scheme 1

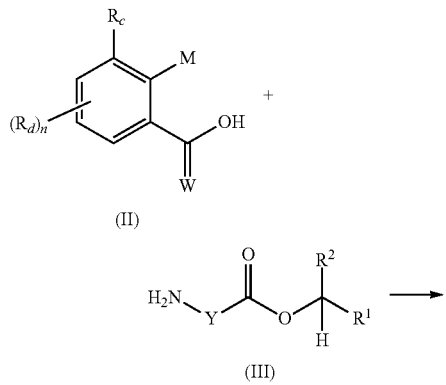

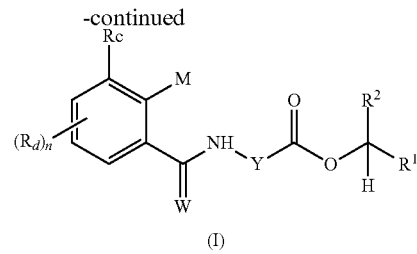

The reaction is carried out by activating the acid by means of the corresponding chloride, for example with thionyl chloride in dichloromethane or chloroform or by using a condensing agent such as N,N'-dicyclohexylcarbodiimide or N-(3-dimethylaminopropyl)-N'-ethylcarbodiimide in tetrahydrofuran or ethyl acetate, or using 1,1-carbonyldiimidazole in tetrahydrofuran or methylene chloride or PyBOP [(1-Benzotriazolyloxy)tripyrrolidinephosphonium hexafluorophosphate], HATU (1-[Bis(dimethylamino)methylene]-1H-1,2,3-triazole[4,5-b]pyridinium 3-oxide hexafluoro-phosphate) at a temperature ranging from 0° C. to the reflux temperature of the solvent used, as widely described in RC Larock "Comprehensive Organic Transformations".

The activated form of the acid, in the presence of the amine having formula (III) reacts in a suitable solvent such as methylene chloride, or dichloroethane, or chloroform at a temperature ranging from 0° C. to the reflux temperature of the solvent in the presence or in the absence of a base such as, for example, triethylamine or 4-dimethylaminopyridine or diisopropylethylamine to give the compounds having general formula (I), according to what is known in literature in R C Larock "*Comprehensive Organic Transformations*".

Alternatively, the compounds having general formula (I) can be obtained according to reaction scheme 2 hereunder. This synthesis route is necessary for compounds having general formula (I) wherein $R^3$ and $R^5$, the same as or different from each other, represent an aryl or a heteroaryl, said groups being optionally substituted with one or more $R_d$ groups the same as or different from each other, or wherein $R^3$ represents an aryl and $R^5$ represents an alkyl or a cycloalkyl, when M is the group $W^1$—$R_6$, (compounds Ia).

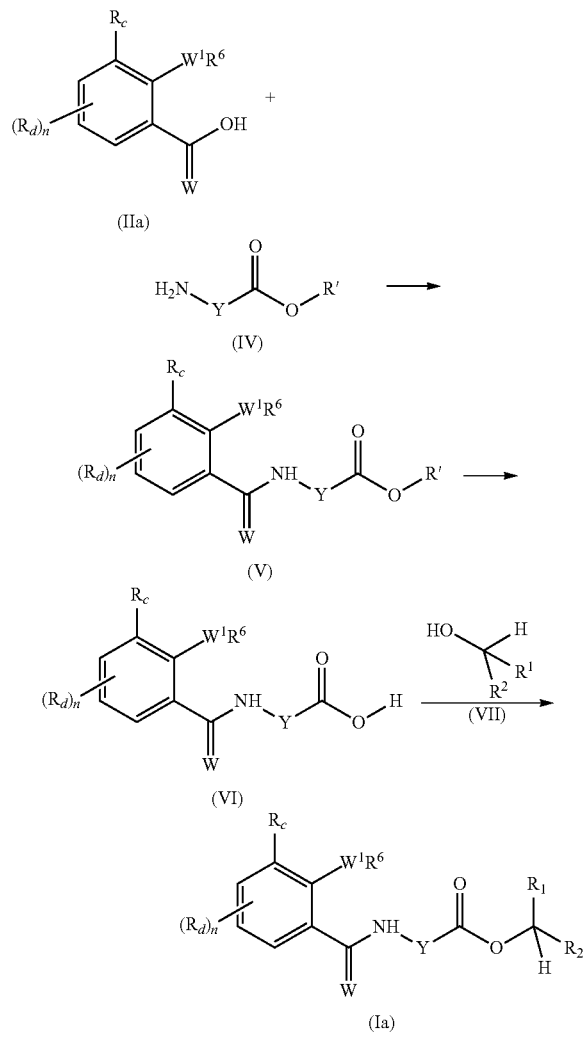

The reaction is carried out as described in scheme 1, the acid form having formula (IIa) activated according to what is indicated above, reacts in the presence of the amine having formula (IV), wherein R' has the meaning of $C_1$-$C_3$ alkyl, to give the compound having general formula (V). The latter is subjected to acid or basic hydrolysis to give compound (VI) which is condensed with a suitable alcohol having general formula (VII) in a suitable solvent such as methylene chloride, or dichloroethane, or chloroform, in the presence of a condensing agent such as N,N'-dicyclohexylcarbodiimide or N-(3-dimethylaminopropyl)-N'-ethylcarbodiimide in tetrahydrofuran or ethyl acetate, or by using 1,1-carbonyldiimidazole in tetrahydrofuran or methylene chloride at a temperature ranging from 0° C. to the reflux temperature of the solvent in the presence or absence of a base such as, for example, triethylamine or 4-dimethylaminopyridine or diisopropylethylamine as known in literature in R C Larock "*Comprehensive Organic Transformations*".

Alternatively, the compounds having general formula (I), with R, representing a formylamine group, a $C_1$-$C_{18}$-alkyl carbonyl group, a benzoyl group (compounds (Ic)), can be obtained according to reaction schemes 1 and 2 starting from the corresponding nitroderivatives (compounds having general formula (VIII)) and subsequent reduction reaction of the nitro group to give the amino derivatives having formula (Ib) which can be subjected to formylation, acylation or benzoylation reactions to give the compounds having general formula (Ic) wherein R" has the meaning of hydrogen or $C_1$-$C_{18}$ alkyl or aryl, according to reaction scheme 3:

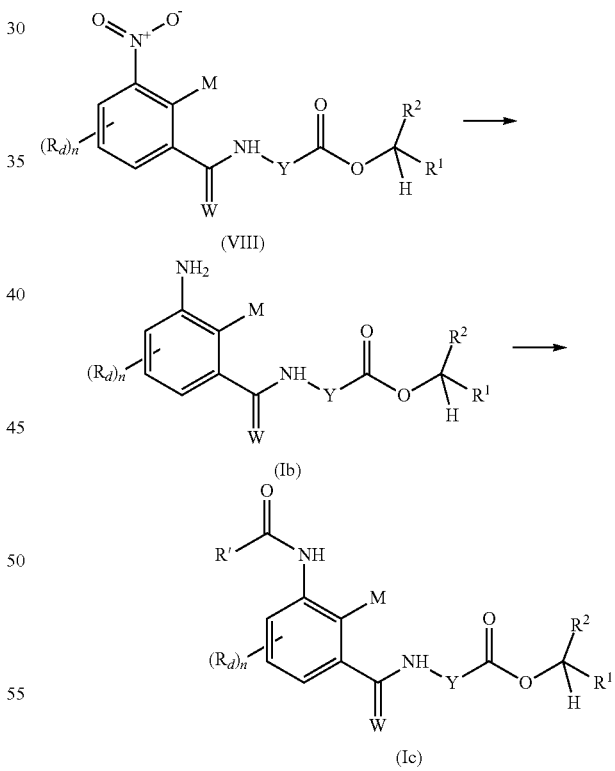

The reduction reaction of the nitro group can be carried out according to the usual methods well-known in the art and described in RC Larock "*Comprehensive Organic Transformations*", such as for example catalytic hydrogenation in the presence of catalysts such as, for example, Pd on 5% carbon or Pd on 10% carbon in a solvent such as methanol, ethanol or tetrahydrofuran, at atmospheric pressure or under pressure and at a temperature ranging from environmental values to 80° C., or with ammonium formate in methanol at atmospheric pressure and room temperature or with metallic iron and acetic acid in a hydroalcoholic mixture at temperatures ranging from environmental values to the reflux temperature of the reaction mixture, or with tin chloride in ethyl acetate at the reflux temperature of the solvent.

The formylation reaction of the amino group can be carried out according to the usual methods well-known in the art such as, for example, using a mixed anhydride obtained between formic acid and acetic anhydride in a solvent such as tetrahydrofuran or dioxane as described in Krishnamurthy S. "*Tetrahedron Letters*", 1982, vol. 23, pages 3315-3318, or in formamide at 150° C. as described in John Janetzko, Robert A. Batey, "*Journal of Organic Chemistry*", 2014, vol. 79, pages 7415-7424 or with zinc oxide and formic acid as described in Hosseini-Sarvari Mona, Sharghi Hashem, "*Journal of Organic Chemistry*", 2006, vol. 71 (17), pages 6652-6654 or cerium oxide and formic acid in the presence of ultrasounds as described in Sajadi S. Mohammad et al., "*Letters in Organic Chemistry*", 2014, vol.11, pages 49-54.

The acylation or benzoylation reactions of the amino group can be carried out according to the usual methods well-known in the art, using the desired acyl or benzoyl chloride in a solvent such as tetrahydrofuran or dioxane, at a temperature ranging from room temperature to the reflux temperature of the solvent selected, in the presence of a base such as for example calcium carbonate, sodium carbonate or sodium or potassium bicarbonate, as described for example in US2014/323720 or in "J. Medicinal Chemistry", 2012, Vol. 55, pages 9576-9588.

The compounds having general formula (I), when W represents a sulfur atom (compounds (Ie)), are obtained by sulfonating the corresponding amides having general formula (I) wherein W is oxygen (compounds (Id)), by reaction with $P_4S_{10}$ or with Lawesson's reagent, according to what is known in literature in R. Larock "*Comprehensive Organic Transformations*" and according to reaction scheme 4:

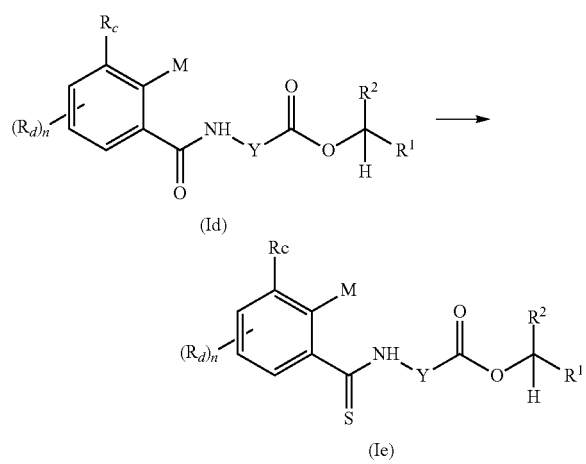

The compounds having general formula (I) wherein M represents the group $W^1$—$R^6$ with $R^6$ having the meaning of a $COR^7$ group or a $CH_2OCOR^7$ group (compounds (Ig)), are obtained by acylation or alkylation reaction of the corresponding compounds having general formula (I) wherein $R^6$ represents a hydrogen atom (compounds (If)), using a reagent having general formula L—$R^6$, with $R^6$ other than hydrogen and L which represents an outgoing group such as a halogen, a mesylate or a triflate, in the case of alkylation reactions, or with L which represents a chlorine atom in the case of acylation reactions, in ethyl acetate or N,N-dimethylformamide or acetone at a temperature ranging from −15° C. to 70° C., in the presence of an organic or inorganic base such as potassium carbonate or sodium carbonate, triethylamine, pyridine or sodium hydride, in the presence or absence of a catalyst such as sodium iodide, potassium iodide and a crown ether such as 15-crown-5 or 18-crown-6, according to methods well-known in literature and described, for example, in WO2016/109257 and represented in the reaction scheme 5

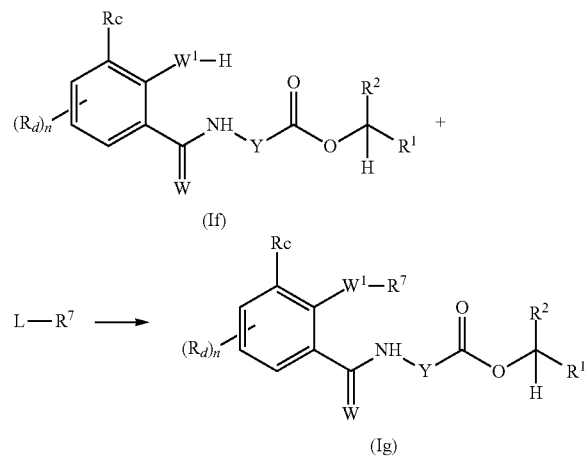

The compounds having formula (III) can be prepared according to the well-known synthesis methods of esters of amino acids, as described in M. Bodanszky, A. Bodanszky "*The Practice of Peptide Synthesis*", 1984, Springer-Verlag.

The alcohols having general formula (VII), when they are not commercial products, can be easily obtained by reducing the corresponding ketones with hydrides such as sodium borohydride, lithium aluminium hydride in suitable solvents such as tetrahydrofuran or dioxane, at a temperature ranging from 0° C. to the boiling point of the solvent according to methods known in literature as described in E. Tadashi, U. Norichika, Y. Masataka, et al. "Tetrahedron", 2009, vol. 65, pages 9583-9591, or in WO2016/109257 or with methods easily available in the Reaxys Database (www.reaxys.com).

The present invention also relates to the use of compounds having formula (I) for the control of phytopathogenic fungi of agricultural crops.

The compounds having general formula (I) are in fact endowed with a very high fungicidal activity that is expressed against numerous phytopathogenic fungi that attack important agricultural crops.

Examples of phytopathogenic fungi that can be effectively treated and fought against with the compounds having general formula (I) are those belonging to the classes of Basidiomycetes, Ascomycetes, Deuteromycetes or imperfect mushrooms, Oomycetes: *Puccinia* spp., *Ustilago* spp., *Tilletia* spp., *Uromyces* spp., *Phakopsora* spp., *Rhizoctonia* spp., *Eryiphe* spp., *Sphaerotheca* spp., *Podosphaera* spp., *Uncinula* spp., *Helminthosporium* spp., *Rhynchosporium* spp., *Pyrenophora* spp., *Monilinia* spp., *Sclerotinia* spp., *Septoria* spp. (*Mycosphrella* spp.), *Venturia* spp., *Botrytis* spp., *Alternaria* spp., *Fusarium* spp., *Cercospora* spp., *Cer-*

*cosporella herpotrichoides, Colletotrichum* spp., *Pyricularia oryzae, Sclerotium* spp., *Phytophtora* spp., *Pythium* spp., *Plasmopara viticola, Peronospora* spp., *Pseudoperonospora cubensis, Bremia lactucae*.

The main crops that can be protected with the compounds according to the present invention comprise cereals (wheat, barley, rye, oats, rice, corn, sorghum, etc.), fruit-trees (apples, pears, plums, peaches, almonds, cherries, bananas, vines, strawberries, raspberries, blackberries, etc.), citrus fruits (oranges, lemons, mandarins, grapefruit, etc.), legumes (beans, peas, lentils, soybeans, etc.), vegetables (spinach, lettuce, asparagus, cabbage, carrots, onions, tomatoes, potatoes, eggplants, peppers, etc.), cucurbits (pumpkins, courgettes, cucumbers, melons, watermelons, etc.), oleaginous plants (sunflower, rapeseed, peanut, castor, coconut, etc.), tobacco, coffee, tea, cocoa, sugar beet, sugar cane, cotton.

In particular, the compounds having formula (I) have proved to be extremely effective in the control of *Plasmopara viticola* on grapevines, *Phytophtora infestans* and *Botrytis cinerea* on tomatoes, *Puccinia recondita, Erisiphae graminis, Helminthosporium teres, Septoria nodorum, Septoria tritici* and *Fusarium* spp. on cereals, in the control of *Phakopsora pachyrhizi* on soybeans, in the control of *Uromyces appendiculatus* on beans, in the control of *Venturia inaequalis* on apple-trees, in the control of *Sphaerotheca fuliginea* on cucumbers.

Furthermore, the compounds having general formula (I) are also effective in the control of phytopathogenic bacteria and viruses, such as for example *Xanthomonas* spp., *Pseudomonas* spp., *Erwinia amylovora*, the tobacco mosaic virus.

The compounds having formula (I) are capable of exerting a fungicidal action of both a curative and preventive nature and show an extremely low or zero phytotoxicity with respect to the crops treated.

For practical uses in agriculture, it is often preferable to use fungicidal compositions containing the compounds according to the present invention suitably formulated.

The present invention also relates to fungicidal compositions comprising one or more compounds having formula (I), a solvent and/or solid or liquid diluent, possibly a surfactant.

The above-mentioned fungicidal compositions can be in the form of dry powders, wettable powders, emulsifiable concentrates, emulsions, micro-emulsions, pastes, granules, granules dispersible in water, solutions, suspensions, etc.: the choice of the type of composition depends on the specific use.

The fungicidal compositions are prepared according to known methods, for example by diluting or dissolving the active substance with a solvent medium and/or a solid or liquid diluent, possibly in the presence of surfactants.

Silica, kaolin, bentonite, talc, diatomaceous earth, dolomite, calcium carbonate, magnesia, gypsum, clays, synthetic silicates, attapulgite, seppiolite, can be used, for example, as solid diluents, or carriers.

Solvents or liquid diluents that can be used are for example, in addition to water, aromatic organic solvents (xylols or blends of alkyl benzenes, chlorobenzene, etc.), paraffins (petroleum fractions), alcohols (methanol, propanol, butanol, octanol, glycerin, etc.), esters (ethyl acetate, isobutyl acetate, alkyl carbonates, alkyl esters of adipic acid, alkyl esters of glutaric acid, alkyl esters of succinic acid, alkyl esters of lactic acid, etc.), vegetable oils (rapeseed oil, sunflower oil, soybean oil, castor oil, corn oil, peanut oil, and their alkyl esters), ketones (cyclohexanone, acetone, acetophenone, isophorone, ethylamylketone, etc.), amides (N,N-dimethylfomiamide, N-methylpyrrolidone, etc.), sulfoxides and sulfones (dimethyl sulfoxide, dimethylsulfone, etc.), and mixtures thereof.

Propellant gases such as butane, propane,halogenated hydrocarbons, nitrogen or carbon dioxide can be used as liquefied diluents or liquefied substances which gasify at room temperature and pressure.

Surfactants that can be used are sodium, calcium, potassium, triethylamine or triethanolamine salts of alkylnaphthalenesulfonates, poly-naphthalenesulfonates, alkylsulfonates, arylsulfonates, alkylaryisulfon tes, polycarboxylates, sulfosuccinates,alkyl-sulfosuccinates, lignin sulfonates, alkyl sulfates; and furthermore polyethoxylated fatty alcohols, polyethoxylated, alkylphenols, polyethoxylated or polypropoxy-polyethoxylated arylphenols or polyethoxylated, polyproproxy-polyethoxylated esters of sorbitol (block polymers), can also be used.

The fungicidal compositions can also contain special additives for particular purposes, for example antifreeze agents such as propylene glycol, or adhesion agents such as arabic gum, polyvinyl alcohol, polyvinylpyrrolidone, dispersing agents, for example lignin and its salts, cellulose derivatives or alginates, or stabilizers, for example antioxidants or ultraviolet-ray absorbents.

The concentration of active compound having formula (I) in the above compositions can vary within a wide range and depends on various factors. It varies in relation to the active compound having formula (I), the applications for which said compositions are destined, the environmental conditions and type of formulation adopted. In general, the concentration of active compound having formula (I) ranges from 0.1 to 90% by weight with respect to the total weight of the composition, preferably from 0.5 to 90% by weight.

If desired, it is possible to add to the fungicidal compositiors containing the compounds having general formula (I), other active ingredients compatible with the same, such as fungicides other than those having general formula (I), phytoregulators, antibiotics, herbicides, insecticides, fertilizers, biostimulants and/or mixtures thereof.

Examples of fungicides different from those having general formula (I) which can be included in the fungicidal compositions object of the present invention are: acibenzolar, aldimorph, ametoctradin, aminopyrifen, amisulbrom, ampropylfos, anilazine, azaconazole, azithiram, azoxystrobin, benalaxyl, benalaxyl-M, benodanil, benomyl, benquinox, bentaluron, benthiavalicarb, benthoxazin, benzamacril, benzamorf, benzovindiflupyr, binapacryl, bitertanol, bixafen, blasticidin-S, boscalid, bromuconazole, bupirimate, buthiobate, captafol, captan, carbamorph, carbendazim, carboxin, carpropamid, chinomethionat, chlobenthiazone, chlorfenazole, chloroneb, chlorothalonil, chlorquinox, chlozolinate, cufraneb, coumoxystrobin, cyazofamid, cycloheximide, cyflufenamid, cymoxanil, cypendazole, cyproconazole, cyprodinil, dazomet, debacarb, decafentin, dichlobentiazox, dichlofluanid, dichlone, dichlorophen, dichlozoline, diclobutrazol, diclomezine, dicloran, diclocymet, diethofencarb, difenoconazole, diflumetorim, dimethirimol, dimethomorph, dimoxystrobin, diniconazole, dinobuton, dinocap, dipymetitrone, dinocton, dinopenton, dinosulfon, dinoterbon, dipyrithione, ditalimfos, dithianon, dodemorph, dodine, edifenphos, enoxastrobin, epoxiconazole, etaconazole, ethaboxam, ethirimol, ethoxyquin, etridiazole, famoxadone, fenamidone, fenaminstrobin, fenaminosulf, fenapanil, fenarimol, fenbuconazole, fenfuram, fenhexamid, fenoxanil, fenpiclonil, fenpicoxamid, fenpropidin, fenpropimorph, fenpyrazamine, fentin, ferbam, ferimzone, florylpicoxamid, fluazinam, fludioxonil, fluindapyr, flufenoxystrobin, flumetover, flumorph, fluopicolide, fluopyram, fluoroimide, fluopimomide, fluotrimazole, fluoxapiprolin, fluoxastrobin, fluquinconazole, flusilazole, flusulfamide, flutianil, flutolanil, flutriafol, fluxapyroxad, folpet, fosetyl-aluminium, fuberidazole, furalaxyl, furametpyr, furcarbanil, furconazole, furconazole-cis, furophanate, guazatine, griseofulvin, halacrinate, hexaconazole, hexylthiofos, hymexazol, hydroxyquinoline sulfate, imazalil, imibenconazole, iminoctadine, inpyrfluxam, ipconazole, ipfentrifluconazole, ipfufenoquin, iprobenfos, iprodione, iprovalicarb, isofetamid, isoflucypram, isoprothiolane, isopyrazam, isotianil, isovaledione, kasugamycin, kresoxim-methyl, mancopper, mancozeb, mandestrobin, mandipropamid, maneb, mebenil, mecarbinzid, mefentrifluconazole, mepanipyrim, mepronil, meptyldinocap, metalaxyl, metalaxyl-M, metam, metconazole, methasulfocarb, methfuroxam, metyltetraprole, metiram, metominostrobin, metrafenone, metsulfovax, myclobutanil, myclozolin, nabam, natamycin, nicobifen, nitrothal-isopropyl, nuarimol, octhilinone, ofurace, orysastrobin, oxadixyl, oxathiapiprolin, oxpoconazole, oxycarboxin, pefurazoate, penconazole, pencycuron, penflufen, pentachlorofenol and its salts, penthiopyrad, phthalide, picarbutrazox, picoxystrobin, piperalin, Bordeaux mixture, polyoxins, probenazole, prochloraz, procymidone, propamocarb, propiconazole, propineb, proquinaz, prothiocarb, prothioconazole, pydiflumetophen, pyracarbolid, pyraclostrobin, pyrametostrobin, p yraoxy s trob in, pyrapropoyne, pyraziflumid, pyrazophos, pyribencarb, pyridaclomethyl, pyrifenox, pyrimethanil, pyriminostrobin, pyriofenone, pyrisoxazole, pyroquilon, pyroxyfur, quinacetol, quinazamid, quinconazole, quinofumelin, quinoxyfen, quintozene, rabenzazole, copper hydroxide, copper oxychloride, copper (I) oxide, copper sulfate, sedaxane, silthiofam, simeconazole, spiroxamine, streptomycin, tebuconazole, tebufloquin, tetraconazole, thiabendazole, thiadifluor, thicyofen, thifluzamide, thiochlorfenphim, thiophanate, thiophanate-methyl, thioquinox, thiram, tiadinil, tioxymid, tolclofos-methyl, tolprocarb, tolylfluanid, triadimefon, triadimenol, triamiphos, triarimol, triazbutil, triazoxide, triclopyricarb, tricyclazole, tridemorf, trifloxystrobin, triflumizole, triforine, triticonazole, uniconazole, uniconazole-P, validamycin, valifenalate, vinclozolin, zineb, ziram, sulfur, zoxamide.

The present invention therefore also relates to fungicidal compositions comprising at least one compound having general formula (I) and at least one other fungicide other than the compounds having formula (I).

Fungicidal compositions containing at least one compound having formula (I) and one or more known fungicides, particularly preferred for the particularly wide spectrum of action and a mafked synergistic effect, are those wherein one or more compounds having general formula (I) are combined with one or more known fungicides belonging to the following classes:

a) azoles selected from azaconazole, bitertanol, bromuconazole, cyproconazole, difenoconazole, epoxyconazole, fenbuconazole, fluquinconazole, flusilazole, flutriafol, hexaconazole, imazalil, ipconazole, metconazole, myclobutanil, penconazole, propiconazole, prochloraz, prothioconazole, simeconazole, tebuconazole, tetraconazole, triadimefon, triadimenol, triflumizole, triticonazole;

b) amines, ergosterol biosynthesis inhibitors selected from aldimorph, dodemorph, fenpropimorph, fenpropidin, spiroxamine, tridemorph;

c) succinate-dehydrogenase inhibitors (SDHI) selected from benzovindiflupyr, bixafen, boscalid, carboxin, fluindapyr, fluopyram, flutolanil, fluxapyroxad, furametpyr, isopyrazam, oxycarboxin, penflufen, penthiopyrad, sedaxane, thifluzamide.

d) strobilurins selected from azoxystrobin, dimoxystrobin, fluoxastrobin, kresoxim-methyl, metominostrobin, orysastrobin, picoxystrobin, pyraclostrobin, pyrametostrobin, pyraoxostrobin, trifloxystrobin;

e) specific antioidic compounds selected from cyflufenamid, flutianil, metrafenone, proquinazid, pyriofenone, quinoxyfen;

f) aniline-pyramidines selected from pyrimethanil, mepanipyrim, cyprodinil;

g) benzimidazoles and analogues thereof selected from carbendazim, benomyl, thiabendazole, thiophanate-methyl;

h) dicarboxyimides selected from iprodione, procymidone;

i) phtalimides selected from captafol, captan, folpet;

l) systemic acquired resistance (SAR) inducers selected from acibenzolar, probenazole, isotianil, tiadinil;

m) phenylpyrroles selected from fenpiclonil, fludioxonil;

n) acylalanines selected from benalaxyl, benalaxyl-M, furalaxyl, metalaxyl, metalaxyl-M;

o) other specific antiperonosporic compounds selected from ametoctradin, amisulbrom, benthiavalicarb, cyazofamid, cymoxanil, dimethomorph, ethaboxam, famoxadone, fenamidone, flumetover, flumorph, fluopicolide, iprovalicarb, mandipropamid, oxathiapiproline, valifenalate, zoxamide.

p) dithiocarbamates selected from maneb, mancozeb, propineb, zineb, metiram;

q) phosphorus acid and its inorganic or organic salts, fosetyl-aluminium;

r) cupric compounds selected from Bordeaux mixture, carpropamid, copper hydroxide, copper oxychloride, copper sulfate, copper salicylate;

s) other fungicides selected from chlorothalonil, fenhexamid, fenpyrazamine, fluazinam, silthiofam, tebufloquin, zoxamide, dodine, guazatine, iminoctadine, tolclofos-methyl.

The fungicidal compounds are indicated in the present description with their international ISO name; the chemical structures and their CAS and IUPAC names are reported in Alan Wood's Website (www.alanwood.net), Compendium of Pesticide Common Names; the chemical-physical data and biological characteristics of most of these compounds are indicated in the "Pesticide Manual", C.D.S. Tomlin, 15th edition. 2009, British Crop Production Council.

The compound Fluindapyr is described in patent application WO 2012/084812.

Preferred compositions containing at least one compound having formula (Ia) (component A) and at least one other known fungicide are the following wherein the compound having formula (Ia) is compound 46, 156, 165 or 249:

C1: compound 46+tetraconazole;
C2: compound 46+tebuconazole;
C3: compound 46+epoxyconazole;
C4: compound 46+prothioconazole;
C5: compound 46+difenoconazole;
C6: compound 46+penconazole;
C7: compound 46+prochloraz;
C8: compound 46+fenpropimorph;
C9: compound 46+spiroxamine;
C10: compound 46+bixafen;
C11: compound 46+boscalid;

C12: compound 46+carboxin;
C13: compound 46+fluopyram;
C14: compound 46+fluxapyroxad;
C15: compound 46+isopyrazam;
C16: compound 46+penthiopyrad;
C17: compound 46+sedaxane;
C18: compound 46+azoxystrobin;
C19: compound 46+dimoxystrobin;
C20: compound 46+fluoxastrobin;
C21: compound 46+kresoxim-methyl;
C22 compound 46+picoxystrobin;
C23: compound 46+pyraclostrobin;
C24: compound 46+trifloxystrobin;
C25: compound 46+metrafenone;
C26: compound 46+proquinazid;
C27: compound 46+mepanipyrim;
C28: compound 46+cyprodinil;
C29: compound 46+iprodione;
C30: compound 46+procymidone;
C31: compound 46+carbendazim;
C32: composto 46+thiophanate-methyl;
C33: compound 46+fluindapyr;
C34: compound 46+benalaxyl-M;
C35: compound 46+fenpyrazamine;
C36: compound 46+fluazinam;
C37: compound 46+tolclofos-methyl;
C38: compound 46+mandipropamid;
C39: compound 46+copper oxychloride;
C40: compound 46+copper salicylate;
C41: compound 46+chlorothalonil;
C42: compound 46+cimoxanil;
C43: compound 46+dimetomorph;
C44: compound 46+oxathiopiproline;
C45: compound 46+fluopicolide;
C46: compound 156+tetraconazole;
C47: compound 156+tebuconazole;
C48: compound 156+epoxyconazole;
C49: compound 156+prothioconazole;
C50: compound 156+difenoconazole;
C51: compound 156+penconazole;
C52: compound 156+prochloraz;
C53: compound 156+fenpropimorph;
C54: compound 156+spiroxamine;
C55: compound 156+bixafen;
C56: compound 156+boscalid;
C57: compound 156+carboxin;
C58: compound 156+fluopyram;
C59: compound 156+fluxapyroxad;
C60: compound 156+isopyrazam;
C61: compound 156+penthiopyrad;
C62: compound 156+sedaxane;
C63: compound 156+azoxystrobin;
C64: compound 156+dimoxystrobin;
C65: compound 156+fluoxastrobin;
C66: compound 156+kresoxim-methyl;
C67: compound 156+picoxystrobin;
C68: compound 156+pyraclostrobin;
C69: compound 156+trifloxystrobin;
C70: compound 156+metrafenone;
C71: compound 156+proquinazid;
C72: compound 156+mepanipyrim;
C73: compound 156+cyprodinil;
C74: compound 156+iprodione;
C75: compound 156+procymidone;
C76: compound 156+carbendazim;
C77: compound 156+thiophanate-methyl;
C78: compound 156+fluindapyr;
C79: compound 156+benalaxyl-M;
C80: compound 156+fenpyrazamine;
C81: compound 156+fluazinam;
C82: compound 156+tolclofos-methyl;
C83: compound 156+mandipropamid;
C84: compound 156+copper oxychloride;
C85: compound 156+copper salicylate;
C86: compound 156+chlorothalonil;
C87: compound 156+cimoxanil;
C88: compound 156+dimetomorph;
C89: compound 156+oxathiopiproline;
C90: compound 156+fluopicolide;
C91: compound 156+zoxamide;
C92: compound 156+ametoctradin;
C93: compound 156+metiram;
C94: compound 156+potassium phosphite;
C95 compound 165+tetraconazole;
C96: compound 165+tebuconazole;
C97: compound 165+epoxyconazole;
C98: compound 165+prothioconazole;
C99: compound 165+difenoconazole;
C100: compound 165+penconazole;
C101: compound 165+prochloraz;
C102: compound 165+fenpropimorph;
C103: compound 165+spiroxamine;
C104: compound 165+bixafen;
C105: compound 165+boscalid;
C106: compound 165+carboxin;
C107: compound 165+fluopyram;
C108: compound 165+fluxapyroxad;
C109: compound 165+isopyrazam;
C110: compound 165+penthiopyrad;
C111: compound 165+sedaxane;
C112: compound 165+azoxystrobin;
C113: compound 165+dimoxystrobin;
C114: compound 165+fluoxastrobin;
C115: compound 165+kresoxim-methyl;
C116: compound 165+picoxystrobin;
C117: compound 165+pyraclostrobin;
C118: compound 165+trifloxystrobin;
C119: compound 165+metrafenone;
C120: compound 165+proquinazid;
C121: compound 165+mepanipyrim;
C122: compound 165+cyprodinil;
C123: compound 165+iprodione;
C124: compound 165+procymidone;
C125: compound 165+carbendazim;
C126: compound 165+thiophanate-methyl;
C127: compound 165+fluindapyr;
C128: compound 165+benalaxyl-M;
C129: compound 165+fenpyrazamine;
C130: compound 165+fluazinam;
C131: compound 165+tolclofos-methyl;
C132: compound 165+mandipropamid;
C133: compound 165+copper oxychloride;
C134: compound 165+copper salicylate;
C135: compound 165+chlorothalonil;
C136: compound 165+cimoxanil;
C137: compound 165+dimetomorph;
C138: compound 165+oxathiopiproline;
C139: compound 165+fluopicolide;
C140: compound 249+tetraconazole;
C141: compound 249+tebuconazole;
C142: compound 249+epoxyconazole;
C143: compound 249+prothioconazole;
C144: compound 249+difenoconazole;
C145: compound 249+penconazole;

C146: compound 249+prochloraz;
C147: compound 249+fenpropimorph;
C148: compound 249+spiroxamine;
C149: compound 249+bixafen;
C150: compound 249+boscalid;
C151: compound 249+carboxin;
C152: compound 249+fluopyram;
C153: compound 249+fluxapyroxad;
C154: compound 249+isopyrazam;
C155: compound 249+penthiopyrad;
C156: compound 249+sedaxane;
C157: compound 249+azoxystrobin;
C158: compound 249+dimoxystrobin;
C159: compound 249+fluoxastrobin;
C160: compound 249+kresoxim-methyl;
C161: compound 249+picoxystrobin;
C162: compound 249+pyraclostrobin;

C201: compound 165+pyraclostrobin+epoxyconazole;
C202: compound 165+azoxystrobin+fluindapyr;
C203: compound 165+pyraclostrobin+fluindapyr;
C204: compound 165+fosetyl-aluminium+copper oxychloride;
C205: compound 165+fosetyl-aluminium+copper salicylate;
C206: compound 165+fluindapyr+tetraconazole;
C207: compound 165+tetraconazole+azoxystrobin;
C208: compound 165+pyraclostrobin+tetraconazole;
C209: compound 165+azoxystrobin+fluindapyr;
C210: compound 165+fluindapyr+tetraconazole.

Component A, i.e, the compounds having general formula (I), of the previous compositions C1-C210 are described and exemplified in Table 5 and these are specifically the following compounds having general formula (I) wherein the substituents have the meanings indicated hereunder:

TABLE 5

| Comp. | n | $R_d$ | $R_c$ | W | M | $R_a$ | $R_b$ | $R^1$ | $R^2$ |
|---|---|---|---|---|---|---|---|---|---|
| 46 | 0 | — | NHCHO | O | OH | (S)—$CH_3$ | H | $CH_3$ | 1-heptyl |
| 156 | 0 | — | NHCHO | O | $OCH_2OCOi$-Pr | (S)—$CH_3$ | H | (S)—$CH_3$ | Bis (4-Fluoro)-phenylmethyl |
| 165 | 0 | — | NHCHO | O | OH | (S)—$CH_3$ | H | (S)—$CH_3$ | Bis (4-Fluoro)-phenylmethyl |
| 249 | 0 | — | NHCHO | O | OH | (S)—$CH_3$ | H | (S)—$CH_3$ | 1-heptyl |

C163: compound 249+trifloxystrobin;
C164: compound 249+metrafenone;
C165: compound 249+proquinazid;
C166: compound 249+mepanipyrim;
C167: compound 249+cyprodinil;
C168: compound 249+iprodione;
C169: compound 249+procymidone;
C170: compound 249+carbendazim;
C171: compound 249+thiophanate-methyl;
C172: compound 249+fluindapyr;
C173: compound 249+benalaxyl-M;
C174: compound 249+fenpyrazamine;
C175: compound 249+fluazinam;
C176: compound 249+tolclofos-methyl;
C177: compound 249+mandipropamid;
C178: compound 249+copper oxychloride;
C179: compound 249+copper salicylate;
C180: compound 249+chlorothalonil;
C181: compound 249+cimoxanil;
C182: compound 249+dimetomorph;
C183: compound 249+oxathiopiproline;
C184: compound 249+fluopicolide;
C185: compound 46+tetraconazole+azoxystrobin,
C186: compound 46+pyraclostrobin+tetraconazole;
C187: compound 46+epoxyconazole+azoxystrobin;
C188: compound 46+pyraclostrobin+epoxyconazole;
C189: compound 46+azoxystrobin+fluindapyr;
C190: compound 46+pyraclostrobin +fluindapyr;
C191: compound 46+fosetyl-aluminium+copper oxychloride;
C192: compound 46+fosetyl-aluminium+copper salicylate;
C193: compound 46+fluindapyr+tetraconazole;
C194: compound 46+tetraconazole+azoxystrobin;
C195: compound 46+pyraclostrobin+tetraconazole;
C196: compound 46+azoxystrobin+fluindapyr;
C197: compound 46+fluindapyr+tetraconazole;
C198: compound 165+tetraconazole+azoxystrobin,
C199: compound 165+pyraclostrobin+tetraconazole;
C200: compound 165+epoxyconazole+azoxystrobin;

The synergistic effect of the compositions containing a compound having general formula (I) (component A) and a known fungicide (component B), can be evaluated by applying the Colby formula ("Weeds, 1967, 15, pages 20-22):

$$E_t = E_A + E_B - (E_A \times E_B):100$$

wherein Et is the percentage of expected effectiveness for the composition containing compounds A acrd B at the doses $d_A + d_B$, $E_A$ is the percentage of effectiveness observed for component A at the dose $d_A$, $E_B$ is the percentage of effectiveness observed for component B at the dose $d_B$.

When the effectiveness observed for the composition A+B ($E_A + E_B$) is higher than expected effectiveness according to the Colby formula ($E_{A+B}/E_t > 1$), there is a synergistic effect. In the case of ternary combinations, the Colby formula has the form:

$$E_t = E_A + E_{B1} + E_{B2} - (E_A \times E_{B1} + E_A \times E_{B2} + E_{B1} \times E_{B2})/100$$

werein $E_t$ is the percentage of expected effectiveness for the composition containing compounds A, B1 and B2 at the doses $d_A + d_{B1} + d_{B2}$, $E_A$ is the percentage of effectiveness observed for component A at the dose $d_A$, EB1 is the percentage of effectiveness observed for component B1 at the dose $d_{B1}$, $E_{B2}$ is the percentage of effectiveness observed for component B2 at the dose $d_{B2}$.

When the effectiveness observed for the composition A+B1+B2 ($E_A + E_{B1} + E_{B2}$) is higher than the expected effectiveness according to the Colby formula ($E_{A+B1+B2}/E_t > 1$), there is a synergistic effect.

The present invention therefore also relates to the use of the compositions comprising at least one compound having general formula (I) for the control of phytopathogenic fungi in agricultural crops.

The main crops which can be protected with the compositions comprising at least one compound having formula (1), alone or combined with at least one other known active ingredient, comprise cereals (wheat, barley, rye, oats, rice, corn, sorghum, etc.), fruit-trees (apples, pears, plums, peaches, almonds, cherries, bananas, grape-vines, strawberries, raspberries, blackberries, etc.), citrus fruit (oranges, lemons, mandarins, grapefruit, etc.), legumes (beans, peas, lentils, soybeans, etc.), vegetables (spinach, lettuce, asparagus, cabbage, carrots, onions, tomatoes, potatoes, eggplants, peppers, etc.), cucurbits (pumpkins, zucchini, cucumbers, melons, watermelons, etc.), oleaginous plants (sunflower, rapeseed, peanut, castor, coconut, etc.); tobacco, coffee, tea, cocoa, sugar beet, sugar cane, cotton, nuts.

In particular, the compositions of the present invention have proved to be extremely effective in the control of *Plasmopara viticola* on vines, *Phytophtora infestans* and *Botrytis cinerea* on tomatoes, *Phytophtora infestans* on potatoes, *Puccinia recondita, Erysiphe graminis, Helminthosporium teres, Septoria* spp and *Fusarium* spp. on cereals, in the control of *Phakopsora pachyrhizi* on soybeans, in the control of *Uromyces appendiculatus* on beans, in the control of *Venturia inaequalis* on apple trees, in the control of *Sphaerotheca fuliginea* on cucumbers.

Furthermore, the compositions of the present invention are also effective in the control of soil fungi, such as, for example, *Rhizoctonia solani, Sclerotinia* spp, *Pythium ultimum* on vegetables.

The compositions of the present invention are also effective in the control of phytopathogenic bacteria and viruses, such as, for example, *Xanthomonas* spp., *Pseudomonas* spp., *Erwinia amylovora*, the tobacco mosaic virus.

The compositions object of the present invention, are capable of exerting a fungicidal action which can be of a curative, preventive or eradicative nature, and, in general, exhibit a very low or zero phytotoxicity on the crops treated.

If the compositions comprise a compound having general formula (I) and at least one known active ingredient, the weight ratios in the above compositions vary according to the compounds selected and can normally range from 1:100 to 100:1, preferably from 1:10 to 10: 1.

The total concentration of the active components in the above compositions can vary within a wide range; they generally range from 1% to 99% by weight with respect to the total weight of the composition, preferably from 5 to 90% by weight with respect to the total weight of the composition.

The application of these compositions can take place on any part of the plant, for example on the leaves, stems, branches and roots, or on the seeds themselves before sowing, or on the soil in which the plant grows.

The present invention therefore also relates to a method for controlling phytopathogenic fungi in agricultural crops, which consists in applying effective and non-phytotoxic doses of compounds comprising at least one compound having formula (I), and, optionally, one or more known active ingredients compatible with the same, on any part of the plant to be protected or on the soil.

The concentration of the amide compounds having general formula (I) in the above-mentioned compositions can vary within a wide range; in general, it ranges from 1% to 90% by weight with respect to the total weight of the composition, preferably from 5 to 50% by weight with respect to the total weight of the composition.

The application of these compositions can take place on any part of the plant, for example on the leaves, stems, branches and roots, or on the seeds themselves before sowing, or on the soil in which the plant grows.

The present invention therefore also relates to a method for the control of phytopathogenic fungi in agricultural crops, which consists in applying effective doses of the compounds having formula (I), used as such or formulated in fungicidal compositions as described above.

The quantity of compound to be applied for obtaining the desired effect can vary according to various factors such as, for example, the compound used, the crop to be preserved, the type of pathogen, the degree of infection, the climatic conditions, the method of application, the formulation adopted.

Doses of compound ranging from 10 g to 5 kg per hectare of agricultural crop generally provide a sufficient control.

The following examples are provided for a better understanding of the invention, and should be considered as being illustrative and non-limiting of the same.

EXAMPLE 1

Preparation of (2S)-2-(tert-butoxycarbonylamino)nonan-2-yl propanoate 0.95 g of (2S)-2-(tert-butoxycarbonylamino)propanoic acid (5.0 mmoles), 0.06 g of dimethylaminopyridine (0.5 mmoles) and 1.9 g of EDCI (9.8 mmoles) [N-(3-dimethylaminopropyl)-N'-ethylcarbodiimide hydrochloride] were added at 0° C. to a solution of 0.85 g of nonan-2-ol (6.0 mmoles) in 22 ml of $CH_2Cl_2$. The reaction mixture was stirred at 0° C. for 1 hour, then allowed to rise to environmental values, for 36 hours. After GC-MS control, the reaction was concentrated in a rotavapor obtaining 1.97 g of a raw product which was purified by elution with an 8/2 mixture of heptane/ethyl acetate on a thin layer of silica gel. 1.28 g of the desired product were obtained. Yield 81%
GC-MS: $M^+=315$

EXAMPLE 2

Preparation of (2S)-2-aminopropanoate of nonan-2-yl hydrochloride 10.1 ml of a 4N solution of H
Cl in dioxane (41 mmoles) were added to a solution of 1.28 g of (2S)-2-(tert-butoxycarbonylamino)nonan-2-yl propanoate (4.1 mmoles) in 20 ml of $CH_2Cl_2$. The solution was stirred at room temperature for 1.5 hours. After TLC control (eluent: hexane/ethyl acetate 8/2), the reaction mixture was concentrated in a rotavapor, obtaining 1.03 g of the desired product. Yield 100%
GC-MS: $M^+=251.5$

EXAMPLE 3

Preparation of (2S)-2-(3-formamide-salicylamide)-propanoate of nonan-2-yl (Compound Nr. 46)

2.17 ml (13.13 mmoles) of diisopropylethylamine and 2.07 g (3.98 mmoles) of PyBOP [(1-Benzotriazolyloxy) tripyrrolidinephosphonium hexafluorophosphate] were added at room temperature to a suspension of 0.720 g of 3-formylamino-salicylic acid (3.98 mmoles) and 1.0 g of (2S)-2-aminopropanoate of nonan-2-yl hydrochloride (3.98 mmoles) in 35 ml of $CH_2Cl_2$. The reaction mixture was stirred at this temperature overnight. After LC-MS control, the reaction mixture was washed with water and the phases were separated. The aqueous phase was extracted with $CH_2Cl_2$(3×30 ml) and the combined organic phases were washed with a 10% hydrochloric acid solution (40 ml) and with a saturated NaCl solution (1×45 ml ). These were then dried over $Na_2SO_4$, filtered and concentrated, obtaining 3.29 g of a raw product that was washed with ethyl ether and filtered to eliminate the by-products of the condensing agent. The ether phase was concentrated in a rotavapor and then purified by silica gel chromatography by means of an automatic Biotage separator eluting with a 6/4 mixture of heptane/ethyl acetate. 0.85 g of the desired product were obtained. Yield 56%
LC-MS: M$^+$=378

EXAMPLE 4

Preparation of (2S)-1,1-bis(4-fluorophenyl)propane-1,2-diol

A solution of 0.36 g of (S)-ethyl lactate (3.0 mmoles) in 15 ml of THF was added dropwise to 9.9 ml of a 1M solution of (4-fluorophenyl)magnesium bromide in THF (9.9 mmoles) cooled to 0° C. The reaction mixture was left under stirring at 0° C. until completed and then treated with a saturated solution of ammonium chloride (15 ml). The mixture was left under stirring until it had reached room temperature and then filtered to recover the solid in suspension. The solid was suspended in ethyl acetate, filtered and rinsed again with ethyl acetate. The combined organic phases were concentrated in a rotavapor, washed with water and dried with anhydrous $Na_2SO_4$. After filtering and removal of the solvent, the raw product thus obtained was purified by silica gel chromatography by means of an automatic Biotage separator, obtaining 0.54 g of the desired product. Yield 68%
LC-MS: M$^+$=264

EXAMPLE 5

Preparation of (2S)-1,1-bis(4-fluorophenyl)propan-2-ol 3.0 ml of triethylsilane (18.9 mmoles) and 1.4 ml of trifluoroacetic acid (18.9 mmoles) were added at 0° C. to a solution of 0.50 g of (2S)-1.1-bis(4-fluorophenyl) propane-1,2-diol (1.89 mmoles) in 20 ml of $CH_2Cl_2$. The reaction mixture was stirred for 1 hour at this temperature. After 1 hour it was neutralized with a 4N solution of NaOH up to pH=10, the two phases were separated and the aqueous phase was extracted with $CH_2Cl_2$ (3×20 ml). The combined organic phases were dried with anhydrous $Na_2SO_4$, filtered and concentrated in a rotavapor. The raw product obtained was purified by silica gel chromatography by means of an automatic Biotage separator eluting with a heptane/ethyl acetate gradient and obtaining 0.39 g of product. Yield 83%
LC-MS: M$^+$=248

EXAMPLE 6

Preparation of (2S)-2-(3-nitrosalicylamide)ethyl propanoate 2.26 g of N-ethylmorpholine (19.6 mmoles), 1.32 g of 1-hydroxybenzotriazole (9.8 mmoles) and 2.02 g of DCC (9.8 mmoles) [N,N'-dicyclohexylcarbodiimide] were added to a solution of 1.63 g of 3-nitrosalicylic acid (8.9 mmoles) and 1.37 g of (2S)-2-aminopropanoate of ethyl hydrochloride (8.9 mmoles) in a 3/1 mixture. of $CH_2Cl_2$/HF (40 ml). The reaction mixture was stirred at room temperature for 30 minutes. After GC-MS control, the reaction was filtered to remove the insoluble by-products deriving from the condensing agent and concentrated in a rotavapor. The residue was dissolved in $CH_2Cl_2$, treated with a saturated solution of $NaHCO_3$ (40 ml) and the aqueous phase extracted with $CH_2Cl_2$ (3×35 ml). The combined organic phases were washed with water (1×80 ml) and a saturated solution of NaCl (1×80 ml), dried with anhydrous $Na_2SO_4$, filtered and concentrated in a rotavapor. The raw product obtained was purified by silica gel chromatography by means of an automatic Biotage separator, obtaining 1.78 g of the desired product. Yield 71%
LC-MS: M$^+$=282

EXAMPLE 7

Preparation of (2S)-2-(3-nitrosalicylamide)propanoic acid 12 ml of a 3% aqueous solution of NaOH were added to a solution of 0.99 g of (2S)-2-(3-nitrosalicylamide) ethyl propanoate (3.5 mmoles) in 15 ml of ethanol. The reaction mixture was left under stirring at 45° C. for 1 hour. After GC-MS control, the mixture was brought to acid pH with the addition of H Cl, extracted with ethyl acetate (2×20 ml), and the combined organic phases were washed with a saturated solution of NaCl (1×30 ml), anhydrified, filtered and concentrated, obtaining 0.89 g of the desired product. Yield 100%

GC-MS: M$^+$=254

EXAMPLE 8

Preparation of (2S)-2-(3-nitrosalicylamide)propanoate of (2S)-1,1-bis(4-fluorophenyl)propan-2-yl 0.24 g of dimethylaminopyridine (2.0 mmoles) and 0.97 g of (2S)-1.1-bis(4-fluorophenyl) propan-2-ol (3.9 mmoles) were added to a solution of 0.99 g (2S)-2-(3-nitrosalicylamide)propanoic acid (3.9 mmoles) in THF. The solution was cooled to 0° C. and 0.97 g of DCC (4.7 mmoles) [N,N*-dicyclohexylcarbodiimide] was added at this temperature. The reaction was left under stirring at room temperature overnight. After GC-MS control, the reaction mixture was filtered to remove the by-products of the condensing agent and concentrated, obtaining 2.4 g of raw product which were purified by silica gel chromatography by means of an automatic Biotage separator. 1.21 g of the desired product were obtained. Yield 64%
GC-MS: M$^+$=484

EXAMPLE 9

Preparation of (2S)-2-(3-aminosalicylamide)propanoate of (2S)-1,1-bis(4-fluorophenyl) propan-2-yl 0.12 g of Pd/C (20% w/w) were added to a solution of 0.62 g of (2S)-2-(3-nitrosalicylamide) propanoate of (2S)-1.1-bis(4-fluorophenyl)propan-2-yl (1.3 mmoles) in 25 ml of $CH_3OH$. The reaction environment was then saturated with an $H_2$ atmosphere and the solution left under stirring at room temperature overnight. After LC-MS control, the reaction mixture was filtered to remove the catalyst and the concentrated filtrate in a rotavapor, obtaining 0.59 g of the desired product. Yield 100%
LC-MS: M$^+$=454

EXAMPLE 10

Preparation of (2S)-2-(3-formamide-salicylamide) propanoate of (2S)-1,1-bis(4-fluorophenyl) propan-2-yl (Compound Nr.165)

0.024 g of zinc oxide (0.3 mmoles) were added to a solution of 1.45 g of (2S)-2-(3-aminosalicylamide)propanoate of (2S)-1,1-bis(4-fluorophenyl)propan-2-yl (3.2 mmoles) in 0.9 ml of formic acid (24.6 mmoles). The reaction mixture was then heated to 70° C. for 1 hour. After LC-MS control, the reaction mixture was washed with water and the phases separated. The aqueous phase was extracted with ethyl acetate (3×20 ml) and the combined organic phases were washed with water (2×15 ml) and with a saturated solution of NaCl (1×15 ml). These were then dried with anhydrous $Na_2SO_4$, filtered and concentrated, obtaining 0.89 g of the desired product. Yield 58%
LC-MS: $M^+$=482

EXAMPLE 11

Preparation of (2S)-2-[3-formamide-2-(methoxy-(2-methyl)propanoate)-benzamide] of (2S)-1,1-bis(4-fluorophenyl)propan-2-yl (Compound Nr. 156)

0.20 g of chloromethyl isobutyrate (1.5 mmoles), 0.03 g of sodium iodide (0.2 mmoles) and 0.21 g of $Na_2CO_3$ (2.0 mmoles) were added to a solution of 0.48 g of (2S)-2-(3-formamide-salicylamide)(2S)-1,1-bis(4-fluorophenyl)propan-2-yl (1.0 mmole) in 20 ml of acetone. The reaction mixture was heated to 50° C. for 8 hours and allowed to react at room temperature overnight. After LC-MS control, the solvent was evaporated, then diluted with water and extracted with ethyl acetate (3×20 ml). The organic phases were dried with anhydrous $Na_2SO_4$, filtered and concentrated. The raw product thus obtained was purified by silica gel chromatography by means of an automatic Biotage separator, obtaining 0.37 g of product. Yield 64%
GC-MS: $M^+$=582

EXAMPLE 12

Preparation of dicyclohexylmethanol 0.60 g of sodium-boron hydride (15 mmoles) were added, at 0° C. and in portions, to a solution of 5.0 g of dicyclohexylketone (26 mmoles) in 25 ml of $CH_3OH$. The reaction was left under stirring at room temperature overnight. After GC-MS control, the reaction was treated with an aqueous solution of 1.5 ml of glacial acetic acid (26 mmoles) and extracted with ethyl acetate (2 x 25 ml). The combined organic phases were washed with water (1×40 ml), dried with anhydrous $Na_2SO_4$, filtered and concentrated, obtaining 4.9 g of product. Yield 96%
GC-MS: $M^+$=196

EXAMPLE 13

Preparation of (2S)-2-(tert-butoxycarbonylamino) dicyclohexylmethyl propinate 5.7 g of (2S)-2-(tert-butoxycarbonylamino) propanoic acid (30 mmoles), 0.3 g of dimethylaminopyridine (2.5 mmoles) and 9.6 g of EDCI (50 mmoles) [N-(3-dimethyl-aminopropyl)-N'-ethylcarbodiimide hydrochloride] were added, at 0° C., to a solution of 4.9 g of dicyclohexylmethanol (25 mmoles) in 112 ml of $CH_2Cl_2$. The reaction was left under stirring at 0° C. for 1 hour and then reacted at room temperature overnight. After control, the reaction was concentrated and purified by silica gel chromatography using an automatic Biotage separator, obtaining 5.41 g of the desired product. Yield 59%
GC-MS: $M^+$=367

EXAMPLE 14

Preparation of (2S)-2-aminopropionate of dicyclohexylmethyl trifluoroacetate 10.1 ml of trifluoroacetic acid (131 mmoles) were added to a solution of 4.8 g of (2S)-2-(tert-butoxycarbonylamino) dicyclohexylmethyl propionate (13.1 mmoles) in 30 ml of $CH_2Cl_2$ and the mixture was left under stirring at room temperature for 1 hour. After GC-MS control, the solvent was removed by evaporation, obtaining 3.79 g of the desired product. Yield 76%
GC-MS: $M^+$=381

EXAMPLE 15

Preparation of 2-(3-formamide-salicylamide) of dicyclohexylmethyl propionate (Compound Nr. 53)

1.6 ml (9.0 mmoles) of diisopropylethylamine and 1.4 g (2.8 mmoles) of PyBOP [(1-Benzotriazolyloxy) tripyrrolidinephosphonium hexafluorophosphate] were added, at 0° C., to a solution of 0.50 g of 3-formamide-salicylic acid (2.8 mmoles) and 1.07 g of (2S)-2-aminopropionate of dicyclohexylmethyl trifluoroacetate (2.8 mmoles) in 20 ml of $CH_2Cl_2$. The reaction mixture was stirred at this temperature for 2 hours and then allowed to rise to environmental values and under stirring for another 2 hours. After LC-MS control, the reaction mixture was washed with water and the phases separated. The aqueous phase was extracted with $CH_2Cl_2$ (3×20 ml) and the combined organic phase were washed with water (2×35 ml) and with a saturated solution of NaCl (1×35 ml), dried over anhydrous $Na_2SO_4$, filtered and evaporated, obtaining 1.8 g of a raw product which was washed with ethyl ether and filtered to eliminate the by-products of the condensing agent. The ether phase was concentrated in a rotavapor and then purified by silica gel chromatography by means of an automatic Biotage separator, obtaining 0.76 g of the desired product. Yield 63%
LC-MS: $M^+$=430

EXAMPLE 16

Preparation of Compounds Nr. 47, 55, 110, 126, 135, 154, 155, 162, 166, 171, 179, 181, 182, 195, 199, 204, 208, 212, 219, 221, 222, 224, 227, 228, 230, 234, 236, 237, 239, 240, 243, 244, 245, 246, 247, 248, 249, 250, 253, 256, 257, 258, 260, 261, 264, 266, 271, 273, 275, 277, 278, 279, 280, 281, 282, 283

Operating analogously to what is indicated in the previous examples, the following compounds were obtained 47, 55, 110, 126, 135, 154, 155, 162, 166, 171, 179, 181, 182, 195, 199, 204, 208, 212, 219, 221, 222, 224, 227, 228, 230, 234, 236, 237, 239, 240, 243, 244, 245, 246, 247, 248, 249, 250, 253, 256, 257, 258, 260, 261, 264, 266, 271, 273, 275, 277, 278, 279, 280, 281, 282, 283.

having formula (I) indicated in Table 6.

TABLE 6

| Comp. | N | $R_d$ | $R_c$ | W | M | $R_a$ | $R_b$ | $R^1$ | $R^2$ |
|---|---|---|---|---|---|---|---|---|---|
| 47 | 0 | — | NHCHO | O | OCOCH$_3$ | (S)-CH$_3$ | H | CH$_3$ | 1-heptyl |
| 55 | 0 | — | NHCHO | O | OCOCH$_3$ | (S)-CH$_3$ | H | cyclohexyl | cyclohexyl |
| 110 | 0 | — | NHCHO | O | OCOCH$_3$ | (S)-CH$_3$ | H | CH$_3$ | Dicyclohexylmethyl |
| 126 | 0 | — | NHCHO | O | OCOCH$_3$ | (S)-CH$_3$ | H | CH$_3$ | 1-cyclohexyl-2-methyl-1-propyl |
| 135 | 0 | — | NHCHO | O | OCOCH$_3$ | (S)-CH$_3$ | H | CH$_3$ | 3,5-diethyl-4-heptyl |
| 154 | 0 | — | NHCHO | O | OCH$_2$SCH$_3$ | (S)-CH$_3$ | H | (S)-CH$_3$ | diphenylmethyl |
| 155 | 0 | — | NHCHO | O | OCOCH$_3$ | (S)-CH$_3$ | H | (S)-CH$_3$ | diphenylmethyl |
| 162 | 0 | — | NHCHO | O | OCH$_2$OCOCH$_3$ | (S)-CH$_3$ | H | (S)-CH$_3$ | Bis (2-fluoro)-phenylmethyl |
| 166 | 0 | — | NHCHO | O | OCH$_2$OCH$_3$ | (S)-CH$_3$ | H | (S)-CH$_3$ | Bis (2-fluoro)-phenylmethyl |
| 171 | 0 | — | NHCHO | O | OCOOi-Bu | (S)-CH$_3$ | H | (S)-CH$_3$ | Bis (2-fluoro)-phenylmethyl |
| 179 | 0 | — | NHCHO | O | OH | (S)-CH$_3$ | H | (S)-CH$_3$ | Bis (2,4-difluoro)-phenylmethyl |
| 181 | 0 | — | NHCHO | O | OCH$_2$OCOi-Pr | (S)-CH$_3$ | H | (S)-CH$_3$ | Bis (4-fluoro-2-methyl)-phenylmethyl |
| 182 | 0 | — | NHCHO | O | OH | (S)-CH$_3$ | H | (S)-CH$_3$ | Bis (4-fluoro-2-methyl)-phenylmethyl |
| 195 | 0 | — | NHCHO | O | OH | (S)-CH$_3$ | H | (S)-CH$_3$ | 4-fluoro-2-methyl-phenyl-cyclopentylmethyl |
| 199 | 0 | — | NHCHO | O | OCOCH$_3$ | (S)-CH$_3$ | H | (S)-CH$_3$ | 1-cyclohexyl-2-methyl-1-propyl |
| 204 | 0 | — | NHCHO | O | OH | (S)-CH$_3$ | H | (S)-CH$_3$ | 1-cyclohexyl-2-methyl-1-propyl |
| 208 | 0 | — | NHCHO | O | OCH$_2$SCH$_3$ | (S)-CH$_3$ | H | (S)-CH$_3$ | 3,5-diethyl-4-heptyl |
| 212 | 0 | — | NHCHO | O | OH | (S)-CH$_3$ | H | (S)-CH$_3$ | 3,5-diethyl-4-heptyl |
| 219 | 0 | — | NHCHO | O | OCOCH$_3$ | (S)-CH$_3$ | H | CH$_3$ | 1-(1,3-benzothiazol-2-yl)-1-ethyl |
| 221 | 0 | — | NHCHO | O | OH | (S)-CH$_3$ | H | CH$_3$ | 1-(1,3-benzothiazol-2-yl)-1-ethyl |
| 222 | 0 | — | NHCHO | O | OCH$_2$SCH$_3$ | (S)-CH$_3$ | H | CH$_3$ | 1-(5-chloro-2H-isoindol-2-yl)-1-ethyl |
| 224 | 0 | — | NHCHO | O | OH | (S)-CH$_3$ | H | CH$_3$ | 1-(5-chloro-2H-isoindol-2-yl)-1-ethyl |
| 227 | 0 | — | NHCHO | O | OH | (S)-CH$_3$ | H | CH$_3$ | 1,2-diphenyl-1-cyclopropyl |
| 228 | 0 | — | NHCHO | O | OCOCH$_3$ | (S)-CH$_3$ | H | CH$_3$ | 1-methyl-1-(4-fluoro)-phenyl)-1-ethyl |
| 230 | 0 | — | NHCHO | O | OH | (S)-CH$_3$ | H | CH$_3$ | 1-methyl-1-(4-fluoro)-phenyl)-1-ethyl |
| 234 | 0 | — | NHCHO | O | OCOCH$_3$ | (S)-CH$_3$ | H | (S)-CH$_3$ | butoxycarbonyl |
| 236 | 0 | — | NHCHO | O | OH | (S)-CH$_3$ | H | (S)-CH$_3$ | butoxycarbonyl |
| 237 | 0 | — | NHCHO | O | OCOCH$_3$ | (S)-CH$_3$ | H | (S)-CH$_3$ | 2-ethyl-hexyloxycarbonyl |
| 239 | 0 | — | NHCHO | O | OH | (S)-CH$_3$ | H | (S)-CH$_3$ | 2-ethyl-hexyloxycarbonyl |
| 240 | 0 | — | NHCHO | O | OCOCH$_3$ | (S)-CH$_3$ | H | (S)-CH$_3$ | benzyloxycarbonyl |
| 243 | 0 | — | NHCHO | O | OH | (S)-CH$_3$ | H | (S)-CH$_3$ | (S)-1-[bis-(4-fluoro)-phenyl)]-2-propoxycarbonyl |
| 244 | 0 | — | NHCHO | O | OCOCH$_3$ | (S)-CH$_2$CH$_2$SCH$_3$ | H | (S)-CH$_3$ | Bis (2-fluoro)-phenylmethyl |
| 245 | 0 | — | NHCHO | O | OH | (S)-CH$_2$CH$_2$SCH$_3$ | H | (S)-CH$_3$ | Bis (2-fluoro)-phenylmethyl |
| 246 | 0 | — | NHCHO | O | OCOCH$_3$ | (S)-CH$_2$SCH$_3$ | H | (S)-CH$_3$ | Bis (2-fluoro)-phenylmethyl |
| 247 | 0 | — | NHCHO | O | OH | (S)-CH$_2$SCH$_3$ | H | (S)-CH$_3$ | Bis (2-fluoro)-phenylmethyl |
| 248 | 0 | — | NHCHO | O | OH | (S)-CH$_3$ | H | (S)-CH$_3$ | benzyloxycarbonyl |
| 249 | 0 | — | NHCHO | O | OH | (S)-CH$_3$ | H | (S)-CH$_3$ | 1-heptyl |
| 250 | 0 | — | NHCHO | O | OCOCH$_3$ | (S)-CH$_3$ | H | (S)-CH$_3$ | 1-heptyl |
| 253 | 1 | 5-Cl | H | O | OCOCH$_3$ | (S)-CH$_3$ | H | (S)-CH$_3$ | Bis (2-fluoro)-phenylmethyl |
| 256 | 0 | — | NHCHO | O | OH | (S)-CH$_3$ | H | CH$_3$ | Dicyclohexylmethyl |
| 257 | 0 | — | NHCHO | O | OH | (S)-CH$_3$ | H | CH$_3$ | 3,5-diethyl-4-heptyl |
| 258 | 0 | — | NHCHO | O | OH | (S)-CH$_3$ | H | (S)-CH$_3$ | diphenylmethyl |
| 260 | 0 | — | NHCHO | O | OH | (S)-CH$_3$ | H | (S)-CH$_3$ | 1-(4-fluoro-2-methyl)-phenyl-2-methyl-1-propyl |
| 261 | 0 | — | NHCHO | O | OH | (S)-CH$_3$ | H | (S)-CH$_3$ | 1-phenyl-2-ethyl-1-butyl |
| 264 | 0 | — | NHCHO | O | OH | ⋈ | | (S)-CH$_3$ | Bis (4-Fluoro)-phenylmethyl |
| 266 | 0 | — | NHCHO | O | OCOCH$_3$ | (S)-CH$_3$ | H | (S)-CH$_3$ | benzyloxycarbonyl |
| 271 | 1 | 5-Cl | H | O | OH | (S)-CH$_3$ | H | (S)-CH$_3$ | Bis (4-Fluoro)-phenylmethyl |
| 273 | 0 | — | NHCHO | O | OH | (S)-CH$_3$ | H | (S)-CH$_3$ | (1R,2R,5S)-5-methyl-2-(propan-2-yl)-cyclohexyloxycarbonyl |
| 275 | 0 | — | NHCHO | O | OH | (S)-CH$_3$ | H | (S)-phenyl | benzyloxycarbonyl |
| 277 | 0 | — | NHCHO | O | OH | (S)-CH$_3$ | H | CH$_3$ | 2-phenyl-1-(isobutoxycarbonyl)-1-ethyl |
| 278 | 0 | — | NHCHO | O | OH | (S)-CH$_3$ | H | (S)-CH$_3$ | 2-(4-fluoro)-phenyl-1-(isobutoxycarbonyl)-1-ethyl |
| 279 | 0 | — | NHCHO | O | OCOCH(CH$_3$)$_2$ | (S)-CH3 | H | (S)-CH3 | 2-(4-fluoro)-phenyl-1-(isobutoxycarbonyl)-1-ethyl |
| 280 | 0 | — | NHCHO | O | OCH$_2$OCOi-Pr | (S)-CH3 | H | (S)-CH3 | Bis (2-fluoro-4-methyl)-phenylmethyl |
| 281 | 0 | — | NHCHO | O | OH | (S)-CH3 | H | (S)-CH3 | Bis (2-fluoro-4-methyl)-phenylmethyl |
| 282 | 0 | — | NHCHO | O | OCH$_2$OCOi-Pr | (S)-CH3 | H | (S)-CH3 | Bis (thiomethyl)-phenylmethyl |
| 283 | 0 | — | NHCHO | O | OH | (S)-CH3 | H | (S)-CH3 | Bis (4-thiomethyl)-phenylmethyl |

Table 7 indicates the results of the GC-MS analyses carried out on compounds 47, 55, 110, 126, 135, 154, 155, 162, 166, 171, 179, 181, 182, 195, 199, 204, 208, 212, 219, 221, 222, 224, 227, 228, 230, 234, 236, 237, 239, 240, 243, 244, 245, 246, 247, 248, 249, 250, 253, 256, 257, 258, 260, 261, 264, 266, 271, 273, 275, 277, 278, 279, 280, 281, 282, 283.

TABLE 7

| Compound Nr. | LC-MS: M+ |
|---|---|
| 47 | 420 |
| 55 | 472 |
| 110 | 500 |
| 126 | 461 |
| 135 | 477 |
| 154 | 508 |
| 155 | 524 |
| 162 | 554 |
| 166 | 542 |
| 171 | 582 |
| 179 | 518 |
| 181 | 610 |
| 182 | 510 |
| 195 | 470 |
| 199 | 460 |
| 204 | 418 |
| 208 | 494 |
| 212 | 434 |
| 219 | 484 |
| 221 | 442 |
| 222 | 518 |
| 224 | 458 |
| 227 | 474 |
| 228 | 459 |
| 230 | 417 |
| 234 | 422 |
| 236 | 380 |
| 237 | 479 |
| 239 | 437 |
| 240 | 456 |
| 243 | 555 |
| 244 | 598 |
| 245 | 556 |
| 246 | 584 |
| 247 | 542 |
| 248 | 414 |
| 249 | 378 |
| 250 | 420 |
| 253 | 515 |
| 256 | 458 |
| 257 | 435 |
| 258 | 432 |
| 260 | 444 |
| 261 | 440 |
| 264 | 494 |
| 266 | 456 |
| 271 | 473 |
| 273 | 478 |
| 275 | 476 |
| 277 | 485 |
| 278 | 503 |
| 279 | 702 |
| 280 | 610 |
| 281 | 510 |
| 282 | 638 |
| 283 | 538 |

EXAMPLE 17

Determination of the Preventive Activity (7 days) of Compounds Having Formula (I) Against *Plasmopara viticola* on Vines Leaves of vine plants, Merlot variety, grown in pots, in a conditioned environment (20±1° C., 70% R.H.) were treated by spraying both sides of the leaves with the products in question.

7 days after the treatment, the plants were inoculated with an aqueous suspension of *Plasmopara viticola* spores (200,000 spores/cc) by spraying both sides of the leaves with a compressed air gun.

After remaining 24 hours in a humidity-saturated environment, at 21° C., the plants were transferred for the incubation period (7 days) in a conditioned environment with 70% R.H. and at 24° C.

After this period of time, the external symptoms of the pathogen appeared and it was therefore possible to evaluate the intensity of the infection.

The fungicidal activity is expressed as a percentage of the reduction, compared to untreated seedlings, in the area of the leaf area affected by the disease (100=complete effectiveness, 0=zero effectiveness).

Table 8 indicates the results obtained by carrying out the test described with compounds Nr. 46, 156, 165 and 249 in comparison with the compound CR1 described in WO2016109257 (Nr. 145)

CR1: Florypicoxamid

TABLE 8

| Compound Nr. | ppm | P7Activity |
|---|---|---|
| 46 | 30 | 100 |
|  | 125 | 100 |
| 156 | 30 | 100 |
|  | 125 | 100 |
| 165 | 30 | 100 |
|  | 125 | 100 |
| 249 | 30 | 100 |
|  | 125 | 100 |
| CR1 | 30 | 10 |
|  | 125 | 40 |

EXAMPLE 18

Determination of the Preventive Fungicidal Activity (5 days) of Compounds Having Formula (I) Aagainst *Puccinia Recondita* on Wheat Leaves of wheat plants of the Salgemma variety, grown in pots in a conditioned environment at 20° C. and 70% of Relative Humidity (RH), were treated by spraying both sides of the leaves with the compound under examination dispersed in a hydroacetone solution at 20% by volume of acetone.

After remaining 5 days in a conditioned environment, the plants were sprayed on both sides of the leaves with an aqueous suspension of conidia of Puccinia Recondita (2 mg of inoculum per 1 ml of solution for infection).

After spraying, the plants were kept in a humidity-saturated environment at a temperature ranging from 18 to 24° C. for the incubation period of the fungus (1 day).

At the end of this period, the plants were put in a greenhouse with a relative humidity (RH) of 70% and at a temperature of 18-24° C. for 14 days At the end of this period, the external symptoms of the pathogen appeared and it was therefore possible to proceed with the visual evaluation of the intensity of the infection, both on the parts treated directly with the products (T) and on the parts developed during the implementation of the test (NT).

The fungicidal activity is expressed as a percentage of the reduction, with respect to non-treated seedlings (blank), in the area of the leaf affected by the disease (100=full effectiveness; 0 =zero effectiveness).

All of compounds Nr. 46, 156, 165 and 249 showed an activity greater than 80% at a dose of 250 ppm.

At the same time, an evaluation of the phytotoxicity was effected (percentage of leaf necrosis) induced on the wheat seedlings by the application of the products: in this case the evaluation scale ranges from 0 (completely healthy plant) to 100 (completely necrotic plant).

Table 9 indicates the results obtained by carrying out the test described with Nr. 46, 156, 165 and 249

TABLE 9

| Compound Nr. | ppm | P5 Activity T | NT |
|---|---|---|---|
| 46 | 125 | 98 | 90 |
|  | 250 | 100 | 99 |
| 156 | 125 | 98 | 93 |
|  | 250 | 100 | 100 |
| 165 | 125 | 95 | 88 |
|  | 250 | 100 | 100 |
| 249 | 125 | 99 | 95 |
|  | 250 | 100 | 100 |
| CR1 | 125 | 99 | 90 |
|  | 250 | 100 | 100 |

EXAMPLE 19

Determination of the Preventive Fungicidal Activity (5 days) of Compounds Having Formula (I) Against *Phakopsora pachyrhizi* on Soya Leaves of soya plants of the Zora variety, grown in pots in a conditioned environment at 20° C. and 70% of Relative Humidity (RH), were treated by spraying both sides of the leaves with the compound under examination dispersed in a hydroacetone solution at 20% by volume of acetone.

After remaining 5 days in a conditioned environment, the plants were sprayed on both sides of the leaves with an aqueous suspension of conidia of *Phakopsora pachyrhizi* (50 mg of urediniumspore in 100 ml of demineralized water with the addition of a drop of Tween surfactant).

After spraying, the plants were kept in a humidity-saturated environment at a temperature ranging from 18 to 24° C. for the incubation period of the fungus (1 day).

At the end of this period, the plants were placed in a climatic cell with R.H. 70% and a temperature of 22-24° C. for 12 days After this period of time, the external symptoms of the pathogen appeared and it was therefore possible to proceed with the visual evaluation of the intensity of the infection, as a percentage of the leaf surface affected, considering both the two basal leaves and the first trifoliate leaf.

The fungicidal activity is expressed as a percentage of the reduction, with respect to non-treated seedlings (blank), in the area of the leaf affected by the disease (100=full effectiveness; 0=zero effectiveness).

All of compounds Nr. 46, 156, 165 and 249 showed a complete control of the pathogen at a dose of 125 ppm and a control exceeding 80% at 30 ppm.

At the same time, an evaluation of the phytotoxicity was effected (percentage of leaf necrosis) induced on the soya seedlings by the application of the products: in this case the evaluation scale ranges from 0 (completely healthy plant) to 100 (completely necrotic plant).

Table 10 indicates the results obtained by carrying out the test described with compounds Nr. 46, 156, 165 and 249

TABLE 10

| Compound Nr. | ppm | P5 Activity |
|---|---|---|
| 46 | 15 | 98 |
|  | 30 | 99 |
| 156 | 15 | 100 |
|  | 30 | 100 |
| 165 | 15 | 99 |
|  | 30 | 100 |
| 249 | 15 | 98 |
|  | 30 | 100 |
| CR1 | 15 | 100 |
|  | 30 | 100 |

EXAMPLE 20

Determination of the Antifungal Activity In Vitro of Compounds Having Formula (I)

The molecules having general formula (I) were tested to evaluate their antifungal activity in vitro against the following fungi and straminipila: *Alternaria alternata, Botrytis cinerea, Cercospora beticola, Colletotrichum lindemuthianum, Drechslera graminea, Fusarium graminearum, Magnaporthe oryzaena Monilia fructigena, Parastagonospora nodorum, Phytophthora infestans, Pythium ultimum, Rhizoctonia solani, Sclerotinia sclerotiorurn, Ustilago maydis, Venturia inaequalis* and *Zymoseptoria tritici*.

The pure culture isolates were kept and stored at 4° C. in a refrigerator on agarized nutrient substrates suitable for each of them. For effecting the activity assays, the inoculum was prepared which, depending on the species of the pathogen, could be a suspension of conidia or a mycelial homogenate. For strains not easily sporulating in vitro, six to eight mycelium plugs were transferred to a grinding egg containing 6 ml of Potato Dextrose Broth (PDB) 2× and some metal balls. The suspension was homogenized with a Pulverisette 23 mini-mill (Fritsch GmbH).

For all the sporulating strains in vitro, the conidic suspension was prepared starting from a culture grown on a suitable agarized medium and under suitable conditions for stimulating sporulation. The conidia were collected in 1 ml of PDB 2× and counted under a microscope with a counting chamber in order to obtain a final inoculation of $2\times10^4$ conidia/ml.

The concentrations tested for each active molecule were 0.001, 0.01, 0.1, 1,5 and 10 mg/l. For each molecule to be tested, a mother solution in dimethylsulfoxide (DMSO) at 80,000 mg/l was prepared which was then serially diluted in sterile demineralized water to obtain the solutions to be tested in double concentrations compared to the final doses. The inhibition tests were carried out in 96-well plates: 50 µl of inoculum were mixed with 50 µl of the active molecule solution in each well using the Eppendorf Multipette® System E3 serial dispenser. Four wells were used as replicates for each concentration of active ingredient. All the strains of the pathogens were grown in untreated control wells containing 50 µl of fungal suspension and 50 µl of sterile demineralized water. The inoculated multi-well plates were incubated at 20° C. for 72 hours (96 or 120 when necessary).

The sensitivity to the molecules was assessed as a growth inhibition of the fungus and measured in terms of absorbance immediately before and after the incubation period.

The absorbance was measured for each well using an Infinite® F50 Absorbance Reader (Tecan Group Ltd) spectrophotometer at 405 nm (for mycelial inoculae) and 492 nm (for conidic inoculae).

For each strain, the growth inhibition percentage (GIP) caused by each of the concentrations of the active ingredient was calculated using the following formula:

$$GIP = \frac{\lfloor(A_{t72-120} - A_{t0})_{untreated}\rfloor - \lfloor(A_{t72-120} - A_{t0})_{treated}\rfloor}{(A_{t72-120} - A_{t0})_{untreated}} \times 100$$

wherein $At_{72-120}$ and $At_0$ are respectively the absorbances of the treated and untreated well measured at the end and at the beginning of the incubation period. The GIP data were used for calculating $EC_{50}$ which are, respectively, the effective concentrations (mg/l) of active molecule that reduce mycelial growth by 50% compared to the untreated control.

Table 11 indicates the results obtained by carrying out the test described with compounds Nr. 46, 165, 236, 239 and 248 and with the compound CR2 described in WO2016/109257 (Nr.112)

TABLE 11

In vitro antifungal activity, espressed as 50% effective doses ($EC_{50}$ mg/l)

| Fungal strains | Comp. Nr. | | | | | |
|---|---|---|---|---|---|---|
| | 46 | 165 | 236 | 239 | 248 | CR2 |
| *Alternaria alternata* | | 0.33 | | | | 7.57 |
| *Cercospora beticola* | 1.34 | 0.19 | 8.64 | | | 0.48 |
| *Bipolaris sorokiniana* | 2.68 | 0.11 | 8.0 | | | 3.6 |
| *Magnaporthe oryzae* | | 0.2 | 0.79 | 0.64 | | |
| *Parastagonospora nodorum* | 0.001 | 0.01 | 0.009 | 0.006 | 0.008 | 0.24 |
| *Phytophthora infestans* | 0.04 | 0.05 | 1.49 | 1.62 | 1.14 | |
| *Pythium ultimum* | | 1.54 | | 2.78 | | |
| *Sclerotinia sclerotiorum* | 0.02 | 0.01 | 0.18 | 0.081 | | 5.38 |
| *Venturia inaequalis* | 0.25 | 0.18 | 1.77 | | | |
| *Zymoseptoria tritici* | 0.02 | 0.007 | 0.095 | 0.067 | 0.17 | 0.14 |

Compound Nr.165 having general formula (I) wherein R, represents the formylaminosalicylic group, showed with respect to the identical reference compound CR2 described in patent WO2016 109257 (compound 112), wherein however $R_c$ represents a hydrogen atom, an improved in vitro antifungal activity with respect to both effectiveness and spectrum of action. Compound Nr. 165, in fact, was found to be active both against pathogens belonging to the Straminipila kingdom such as *P. infestans* and *P. ultimum* and also against other important phytopathogenic fungi such as *M. oryzae* and *V. inaequalis*. Furthermore, with respect to the effectiveness, it can be observed that for all the phytopathogenic fungi tested, the $EC_{50}$ values obtained from compound Nr. 165 are much lower than those indicated by compound CR2, therefore proving to be much more active than the product belonging to the known art.

The invention claimed is:
1. A compound Compounds having general formula (I):

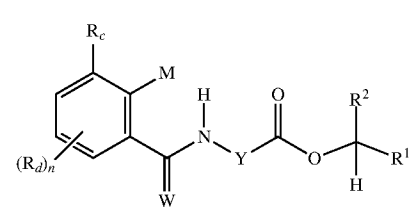

(I)

wherein:
$R_c$ represents a formylamine group;
M represents a $W^1$—$R^6$ group;
W and $W^1$, the same or different, represent an oxygen atom or a sulfur atom;
$R_d$ represents a hydrogen atom, a halogen atom selected from fluorine, chlorine, bromine or iodine, a nitro group, an amino group, a formylamine group, a cyano group, a $C_1$-$C_{18}$ alkyl group, a $C_3$-$C_{18}$ cycloalkyl group, a $C_3$-$C_{18}$ cycloalkyl-$C_1$-$C_{12}$-alkyl group, $C_1$-$C_{18}$ haloalkyl group, a $C_2$-$C_{18}$ alkenyl group, a $C_2$-$C_{18}$ haloalkenyl group, a $C_3$-$C_{18}$ cycloalkenyl group, a $C_1$-$C_{18}$ alkoxyl group, a $C_1$-$C_{18}$ haloalkoxyl group, a $C_1$-$C_{18}$ thioalkoxyl group, a $C_1$-$C_{18}$ alkylsulfonyl group, a $C_1$-$C_{18}$ alkylsulfinyl group, a $C_3$-$C_{18}$ cycloalkoxyl group, an aryl group, a phenoxyl group, a benzyloxy group, an aryl-$C_1$-$C_{18}$-alkyl group, a heterocyclic group, penta- or hexa-atomic, aromatic or non-aromatic, also benzocondensed or heterobicyclic, containing at least one heteroatom selected from oxygen, sulfur, optionally oxidized to sulfoxide or to sulfone, nitrogen, optionally oxidized to N-oxide or a heterocyclyl-$C_1$-$C_{18}$-alkyl group wherein the heterocyclic group is as defined above; a C (=$W^1$) $R^8$ group, a C (=O)$OR^8$ group, a C (=O) $NR^8R^9$ group, a S (=O)$_2NR^8R^9$ group;
n represents a number ranging from 0 to 2;
$R^6$ represents a $CH_2OR^7$ group, a $CH_2SR^7$ group, a $COR^7$ group, a $CH_2OCOR^7$ group;
$R^7$ represents a $C_1$-$C_{18}$ alkyl group, a $C_3$-$C_{18}$ cycloalkyl group, a $C_1$-$C_{18}$ haloalkyl group, a $C_1$-$C_{18}$ alkoxyl group, an aryl group, a benzyl group, said groups being optionally substituted with one or more $R_d$ groups the same as or different from each other;
$R^8$ and $R^9$, the same or different, represent a hydrogen atom, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_3$-$C_{18}$ halocycloalkyl group, an aryl group, an aryl-$C_1$-$C_{18}$-alkyl group, each of said groups $R^8$ and $R^9$ can be optionally substituted by 0, 1 or multiples of $R_d$;
Y represents one of the following $Y^1$ or $Y^2$ groups

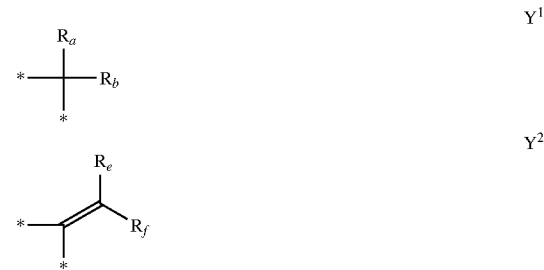

wherein:

$R_a$ and $R_b$, the same or different, represent a hydrogen atom, a $C_1$-$C_{18}$ alkyl group, a $C_1$-$C_{18}$ haloalkyl group, a $C_3$-$C_{18}$ cycloalkyl group, an aryl group, an aryl-$C_1$-$C_{18}$-alkyl group, a heterocyclic group, penta- or hexa-atomic, aromatic or non-aromatic, containing at least one heteroatom selected from oxygen, sulfur, possibly oxidized to sulfoxide or sulfone, nitrogen, possibly oxidized to N-oxide, a heterocyclyl-$C_1$-$C_{18}$-alkyl group wherein the heterocyclic group is as defined above; said groups being optionally substituted with one or more $R_d$ groups, the same as or different from each other;

or $R_a$ and $R_b$ together with the carbon atom to which they are bound form a $C_3$-$C_{18}$ cycloalkyl ring;

$R_e$ and $R_f$, the same or different, represent a hydrogen atom, a $C_1$-$C_{18}$ alkyl group, a $C_1$-$C_{18}$ haloalkyl group, said groups being optionally substituted with one or more $R_d$ groups the same as or different from each other;

$R^1$ represents a hydrogen atom, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_2$-$C_{18}$ alkynyl group, a $C_3$-$C_{18}$ cycloalkyl group, a $C_3$-$C_{18}$ cycloalkenyl group, a $C_3$-$C_{18}$ cycloalkyl-$C_1$-$C_{18}$-alkyl group, an aryl group, an aryl-$C_1$-$C_{18}$-alkyl group, a heterocyclic group, penta- or hexa-atomatic, aromatic or non-aromatic, also benzocondensed or heterobicyclic, containing at least one heteroatom selected from oxygen, sulfur, possibly oxidized to sulfoxide or sulfone, nitrogen, possibly oxidized to N-oxide or a heterocyclyl-$C_1$-$C_{18}$-alkyl group wherein the heterocyclic group is as defined above; said groups being optionally substituted with one or more $R_d$ groups, the same as or different from each other;

$R^2$ represents a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_3$-$C_{18}$ cycloalkenyl group, a $C_3$-$C_{18}$ cycloalkyl -$C_1$-$C_{18}$-alkyl group, an aryl group, an aryl-$C_1$-$C_{18}$-alkyl group, a heterocyclic group, penta- or hexa-atomatic, aromatic or non-aromatic, also benzocondensed or heterobicyclic, containing at least one heteroatom selected from oxygen, sulfur, possibly oxidized to sulfoxide or to sulfone, nitrogen, possibly oxidized to N-oxide or a heterocyclyl-$C_1$-$C_{18}$-alkyl group wherein the heterocyclic group is as defined above, a COOR$^2$ group, a CONHR$^2$ group, a CONR$^1$ R$^2$ group; said groups being optionally substituted with one or more $R_d$ groups, the same as or different from each other, or $R^2$ represents the following T group:

T=

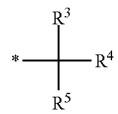

wherein:

$R^3$, $R^5$, the same or different, represent a $C_1$-$C_{18}$ alkyl group, a $C_1$-$C_{18}$ haloalkyl group, a $C_1$-$C_{18}$ alkoxyl group, a $C_2$-$C_{18}$ alkenyl group, a $C_2$-$C_{18}$ haloalkenyl group, a $C_3$-$C_{18}$ cycloalkyl group, a $C_3$-$C_{18}$ cycloalkoxyl group, an NHR$^1$ group, an NR$^1{}_2$ group, an aryl group, a phenoxyl group, an aryl-$C_1$-$C_{18}$-alkyl group, an aryl-$C_1$-$C_{18}$-alkoxyl group, a heterocyclic group, penta- or hexa-atomic, aromatic or non-aromatic, also benzocondensed or heterobicyclic, containing at least one heteroatom selected from oxygen, sulfur, nitrogen, wherein the sulfur atom can be possibly oxidized to sulfoxide or sulfone and the nitrogen atom possibly oxidized to N-oxide or a heterocyclyl-$C_1$-$C_{18}$-alkyl group, said groups being optionally substituted with one or more $R_d$ groups, the same as or different from each other;

$R^4$ represents a hydrogen atom, a hydroxyl, a halogen atom selected from fluorine, chlorine, bromine or iodine, a $C_1$-$C_{18}$ alkyl group, a $C_1$-$C_{18}$ haloalkyl group, a $C_2$-$C_{18}$ alkenyl group, a $C_2$-$C_{18}$ haloalkenyl group, a $C_3$-$C_{18}$ cycloalkyl group, a $C_1$-$C_{18}$ alkoxyl group;

or $R^3$ and $R^4$ together with the carbon atom to which they are bound, form a $C_3$-$C_{18}$ cycloalkyl group or a heterocyclic group, penta- or hexa-atomic, containing at least one heteroatom selected from oxygen, sulfur, possibly oxidized to sulfoxide or sulfone, nitrogen, possibly oxidized to N-oxide, said groups being optionally substituted with one or more $R_d$ groups the same as or different from each other;

or $R^1$ and $R^2$ together with the carbon atom to which they are bound, form a $C_3$-$C_{18}$ cycloalkyl ring;

with the proviso that:

when $R_c$ represents a hydrogen atom, n is equal to 0, W and W$^1$ are both oxygen, Y represents the group Y$^1$ wherein $R_a$ and $R_b$, different from each other, have the meaning of hydrogen and methyl, R$^1$ represents a methyl group, R$^2$ is a T group wherein R$^4$ is a hydrogen atom, R$^3$ and R$^5$ both represent a 4-fluorophenyl group, then R$^6$ is different from hydrogen or is different from a CH$_2$OCOR$^7$ group wherein R$^7$ is a methyl.

2. The compound according to claim 1, wherein
M represents an O—R$^7$ group;
Y represents a Y$^1$ group wherein $R_a$ is H and $R_b$ is (S)—CH$_3$;
$R_d$ represents a hydrogen atom;
W represents an oxygen atom.

3. The compound compounds according to claim 1, wherein Y has the meaning of Y$^1$ and $R_d$, $R_c$, M, R$_1$, R$_2$, W, n, $R_a$ and $R_b$ have the meanings indicated hereunder:

| Comp. | 0 | $R_d$ | $R_c$ | W | M | $R_a$ | $R_b$ | R$^1$ | R$^2$ |
|---|---|---|---|---|---|---|---|---|---|
| 8 | 0 | — | NHCHO | O | OCOOEt | (S)-CH$_3$ | H | 3,3,5,5-tetramethyl-cyclohexyl |
| 9 | 0 | — | NHCHO | O | OCOOMe | (S)-CH$_3$ | H | 3,3,5,5-tetramethyl-cyclohexyl |
| 10 | 0 | — | NHCHO | O | OCOOEt | (S)-CH$_3$ | H | 3-ethyl-3,5,5-trimethyl cyclohexyl |
| 11 | 0 | — | NHCHO | O | OCOOMe | (S)-CH$_3$ | H | 3-ethyl-3,5,5-trimethyl cyclohexyl |
| 13 | 0 | — | NHCHO | O | OCOOi-Bu | CF$_3$ | H | 3-ethyl-3,5,5-trimethyl cyclohexyl |
| 14 | 0 | — | NHCHO | O | OCOOi-Bu | 4-OCH$_3$-phenyl | H | 3,3,5,5-tetramethyl-cyclohexyl |

-continued

| Comp. | 0 | $R_d$ | $R_c$ | W | M | $R_a$ | $R_b$ | R¹ | R² |
|---|---|---|---|---|---|---|---|---|---|
| 15 | 0 | — | NHCHO | O | OCOOMe | 4-OCH₃-phenyl | H | 3,3,5,5-tetramethyl-cyclohexyl |
| 16 | 0 | — | NHCHO | O | OCOCH₃ | 4-OCH₃-phenyl | H | 3-ethyl-3,5,5-trimethyl-cyclohexyl |
| 19 | 0 | — | NHCHO | O | OCOCH₃ | 4-Cl-phenyl | H | 3-ethyl-3,5,5-trimethyl cyclohexyl |
| 20 | 0 | — | NHCHO | O | OCOCH₃ | CH₃ | CH₃ | 3,3,5,5-tetramethyl-cyclohexyl |
| 21 | 0 | — | NHCHO | O | OCOCH₃ | CH₃ | CH₃ | 3-ethyl-3,5,5-trimethyl cyclohexyl |
| 23 | 0 | — | NHCHO | O | OCH₂OCOCH₃ | (S)-CH₃ | H | 3-ethyl-3,5,5-trimethyl cyclohexyl |
| 24 | 0 | — | NHCHO | O | OCH₂OCOi-Pr | (S)-CH₃ | H | 3-ethyl-3,5,5-trimethyl cyclohexyl |
| 26 | 0 | — | NHCHO | O | OCH₂OCOCH₃ | (S)-CH₃ | H | 3,3,5,5-tetramethyl-cyclohexyl |
| 27 | 0 | — | NHCHO | O | OCH₂OCOi-Pr | (S)-CH₃ | H | 3,3,5,5-tetramethyl-cyclohexyl |
| 28 | 0 | — | NHCHO | O | OCH₂OCOCH₃ | CH₃ | CH₃ | 3,3,5,5-tetramethyl-cyclohexyl |
| 29 | 0 | — | NHCHO | O | OCH₂OCOCH₃ | CH₃ | CH₃ | 3-ethyl-3,5,5-trimethyl cyclohexyl |
| 32 | 0 | — | NHCHO | O | OCH₂OCOi-Pr | (S)-CH₃ | H | CH₃ | 1-hexyl |
| 40 | 0 | — | NHCHO | O | OCH₂OCOi-Pr | (S)-CH₃ | H | CH₃ | 3-dimethyl-2-dimethyl-1-propyl |
| 42 | 0 | — | NHCHO | O | OCH₂OCOi-Pr | (S)-CH₃ | H |  | isomenthyl |
| 45 | 0 | — | NHCHO | O | OCOOEt | (S)-CH₃ | H | CH₃ | 1-heptyl |
| 47 | 0 | — | NHCHO | O | OCOCH₃ | (S)-CH₃ | H | CH₃ | 1-heptyl |
| 48 | 0 | — | NHCHO | O | OCOCH₃ | CH₃ | CH₃ | CH₃ | 1-heptyl |
| 49 | 0 | — | NHCHO | O | OCOCH₃ | (S)-CH₃ | H | CH₃ | 1-heptyl |
| 50 | 0 | — | NHCHO | O | OCOCH₃ | 4-OCH₃-phenyl | H | CH₃ | 1-heptyl |
| 51 | 0 | — | NHCHO | O | OCH₂OCOi-Pr | (S)-CH₃ | H | CH₃ | 1-heptyl |
| 54 | 0 | — | NHCHO | S | OCOCH₃ | (S)-CH₃ | H | cyclohexyl | cyclohexyl |
| 55 | 0 | — | NHCHO | O | OCOCH₃ | (S)-CH₃ | H | cyclohexyl | cyclohexyl |
| 57 | 0 | — | NHCHO | S | OCH₂OCOi-Pr | (S)-CH₃ | H | cyclohexyl | cyclohexyl |
| 59 | 0 | — | NHCHO | S | OCOCH₃ | CH₃ | CH₃ | cyclohexyl | cyclohexyl |
| 60 | 0 | — | NHCHO | O | OCOCH₃ | CH₃ | CH₃ | cyclohexyl | cyclohexyl |
| 61 | 0 | — | NHCHO | S | OCOCH₃ | H | H | cyclohexyl | phenyl |
| 62 | 0 | — | NHCHO | O | OCOCH₃ | H | H | cyclohexyl | phenyl |
| 65 | 0 | — | NHCHO | O | SH | CH₃ | CH₃ | cyclohexyl | phenyl |
| 67 | 0 | — | NHCHO | S | SH | H | H | cyclohexyl | benzyl |
| 70 | 0 | — | NHCHO | S | SH | (S)-CH₃ | H | cyclohexyl | benzyl |
| 76 | 1 | 5-Me | NHCHO | O | OCOCH₃ | H | H | CH₃ | 2,4-dichlorophenyl |
| 77 | 1 | 5-Me | NHCHO | O | OCOCH₃ | (S)-CH₃ | H | CH₃ | 2,4-dichlorophenyl |
| 78 | 1 | 5-Me | NHCHO | O | OCH₂OCOi-Pr | (S)-CH₃ | H | CH₃ | 2,4-dichlorophenyl |
| 81 | 1 | 5-t-butyl | NHCHO | O | OCH₂OCOi-Pr | H | H | CH₃ | 3,5-ditrifluoromethylphenyl |
| 82 | 1 | 5-t-butyl | NHCHO | O | OCOCH₃ | H | H | CH₃ | 3,5-ditrifluoromethylphenyl |
| 83 | 1 | 5-t-butyl | NHCHO | O | OH | (S)-CH₃ | H | CH₃ | 3,5-ditrifluoromethylphenyl |
| 84 | 1 | 5-t-butyl | NHCHO | O | OCH₂OCOi-Pr | (S)-CH₃ | H | CH₃ | 3,5-ditrifluoromethylphenyl |
| 85 | 1 | 5-t-butyl | NHCHO | O | OCOCH₃ | (S)-CH₃ | H | CH₃ | 3,5-ditrifluoromethylphenyl |
| 87 | 1 | 5-t-butyl | NHCHO | O | OCOCH₃ | (S)-CH₃ | H | H | 1-octyl |
| 88 | 1 | 5-t-butyl | NHCHO | O | OCH₂OCOi-Pr | (S)-CH₃ | H | H | 1-octyl |
| 89 | 1 | 5-t-butyl | NHCHO | O | OCOCH₃ | H | H | 3-trifluoromethyl-phenyl | 3-trifluoromethyl-phenyl |
| 90 | 1 | 5-t-butyl | NHCHO | O | OCOCH₃ | (S)-CH₃ | H | 3-trifluoro-methyl-phenyl | 3-trifluoromethyl-phenyl |
| 95 | 1 | 5-CH₃CO | NHCHO | O | OCOCH₃ | (S)-CH₃ | H | (S)-CH₃ | 1-heptyl |
| 97 | 1 | 5-CH₃CO | NHCHO | O | OCH₂OCOi-Pr | (S)-CH₃ | H | (S)-CH₃ | 1-heptyl |
| 98 | 1 | 5-CH₃CO | NHCHO | O | OCOCH₃ | (S)-CH₃ | H | CH₃ | 1-adamantyl |
| 99 | 1 | 5-CH₃CO | NHCHO | O | OCH₂OCOi-Pr | (S)-CH₃ | H | CH₃ | 1-adamantyl |
| 103 | 0 | — | NHCHO | O | OCH₂SCH₃ | (S)-CH₃ | H | CH₃ | 1-adamantyl |
| 109 | 0 | — | NHCHO | O | OCOOi-Bu | (S)-CH₃ | H | CH₃ | Dicyclohexylmethyl |
| 110 | 0 | — | NHCHO | O | OCOCH₃ | (S)-CH₃ | H | CH₃ | Dicyclohexylmethyl |
| 111 | 0 | — | NHCHO | O | OCH₂OCOi-Pr | (S)-CH₃ | H | CH₃ | Dicyclohexylmethyl |
| 113 | 0 | — | NHCHO | O | OCH₂OCOi-Pr | (S)-CH₃ | H | CH₃ | Dicyclohexylmethyl |
| 114 | 0 | — | NHCHO | O | OCOOEt | (S)-CH₃ | H | CH₃ | Dicyclohexylmethyl |
| 124 | 0 | — | NHCHO | O | OCOCH₃ | H | H | CH₃ | 1-cyclohexyl-2-methyl-1-propyl |
| 126 | 0 | — | NHCHO | O | OCOCH₃ | (S)-CH₃ | H | CH₃ | 1-cyclohexyl-2-methyl-1-propyl |
| 127 | 0 | — | NHCHO | O | OCH₂OCOi-Pr | (S)-CH₃ | H | CH₃ | 1-cyclohexyl-2-methyl-1-propyl |
| 131 | 0 | — | NHCHO | O | OCH₂OCOi-Pr | phenyl | H | CH₃ | 1-cyclohexyl-2-methyl-1-propyl |
| 134 | 0 | — | NHCHO | O | OCOCH₃ | H | H | CH₃ | 3,5-diethyl-4-heptyl |
| 135 | 0 | — | NHCHO | O | OCOCH₃ | (S)-CH₃ | H | CH₃ | 3,5-diethyl-4-heptyl |
| 136 | 0 | — | NHCHO | O | OCH₂OCOi-Pr | (S)-CH₃ | H | CH₃ | 3,5-diethyl-4-heptyl |

-continued

| Comp. | 0 | $R_d$ | $R_c$ | W | M | $R_a$ | $R_b$ | $R^1$ | $R^2$ |
|---|---|---|---|---|---|---|---|---|---|
| 140 | 1 | 5-Cl | NHCHO | O | OCOCH$_3$ | CH$_3$ | CH$_3$ | CH$_3$ | 3,5-diethyl-4-heptyl |
| 142 | 1 | 5-Cl | NHCHO | O | OCOCH$_3$ | 4-CH$_3$-phenyl | H | CH$_3$ | 3,5-diethyl-4-heptyl |
| 145 | 0 | — | NHCHO | O | OCH$_2$SCH$_3$ | (S)-CH$_3$ | H | CH$_3$ | Dicyclohexylmethyl |
| 146 | 0 | — | NHCHO | O | OCH$_2$SCH$_3$ | (S)-CH$_3$ | H | CH$_3$ | 1-heptyl |
| 148 | 0 | — | NHCHO | O | OCH$_2$OCH$_3$ | (S)-CH$_3$ | H | CH$_3$ | 1-heptyl |
| 149 | 0 | — | NHCHO | O | OCH$_2$OCH$_3$ | (S)-CH$_3$ | H | CH$_3$ | Dicyclohexylmethyl |
| 152 | 0 | — | NHCHO | O | OCOCH$_3$ | (S)-CH$_3$ | H | H | diphenylmethyl |
| 153 | 0 | — | NHCHO | O | OCOCH$_3$ | H | H | H | diphenylmethyl |
| 154 | 0 | — | NHCHO | O | OCH$_2$SCH$_3$ | (S)-CH$_3$ | H | (S)-CH$_3$ | diphenylmethyl |
| 155 | 0 | — | NHCHO | O | OCOCH$_3$ | (S)-CH$_3$ | H | (S)-CH$_3$ | diphenylmethyl |
| 156 | 0 | — | NHCHO | O | OCH$_2$OCOi-Pr | (S)-CH$_3$ | H | (S)-CH$_3$ | Bis (4-Fluoro)-phenylmethyl |
| 157 | 0 | — | NHCHO | O | OCOCH$_3$ | CF$_3$ | H | H | diphenylmethyl |
| 158 | 0 | — | NHCHO | O | OCH$_2$OCOi-Pr | (S)-CH$_3$ | H | H | diphenylmethyl |
| 159 | 0 | — | NHCHO | O | OCH$_2$OCOi-Pr | CH$_3$ | CH$_3$ | H | diphenylmethyl |
| 160 | 0 | — | NHCHO | O | OCOOEt | (S)-CH$_3$ | H | (S)-CH$_3$ | Bis (4-Fluoro)-phenylmethyl |
| 161 | 0 | — | NHCHO | O | OCOCH$_3$ | (S)-CH$_3$ | H | H | Bis (4-Fluoro)-phenylmethyl |
| 162 | 0 | — | NHCHO | O | OCH$_2$OCOCH$_3$ | (S)-CH$_3$ | H | (S)-CH$_3$ | Bis (4-Fluoro)-phenylmethyl |
| 166 | 0 | — | NHCHO | O | OCH$_2$OCH$_3$ | (S)-CH$_3$ | H | (S)-CH$_3$ | Bis (4-Fluoro)-phenylmethyl |
| 168 | 0 | — | NHCHO | O | OCOCH$_3$ | H | H | (S)-CH$_3$ | Bis (4-Fluoro)-phenylmethyl |
| 169 | 0 | — | NHCHO | O | OCH$_2$OCOi-Pr | H | H | (S)-CH$_3$ | Bis (4-Fluoro)-phenylmethyl |
| 171 | 0 | — | NHCHO | O | OCOOi-Bu | (S)-CH$_3$ | H | (S)-CH$_3$ | Bis (4-Fluoro)-phenylmethyl |
| 174 | 0 | — | NHCHO | O | OCOCH$_3$ | CF$_3$ | H | (S)-CH$_3$ | Bis (4-Fluoro)-phenylmethyl |
| 175 | 0 | — | NHCHO | O | OCOCH$_3$ | 4-Cl-phenyl | H | (S)-CH$_3$ | Bis (4-Fluoro)-phenylmethyl |
| 176 | 0 | — | NHCHO | O | OCOCH$_3$ | H | H | (S)-CH$_3$ | Bis (2,4-difluoro)-phenylmethyl |
| 177 | 0 | — | NHCHO | O | OCH$_2$SCH$_3$ | (S)-CH$_3$ | H | (S)-CH$_3$ | Bis (2,4-difluoro)-phenylmethyl |
| 178 | 0 | — | NHCHO | O | OCH$_2$OCOi-Pr | (S)-CH$_3$ | H | (S)-CH$_3$ | Bis (2,4-difluoro)-phenylmethyl |
| 180 | 0 | — | NHCHO | O | OCOCH$_3$ | (S)-CH$_3$ | H | (S)-CH$_3$ | Bis (4-fluoro-2-methyl)-phenylmethyl |
| 181 | 0 | — | NHCHO | O | OCH$_2$OCOi-Pr | (S)-CH$_3$ | H | (S)-CH$_3$ | Bis (4-fluoro-2-methyl)-phenylmethyl |
| 183 | 0 | — | NHCHO | O | OCH$_2$OCOi-Pr | CF$_3$ | H | (S)-CH$_3$ | Bis (4-fluoro-2-methyl)-phenylmethyl |
| 184 | 0 | — | NHCHO | O | OCOCH$_3$ | 4-OCH$_3$-phenyl | H | (S)-CH$_3$ | Bis (4-fluoro-2-methyl)-phenylmethyl |
| 185 | 0 | — | NHCHO | O | OCOCH$_3$ | H | H | (S)-CH$_3$ | Dicyclohexylmethyl |
| 186 | 0 | — | NHCHO | O | OCH$_2$SCH$_3$ | (S)-CH$_3$ | H | (S)-CH$_3$ | Dicyclohexylmethyl |
| 187 | 0 | — | NHCHO | O | OCOCH$_3$ | phenyl | H | (S)-CH$_3$ | Dicyclohexylmethyl |
| 188 | 0 | — | NHCHO | O | OCOCH$_3$ | H | H | (S)-CH$_3$ | 1-(4-fluoro-2-methyl)-phenyl-2-methyl-1-propyl |
| 189 | 0 | — | NHCHO | O | OCH$_2$SCH$_3$ | (S)-CH$_3$ | H | (S)-CH$_3$ | 1-(4-fluoro-2-methyl)-phenyl-2-methyl-1-propyl |
| 190 | 0 | — | NHCHO | O | OCOCH$_3$ | 4-OCH$_3$-phenyl | H | (S)-CH$_3$ | 1-(4-fluoro-2-methyl)-phenyl-2-methyl-1-propyl |
| 191 | 0 | — | NHCHO | O | OCOCH$_3$ | H | H | (S)-CH$_3$ | 2-ethyl-1-phenyl-1-butyl |
| 192 | 0 | — | NHCHO | O | OCOCH$_3$ | (S)-CH$_3$ | H | (S)-CH$_3$ | 2-ethyl-1-phenyl-1-butyl |
| 193 | 0 | — | NHCHO | O | OCOCH$_3$ | CF$_3$ | H | (S)-CH$_3$ | 2-ethyl-1-phenyl-1-butyl |
| 194 | 0 | — | NHCHO | O | OCOCH$_3$ | 4-Cl-phenyl | H | (S)-CH$_3$ | 2-ethyl-1-phenyl-1-butyl |
| 196 | 0 | — | NHCHO | O | OCOCH$_3$ | (S)-CH$_3$ | H | (S)-CH$_3$ | (4-fluoro-2-methyl)-phenyl-cyclopentylmethyl |
| 197 | 0 | — | NHCHO | O | OCOCH$_3$ | 3-F-phenyl | H | (S)-CH$_3$ | (4-fluoro-2-methyl)-phenyl-cyclopentylmethyl |
| 198 | 0 | — | NHCHO | O | OCOCH$_3$ | H | H | (S)-CH$_3$ | 1-cyclohexyl-2-methyl-1-propyl |
| 199 | 0 | — | NHCHO | O | OCOCH$_3$ | (S)-CH$_3$ | H | (S)-CH$_3$ | 1-cyclohexyl-2-methyl-1-propyl |
| 200 | 0 | — | NHCHO | O | OCOCH$_3$ | CF$_3$ | H | (S)-CH$_3$ | 1-cyclohexyl-2-methyl-1-propyl |

-continued

| Comp. | 0 | R_d | R_c | W | M | R_a | R_b | R¹ | R² |
|---|---|---|---|---|---|---|---|---|---|
| 201 | 0 | — | NHCHO | O | OCOCH₃ | phenyl | H | (S)-CH₃ | 1-cyclohexyl-2-methyl-1-propyl |
| 202 | 0 | — | NHCHO | O | OCOCH₃ | 4-Cl-phenyl | H | (S)-CH₃ | 1-cyclohexyl-2-methyl-1-propyl |
| 203 | 0 | — | NHCHO | O | OCH₂OCOi-Pr | (S)-CH₃ | H | (S)-CH₃ | 1-cyclohexyl-2-methyl-1-propyl |
| 205 | 0 | — | NHCHO | O | OCOOEt | (S)-CH₃ | H | (S)-CH₃ | 1-cyclohexyl-2-methyl-1-propyl |
| 206 | 0 | — | NHCHO | O | OCOOi-Bu | (S)-CH₃ | H | (S)-CH₃ | 1-cyclohexyl-2-methyl-1-propyl |
| 207 | 0 | — | NHCHO | O | OCOCH₃ | H | H | (S)-CH₃ | 3,5-diethyl-4-heptyl |
| 208 | 0 | — | NHCHO | O | OCH₂SCH₃ | (S)-CH₃ | H | (S)-CH₃ | 3,5-diethyl-4-heptyl |
| 209 | 0 | — | NHCHO | O | OCOCH₃ | CF₃ | H | (S)-CH₃ | 3,5-diethyl-4-heptyl |
| 210 | 0 | — | NHCHO | O | OCOCH₃ | 4-CH₃-phenyl | H | (S)-CH₃ | 3,5-diethyl-4-heptyl |
| 211 | 0 | — | NHCHO | O | OCH₂OCOi-Pr | (S)-CH₃ | H | (S)-CH₃ | 3,5-diethyl-4-heptyl |
| 215 | 0 | — | NHCHO | O | OCOCH₃ | cyclopentylidene (*,*) | | (S)-CH₃ | diphenylmethyl |
| 216 | 0 | — | NHCHO | O | OCOCH₃ | cyclopropylidene (*,*) | | H | diphenylmethyl |
| 217 | | — | NHCHO | O | OCH₂SCH₃ | cyclopropylidene (*,*) | | (S)-CH₃ | Bis (4-Fluoro)-phenylmethyl |
| 218 | | — | NHCHO | O | OCOCH₃ | cyclopentylidene (*,*) | | (S)-CH₃ | Bis (4-Fluoro)-phenylmethyl |
| 219 | 0 | — | NHCHO | O | OCOCH₃ | (S)-CH₃ | H | CH₃ | 1-(1,3-benzothiazol-2-yl)-1-ethyl |
| 220 | 0 | — | NHCHO | O | OCH₂OCOi-Pr | (S)-CH₃ | H | CH₃ | 1-(1,3-benzothiazol-2-yl)-1-ethyl |
| 222 | 0 | — | NHCHO | O | OCH₂SCH₃ | (S)-CH₃ | H | CH₃ | 1-(5-chloro-2H-isoindol-2-yl)-1-ethyl |
| 223 | 0 | — | NHCHO | O | OCH₂OCOi-Pr | (S)-CH₃ | H | CH₃ | 1-(5-chloro-2H-isoindol-2-yl)-1-ethyl |
| 225 | 0 | — | NHCHO | O | OCOCH₃ | (S)-CH₃ | H | CH₃ | 1,2-diphenyl-1-cyclopropyl |
| 226 | 0 | — | NHCHO | O | OCH₂OCOi-Pr | (S)-CH₃ | H | CH₃ | 1,2-diphenyl-1-cyclopropyl |
| 228 | 0 | — | NHCHO | O | OCOCH₃ | (S)-CH₃ | H | CH₃ | 1-methyl-1-(4-fluoro)-phenyl)-1-ethyl |
| 229 | 0 | — | NHCHO | O | OCH₂OCOi-Pr | (S)-CH₃ | H | CH₃ | 1-methyl-1-(4-fluoro)-phenyl)-1-ethyl |
| 231 | 0 | — | NHCHO | O | OCH₂SCH₃ | (S)-CH₃ | H | CH₃ | 1-(4-chloro)-phenyl-1-cyclopentyl |
| 232 | 0 | — | NHCHO | O | OCH₂OCOi-Pr | (S)-CH₃ | H | CH₃ | 1-(4-chloro)-phenyl-1-cyclopentyl |
| 234 | 0 | — | NHCHO | O | OCOCH₃ | (S)-CH₃ | H | (S)-CH₃ | butoxycarbonyl |
| 235 | 0 | — | NHCHO | O | OCH₂OCOi-Pr | (S)-CH₃ | H | (S)-CH₃ | butoxycarbonyl |
| 237 | 0 | — | NHCHO | O | OCOCH₃ | (S)-CH₃ | H | (S)-CH₃ | 2-ethyl-hexyloxycarbonyl |
| 238 | 0 | — | NHCHO | O | OCH₂OCOi-Pr | (S)-CH₃ | H | (S)-CH₃ | butoxycarbonyl |
| 240 | 0 | — | NHCHO | O | OCOCH₃ | (S)-CH₃ | H | (S)-CH₃ | butoxycarbonyl |
| 241 | 0 | — | NHCHO | O | OCOCH₃ | (S)-CH₃ | H | (S)-CH₃ | (S)-1-[bis-(4-fluoro)-phenyl)]-2-propoxycarbonyl |
| 242 | 0 | — | NHCHO | O | OCH₂OCOi-Pr | (S)-CH₃ | H | (S)-CH₃ | (S)-1-[bis-(4-fluoro)-phenyl)]-2-propoxycarbonyl |
| 244 | 0 | — | NHCHO | O | OCH₂SCH₃ | (S)-CH₃ | H | (S)-CH₃ | Bis (4-Fluoro)-phenylmethyl |
| 245 | 0 | — | NHCHO | O | OCH₂SCH₃ | (S)-CH₃ | H | CH₃ | hexadecyloxycarbonyl |
| 246 | 0 | — | NHCHO | O | OCH₂SCH₃ | (S)-CH₃ | H | (S)CH₃ | 1-(ethoxycarbonyl)-2-methyl)-1-propyl |
| 250 | 0 | — | NHCHO | O | OCOCH₃ | (S)-CH₃ | H | (S)-CH₃ | 1-heptyl |
| 252 | 0 | — | NHCHO | O | OCOCH₃ | (S)-CH₃ | H | (R)-CH₃ | 1-heptyl |

-continued

| Comp. | 0 | $R_d$ | $R_c$ | W | M | $R_a$ | $R_b$ | $R^1$ | $R^2$ |
|---|---|---|---|---|---|---|---|---|---|
| 254 | 0 | — | NHCHO | O | OCOOi-Bu | (S)-CH$_3$ | H | (S)-CH$_3$ | butoxycarbonyl |
| 255 | 0 | — | NHCHO | O | OCOOi-Bu | (S)-CH$_3$ | H | (S)-CH$_3$ | 2-ethylhexyloxycarbonyl |
| 266 | 0 | — | NHCHO | O | OCOCH$_3$ | (S)-CH$_3$ | H | (S)-CH$_3$ | benzyloxycarbonyl |
| 267 | 0 | — | NHCHO | O | OCOCH(CH$_3$)$_2$ | (S)-CH$_3$ | H | (S)-CH$_3$ | Bis (4-Fluoro)-phenylmethyl |
| 274 | 0 | — | NHCHO | O | OCOCH$_3$ | (S)-CH | H | CH$_3$ | (1R,2R,5S)-5-methyl-2-(propan-2-yl)-cyclohexyloxycarbonyl |
| 276 | 0 | — | NHCHO | O | OCOCH$_3$ | (S)-CH$_3$ | H | (S)-phenyl | benzyloxycarbonyl |
| 279 | 0 | — | NHCHO | O | OCOCH(CH$_3$)$_2$ | (S)-CH | H | (S)-CH$_3$ | 2-(4-fluoro)-phenyl-1-(isobutoxycarbonyl)-1-ethyl |
| 280 | 0 | — | NHCHO | O | OCH$_2$OCOi-Pr | (S)-CH$_3$ | H | (S)-CH$_3$ | Bis (2-fluoro-4-methyl)-phenylmethyl |
| 282 | 0 | — | NHCHO | O | OCH$_2$OCOi-Pr | (S)-CH$_3$ | H | (S)-CH$_3$ | Bis (thiomethyl)-phenylmethyl. |

4. The compound according to claim 3, wherein said compound having formula (I) is selected from compounds 30-32, 40, 45, 47-49, 51, 54-55, 57, 70, 77, 78, 84, 85, 87-88, 90, 95, 97-99, 103, 109-111, 113-114, 126, 127, 135, 136, 145, 146, 148, 149, 152, 154-156, 158, 161-162, 166, 171, 177, 178, 180, 181, 186, 189, 192, 196, 199, 203, 205-206, 208, 211.

5. The compound compounds according to claim 1, wherein Y has the meaning of Y$^2$ and $R_d$, $R_c$, M, $R_1$, $R_2$, W, n, $R_a$ and $R_b$ have the meanings indicated hereunder:

| Comp. | n | $R_a$ | $R_c$ | W | M | $R_e$ | $R_f$ | $R^1$ | $R^2$ |
|---|---|---|---|---|---|---|---|---|---|
| 284 | 0 | — | NHCHO | O | OCOCH$_3$ | H | H | CH$_3$ | 1-heptyl |
| 285 | 0 | — | NHCHO | O | OCOCH$_3$ | CH$_3$ | CH$_3$ | CH$_3$ | 1-heptyl |
| 286 | 0 | — | NHCHO | S | OCOCH$_3$ | CH$_3$ | CH$_3$ | CH$_3$ | 1-heptyl |
| 287 | 0 | — | NHCHO | O | OCOCH$_3$ | CH$_3$ | CH$_3$ | cyclohexyl | cyclohexyl |
| 288 | 0 | — | NH$_2$ | O | OH | H | H | cyclohexyl | cyclohexyl |
| 289 | 0 | — | NH$_2$ | S | OCOCH$_3$ | CH$_3$ | CH$_3$ | cyclohexyl | cyclohexyl |
| 290 | 0 | — | NHCHO | S | OCOCH$_3$ | CH$_3$ | CH$_3$ | cyclohexyl | cyclohexyl |
| 291 | 0 | — | NHCHO | S | OCOCH$_3$ | H | H | cyclohexyl | phenyl |
| 292 | 0 | — | NH$_2$ | O | SH | H | H | cyclohexyl | phenyl |
| 293 | 0 | — | NHCHO | O | SH | H | H | cyclohexyl | phenyl |
| 294 | 0 | — | NHCHO | O | SH | CH$_3$ | CH$_3$ | cyclohexyl | phenyl |
| 295 | 1 | 5-Me | NH$_2$ | O | OH | H | H | H | 3-cyclohexen-1-yl |
| 296 | 1 | 5-Me | NHCHO | O | OH | H | H | H | 3-cyclohexen-1-yl |
| 297 | 1 | 5-Me | NH$_2$ | O | OCOCH$_3$ | H | H | CH$_3$ | 2,4-dichlorophenyl |
| 298 | 1 | 5-Me | NHCHO | O | OCOCH$_3$ | H | H | CH$_3$ | 2,4-dichlorophenyl |
| 299 | 1 | 5-Me | NHCHO | O | OCOCH$_3$ | CH$_3$ | CH$_3$ | CH$_3$ | 2,4-dichlorophenyl |
| 300 | 1 | 5-t-butyl | NHCHO | O | OCOCH$_3$ | H | H | CH$_3$ | 3,5-ditrifluoromethylphenyl |
| 301 | 1 | 5-t-butyl | NHCHO | O | OH | H | H | CH$_3$ | 3,5-ditrifluoromethylphenyl |
| 302 | 1 | 5-t-butyl | NHCHO | O | OCH$_2$OCOi-Pr | CH$_3$ | CH$_3$ | CH$_3$ | 3,5-ditrifluoro-methylphenyl |
| 303 | 1 | 5-t-butyl | NH$_2$ | O | OCOCH$_3$ | H | H | H | 1-octyl |
| 304 | 1 | 5-t-butyl | NHCHO | O | OCOCH$_3$ | H | H | H | 1-octyl |
| 305 | 0 | — | NO$_2$ | O | OH | H | H | H | 1-adamantyl |
| 306 | 0 | — | NH$_2$ | O | OH | H | H | H | 1-adamantyl |
| 307 | 0 | — | NHCHO | O | OH | CH$_3$ | CH$_3$ | H | 1-adamantyl |
| 308 | 0 | — | NH$_2$ | O | OCOOi-Bu | H | H | CH$_3$ | Dicyclohexylmethyl |
| 309 | 0 | — | NHCHO | O | OCOOi-Bu | H | H | CH$_3$ | Dicyclohexylmethyl |
| 310 | 0 | — | NHCHO | O | OH | H | H | CH$_3$ | Dicyclohexylmethyl |
| 311 | 0 | — | NHCHO | O | OCOCH$_3$ | CH$_3$ | CH$_3$ | CH$_3$ | Dicyclohexylmethyl |
| 312 | 0 | — | NHCHO | O | OH | CH$_3$ | CH$_3$ | CH$_3$ | Dicyclohexylmethyl |
| 313 | 0 | — | NHCHO | O | OCOOEt | CH$_3$ | H | CH$_3$ | Dicyclohexylmethyl |
| 314 | 0 | — | NHCHO | O | OH | CH$_3$ | H | CH$_3$ | Dicyclohexylmethyl |
| 315 | 0 | — | NHCHO | O | OCOCH$_3$ | H | H | CH$_3$ | 1-cyclohexyl-2-methyl-1-propyl |
| 316 | 0 | — | NHCHO | O | OH | H | H | CH$_3$ | 1-cyclohexyl-2-methyl-1-propyl |
| 317 | 0 | — | NHCHO | O | OCOCH$_3$ | CH$_3$ | CH$_3$ | CH$_3$ | 1-cyclohexyl-2-methyl-1-propyl |
| 318 | 0 | — | NHCHO | O | OH | CH$_3$ | CH$_3$ | CH$_3$ | 1-cyclohexyl-2-methyl-1-propyl |
| 319 | 0 | — | NHCHO | O | F | H | H | CH$_3$ | 3,5-diethyl-4-heptyl |
| 320 | 0 | — | NHCHO | O | OCOCH$_3$ | H | H | CH$_3$ | 3,5-diethyl-4-heptyl |
| 321 | 0 | — | NHCHO | O | OH | H | H | CH$_3$ | 3,5-diethyl-4-heptyl |
| 322 | 0 | — | NHCHO | O | OCOCH$_3$ | CH$_3$ | CH$_3$ | CH$_3$ | 3,5-diethyl-4-heptyl |
| 323 | 0 | — | NHCHO | O | OH | CH$_3$ | CH$_3$ | CH$_3$ | 3,5-diethyl-4-heptyl |
| 324 | 0 | — | NHCHO | O | OCOCH$_3$ | H | H | H | diphenylmethyl |
| 325 | 0 | — | NHCHO | O | OH | H | H | H | diphenylmethyl |
| 326 | 0 | — | NHCHO | O | OCH$_2$SCH$_3$ | CH$_3$ | CH$_3$ | (S)—CH$_3$ | diphenylmethyl |

-continued

| Comp. | n | $R_a$ | $R_c$ | W | M | $R_e$ | $R_f$ | $R^1$ | $R^2$ |
|---|---|---|---|---|---|---|---|---|---|
| 327 | 0 | — | NHCHO | O | OH | $CH_3$ | $CH_3$ | (S)—$CH_3$ | diphenylmethyl |
| 328 | 0 | — | NHCHO | O | $OCH_2SCH_3$ | $CH_3$ | $CH_3$ | (S)—$CH_3$ | Bis (4-Fluoro)-phenylmethyl |
| 329 | 0 | — | NHCHO | O | OH | $CH_3$ | $CH_3$ | (S)—$CH_3$ | Bis (4-Fluoro)-phenylmethyl |
| 330 | 0 | — | NHCHO | O | $OCH_2OCOi$-Pr | H | H | (S)—$CH_3$ | Bis (4-Fluoro)-phenylmethyl |
| 331 | 0 | — | NHCHO | O | OH | H | H | (S)—$CH_3$ | Bis (4-Fluoro)-phenylmethyl |
| 332 | 0 | — | NHCHO | O | OCOOEt | $CH_3$ | $CH_3$ | (S)—$CH_3$ | Bis (4-Fluoro)-phenylmethyl |
| 333 | 0 | — | NHCHO | O | $OCOCH_3$ | $CH_3$ | H | H | Bis (4-Fluoro)-phenylmethyl |
| 334 | 0 | — | NHCHO | O | OH | $CH_3$ | H | H | Bis (4-Fluoro)-phenylmethyl |
| 335 | 1 | 5-$CH_3CO$ | $NHCOCH_3$ | O | $OCH_2SCH_3$ | $CH_3$ | $CH_3$ | (S)—$CH_3$ | Bis (4-Fluoro)-phenylmethyl |
| 336 | 1 | 5-$CH_3CO$ | $NHCOCH_3$ | O | OH | $CH_3$ | $CH_3$ | (S)—$CH_3$ | Bis (4-Fluoro)-phenylmethyl |
| 337 | 0 | — | NHCHO | O | $OCOCH_3$ | $CF_3$ | $CF_3$ | (S)—$CH_3$ | Bis (4-Fluoro)-phenylmethyl |
| 338 | 0 | — | NHCHO | O | OH | $CF_3$ | $CF_3$ | (S)—$CH_3$ | Bis (4-Fluoro)-phenylmethyl |
| 339 | 1 | 5-Cl | NHCHO | O | $OCOCH_3$ | H | H | (S)—$CH_3$ | Bis (4-Fluoro)-phenylmethyl |
| 340 | 1 | 5-Cl | NHCHO | O | OH | H | H | (S)—$CH_3$ | Bis (4-Fluoro)-phenylmethyl |
| 341 | 0 | — | NHCHO | O | $OCOCH_3$ | H | H | (S)—$CH_3$ | Bis (2,4-difluoro)-phenylmethyl |
| 342 | 0 | — | NHCHO | O | OH | H | H | (S)—$CH_3$ | Bis (2,4-difluoro)-phenylmethyl |
| 343 | 0 | — | NHCHO | O | $OCOCH_3$ | $CH_3$ | $CH_3$ | (S)—$CH_3$ | Bis (2,4-difluoro)-phenylmethyl |
| 344 | 0 | — | NHCHO | O | OH | $CH_3$ | $CH_3$ | (S)—$CH_3$ | Bis (2,4-difluoro)-phenylmethyl |
| 345 | 0 | — | NHCHO | O | $OCH_2OCOi$-Pr | $CF_3$ | H | (S)—$CH_3$ | Bis (4-fluoro-2-methyl)-phenylmethyl |
| 346 | 0 | — | NHCHO | O | OH | $CF_3$ | H | (S)—$CH_3$ | Bis (4-fluoro-2-methyl)-phenylmethyl |
| 347 | 0 | — | NHCHO | O | $OCOCH_3$ | H | H | (S)—$CH_3$ | Dicyclohexylmethyl |
| 348 | 0 | — | NHCHO | O | OH | H | H | (S)—$CH_3$ | Dicyclohexylmethyl |
| 349 | 0 | — | NHCHO | O | $OCOCH_3$ | $CH_3$ | $CH_3$ | (S)—$CH_3$ | Dicyclohexylmethyl |
| 350 | 0 | — | NHCHO | O | OH | $CH_3$ | $CH_3$ | (S)—$CH_3$ | Dicyclohexylmethyl |
| 351 | 0 | — | NHCHO | O | $OCOCH_3$ | H | H | (S)—$CH_3$ | 1-(4-fluoro-2-methyl)-phenyl-2-methyl-1-propyl |
| 352 | 0 | — | NHCHO | O | OH | H | H | (S)—$CH_3$ | 1-(4-fluoro-2-methyl)-phenyl-2-methyl-1-propyl |
| 353 | 0 | — | NHCHO | O | $OCOCH_3$ | $CH_3$ | $CH_3$ | (S)—$CH_3$ | 1-(4-fluoro-2-methyl)-phenyl-2-methyl-1-propyl |
| 354 | 0 | — | NHCHO | O | OH | $CH_3$ | $CH_3$ | (S)—$CH_3$ | 1-(4-fluoro-2-methyl)-phenyl-2-methyl-1-propyl |
| 355 | 0 | — | NHCHO | O | $OCOCH_3$ | H | H | (S)—$CH_3$ | 2-ethyl-1-phenyl-1-butyl |
| 356 | 0 | — | NHCHO | O | OH | H | H | (S)—$CH_3$ | 2-ethyl-1-phenyl-1-butyl |
| 357 | 0 | — | NHCHO | O | $OCH_2SCH_3$ | $CH_3$ | $CH_3$ | (S)—$CH_3$ | 2-ethyl-1-phenyl-1-butyl |
| 358 | 0 | — | NHCHO | O | OH | $CH_3$ | $CH_3$ | (S)—$CH_3$ | 2-ethyl-1-phenyl-1-butyl |
| 359 | 0 | — | NHCHO | O | $OCOCH_3$ | H | H | (S)—$CH_3$ | (4-fluoro-2-methyl)-phenyl-cyclopentylmethyl |
| 360 | 0 | — | NHCHO | O | OH | H | H | (S)—$CH_3$ | (4-fluoro-2-methyl)-phenyl-cyclopentylmethyl |
| 361 | 0 | — | NHCHO | O | $OCOCH_3$ | $CH_3$ | $CH_3$ | (S)—$CH_3$ | (4-fluoro-2-methyl)-phenyl-cyclopentylmethyl |
| 362 | 0 | — | NHCHO | O | OH | $CH_3$ | $CH_3$ | (S)—$CH_3$ | (4-fluoro-2-methyl)-phenyl-cyclopentylmethyl |
| 363 | 0 | — | NHCHO | O | $OCOCH_3$ | H | H | (S)—$CH_3$ | 1-cyclohexyl-2-methyl-1-propyl |
| 364 | 0 | — | NHCHO | O | OH | H | H | (S)—$CH_3$ | 1-cyclohexyl-2-methyl-1-propyl |
| 365 | 0 | — | NHCHO | O | $OCOCH_3$ | $CH_3$ | $CH_3$ | (S)—$CH_3$ | 1-cyclohexyl-2-methyl-1-propyl |
| 366 | 0 | — | NHCHO | O | OH | $CH_3$ | $CH_3$ | (S)—$CH_3$ | 1-cyclohexyl-2-methyl-1-propyl |
| 367 | 0 | — | NHCHO | O | $OCOCH_3$ | $CF_3$ | H | (S)—$CH_3$ | 1-cyclohexyl-2-methyl-1-propyl |
| 368 | 0 | — | NHCHO | O | OH | $CF_3$ | H | (S)—$CH_3$ | 1-cyclohexyl-2-methyl-1-propyl |
| 369 | 0 | — | NHCHO | O | $OCOCH_3$ | H | H | (S)—$CH_3$ | 3,5-diethyl-4-heptyl |
| 370 | 0 | — | NHCHO | O | OH | H | H | (S)—$CH_3$ | 3,5-diethyl-4-heptyl |
| 371 | 0 | — | NHCHO | O | $OCOCH_3$ | $CH_3$ | $CH_3$ | (S)—$CH_3$ | 3,5-diethyl-4-heptyl |
| 372 | 0 | — | NHCHO | O | OH | $CH_3$ | $CH_3$ | (S)—$CH_3$ | 3,5-diethyl-4-heptyl |
| 373 | 0 | — | NHCHO | O | $OCOCH_3$ | $CF_3$ | H | (S)—$CH_3$ | 3,5-diethyl-4-heptyl |
| 374 | 0 | — | NHCHO | O | OH | $CF_3$ | H | (S)—$CH_3$ | 3,5-diethyl-4-heptyl |
| 375 | 0 | — | NHCHO | O | $OCOCH_3$ | H | H | $CH_3$ | 1-(1,3-benzothiazole -2-yl)-1-ethyl |
| 376 | 0 | — | NHCHO | O | $OCH_2OCOi$-Pr | $CH_3$ | $CH_3$ | $CH_3$ | 1-(1,3-benzothiazole -2-yl)-1-ethyl |
| 377 | 0 | — | NHCHO | O | OH | H | H | $CH_3$ | 1-(1,3-benzothiazole -2-yl)-1-ethyl |
| 378 | 0 | — | NHCHO | O | $OCOCH_3$ | H | H | $CH_3$ | 1-(5-chloro-2H-isoindol-2-yl)-1-ethyl |
| 379 | 0 | — | NHCHO | O | $OCOCH_3$ | $CH_3$ | $CH_3$ | $CH_3$ | 1-(5-chloro-2H-isoindol-2-yl)-1-ethyl |
| 380 | 0 | — | NHCHO | O | OH | $CH_3$ | $CH_3$ | $CH_3$ | 1-(5-chloro-2H-isoindol-2-yl)-1-ethyl |
| 381 | 0 | — | NHCHO | O | $OCOCH_3$ | H | H | $CH_3$ | 1,2-diphenyl-1-cyclopropyl |
| 382 | 0 | — | NHCHO | O | OH | H | H | $CH_3$ | 1,2-diphenyl-1-cyclopropyl |
| 383 | 0 | — | NHCHO | O | $OCOCH_3$ | $CH_3$ | $CH_3$ | $CH_3$ | 1,2-diphenyl-1-cyclopropyl |
| 384 | 0 | — | NHCHO | O | OH | $CH_3$ | $CH_3$ | $CH_3$ | 1,2-diphenyl-1-cyclopropyl |
| 385 | 0 | — | NHCHO | O | $OCOCH_3$ | H | H | $CH_3$ | 1-methyl-1-(4-fluoro)-phenyl-1-ethyl |

| Comp. | n | $R_a$ | $R_c$ | W | M | $R_e$ | $R_f$ | $R^1$ | $R^2$ |
|---|---|---|---|---|---|---|---|---|---|
| 386 | 0 | — | | NHCHO | O | OH | H | H | $CH_3$ | 1-methyl-1-(4-fluoro)-phenyl-1-ethyl |
| 387 | 0 | — | | NHCHO | O | $OCOCH_3$ | $CH_3$ | $CH_3$ | $CH_3$ | 1-methyl-1-(4-fluoro)-phenyl-1-ethyl |
| 388 | 0 | — | | NHCHO | O | OH | $CH_3$ | $CH_3$ | $CH_3$ | 1-methyl-1-(4-fluoro)-phenyl-1-ethyl |
| 389 | 0 | — | | NHCHO | O | $OCOCH_3$ | H | H | $CH_3$ | 1-(4-chloro)-phenyl-1-cyclopentyl |
| 390 | 0 | — | | NHCHO | O | OH | H | H | $CH_3$ | 1-(4-chloro)-phenyl-1-cyclopentyl |
| 391 | C | — | | NHCHO | O | $OCOCH_3$ | $CH_3$ | $CH_3$ | $CH_3$ | 1-(4-chloro)-phenyl-1-cyclopentyl |
| 392 | 0 | — | | NHCHO | O | OH | $CH_3$ | $CH_3$ | $CH_3$ | 1-(4-chloro)-phenyl-1-cyclopentyl |
| 393 | 0 | — | | NHCHO | O | $OCOCH_3$ | H | H | (S)—$CH_3$ | butoxycarbonyl |
| 394 | 0 | — | | NHCHO | O | OH | H | H | (S)—$CH_3$ | butoxycarbonyl |
| 395 | 0 | — | | NHCHO | O | OH | $CH_3$ | $CH_3$ | (S)—$CH_3$ | butoxycarbonyl |
| 396 | 0 | — | | NHCHO | O | $OCOCH_3$ | $CH_3$ | $CH_3$ | (S)—$CH_3$ | butoxycarbonyl |
| 397 | 0 | — | | NHCHO | O | $OCOCH_3$ | $CH_3$ | $CH_3$ | (S)—$CH_3$ | 2-ethyl-hexyloxycarbonyl |
| 398 | 0 | — | | NHCHO | O | OH | $CH_3$ | $CH_3$ | (S)—$CH_3$ | 2-ethyl-hexyloxycarbonyl |
| 399 | 0 | — | | NHCHO | O | $OCOCH_3$ | H | H | (S)—$CH_3$ | 2-ethyl-hexyloxycarbonyl |
| 400 | 0 | — | | NHCHO | O | OH | H | H | (S)—$CH_3$ | 2-ethyl-hexyloxycarbonyl |
| 401 | 0 | — | | NHCHO | O | $OCOCH_3$ | H | H | (S)—$CH_3$ | (S)-1-[bis-(4-fluoro)-phenyl)]-2-propoxycarbonyl |
| 402 | 0 | — | | NHCHO | O | OH | H | H | (S)—$CH_3$ | (S)-1-[bis-(4-fluoro)-phenyl)]-2-propoxycarbonyl |
| 403 | 0 | — | | NHCHO | O | OH | $CH_3$ | $CH_3$ | (S)—$CH_3$ | (S)-1-[bis-(4-fluoro)-phenyl)]-2-propoxycarbonyl |
| 404 | 0 | — | | NHCHO | O | $OCOCH_3$ | $CH_3$ | $CH_3$ | (S)—$CH_3$ | (S)-1-[bis-(4-fluoro)-phenyl)]-2-propoxycarbonyl |
| 405 | 0 | — | | NHCHO | O | OH | H | H | $CH_3$ | 2-phenyl-1-(isobutoxycarbonyl)-1-ethyl |
| 406 | 0 | — | | NHCHO | O | OH | $CH_3$ | $CH_3$ | $CH_3$ | 2-phenyl-1-(isobutoxycarbonyl)-1-ethyl |
| 407 | 0 | — | | NHCHO | O | OH | H | H | (S)—$CH_3$ | 2-(4-fluoro)-phenyl-1-(isobutoxycarbonyl)-1-ethyl |
| 408 | 0 | — | | NHCHO | O | OH | $CH_3$ | $CH_3$ | (S)—$CH_3$ | 2-(4-fluoro)-phenyl-1-(isobutoxycarbonyl)-1-ethyl. |

6. The compound according to claim 5, wherein said compound having formula (I) is selected from compounds 284, 285, 287, 296-304, 307, 308, 310-312, 315-318, 320-323, 326-332, 341, 342, 347-366, 369-372, 375-408.

7. A fungicidal composition comprising the compound of claim 1, a solvent and/or solid or liquid diluent, possibly a surfactant.

8. The fungicidal composition according to claim 7, comprising at least one compound having general formula (I) and at least another fungicide different from the compounds having formula (I).

9. The fungicidal composition according to claim 8, wherein one or more compounds having general formula (I) are combined with one or more fungicides belonging to the following classes:
  a) azoles selected from azaconazole, bitertanol, bromuconazole, cyproconazole, difenoconazole, epoxyconazole, fenbuconazole, fluquinconazole, flusilazole, flutriafol, hexaconazole, imazalil, ipconazole, metconazole, myclobutanil, penconazole, propiconazole, prochloraz, prothioconazole, simeconazole, tebuconazole, tetraconazole, triadimefon, triadimenol, triflumizole, triticonazole;
  b) ergosterol biosynthesis inhibitory amines selected from aldimorph, dodemorph, fenpropimorph, fenpropidin, spiroxamine, tridemorph;
  c) succinate-dehydrogenase inhibitors (SDHI) selected from benzovindiflupyr, bixafen, boscalid, carboxin, fluindapyr, fluopyram, flutolanil, fluxapyroxad, furametpyr, isopyrazam, oxycarboxin, penflufen, penthiopyrad, sedaxane, thifluzamide;
  d) strobilurins selected from azoxystrobin, dimoxystrobin, fluoxastrobin, kresoxim-methyl, metominostrobin, orysastrobin, picoxystrobin, pyraclostrobin, pyrametostrobin, pyraoxostrobin, trifloxystrobin;
  e) specific antioidic compounds selected from cyflufenamid, flutianil, metrafenone, proquinazid, pyriofenone, quinoxyfen;
  f) aniline-pyramidines selected from pyrimethanil, mepanipyrim, cyprodinil;
  g) benzimidazoles and analogues thereof selected from carbendazim, benomyl, thiabendazole, thiophanate-methyl;
  h) dicarboxyimides selected from iprodione, procymidone;
  i) phthalimides selected from captafol, captan, folpet;
  l) systemic acquired resistance (SAR) inducers selected from acibenzolar, probenazole, isotianil, tiadinil;
  m) phenylpyrroles selected from fenpiclonil, fludioxonil;
  n) acylalanines selected from benalaxyl, benalaxyl-M, furalaxyl, metalaxyl, metalaxyl-M;
  o) other specific antiperonosporic compounds selected from ametoctradin, amisulbrom, benthiavalicarb, cyazofamid, cymoxanil, dimethomorph, ethaboxam, famoxadone, fenamidone, flumetover, flumorph, fluopicolide, iprovalicarb, mandipropamid, oxathiapiproline, valifenalate, zoxamide:
  p) dithiocarbamates selected from maneb, mancozeb, propineb, zineb, metiram;
  q) phosphorous acid and its inorganic or organic salts, fosetyl-aluminium;

r) cupric compounds selected from Bordeaux mixture, carpropamid, copper hydroxide, copper oxychloride, copper sulfate, copper salicylate; and/or s) other fungicides selected from chlorothalonil, fenhexamid, fenpyrazamine, fluazinam, silthiofam, tebufloquin, zoxamide, dodine, guazatine, iminoctadine, tolclofos-methyl.

10. The fungicidal composition according to claim 7, wherein said composition being selected from:

C46: compound 156+tetraconazole;
C47: compound 156+tebuconazole;
C48: compound 156+epoxyconazole;
C49: compound 156+prothioconazole;
C50: compound 156+difenconazole;
C51: compound 156+penconazole;
C52: compound 156+prochloraz;
C53: compound 156+fenpropimorph;
C54: compound 156+spiroxamine;
C55: compound 156+bixafen;
C56: compound 156+boscalid;
C57: compound 156+carboxin;
C58: compound 156+fluopyram;
C59: compound 156+fluxapyroxad;
C60: compound 156+isopyrazam;
C61: compound 156+penthiopyrad;
C62: compound 156+sedaxane;
C63: compound 156+azoxystrobin;
C64: compound 156+dimoxystrobin;
C65: compound 156+fluoxastrobin;
C66: compound 156+kresoxim-methyl;
C67: compound 156+picoxystrobin;
C68: compound 156+pyraclostrobin;
C69: compound 156+trifloxystrobin;
C70: compound 156+metrafenone;
C71: compound 156+proquinazid;
C72: compound 156+mepanipyrim;
C73: compound 156+cyprodinil;
C74: compound 156+iprodione;
C75: compound 156+procymidone;
C76: compound 156+carbendazim;
C77: compound 156+thiophanate-methyl;
C78: compound 156+fluindapyr;
C79: compound 156+benalaxyl-M;
C80: compound 156+fenpyrazamine;
C81: compound 156+fluazinam;
C82: compound 156+tolclofos-methyl;
C83: compound 156+mandipropamid;
C84: compound 156+copper oxychloride;
C85: compound 156+copper salicylate;
C86: compound 156+chlorothalonil;
C87: compound 156+cimoxanil;
C88: compound 156+dimetomorph;
C89: compound 156+oxathiopiproline;
C90: compound 156+fluopicolide;
C91: compound 156+zoxamide;
C92: compound 156+ametoctradin;
C93: compound 156+metiram;
C94: compound 156+potassium phosphite.

11. A method of controlling phytopathogenic fungi in agricultural crops comprising applying the composition of claim 7.

12. A method for controlling phytopathogenic fungi in agricultural crops, comprising applying an effective and non-phytotoxic dose of the composition of claim 7 and, optionally, one or more known active ingredients compatible therewith.

13. A method for controlling phytopathogenic fungi of agricultural crops comprising applying the compound of claim 1.

14. A method for controlling phytopathogenic fungi in agricultural crops, comprising applying an effective and non-phytotoxic dose of the compound of claim 1 on any part of the crops to be protected or on the ground and, optionally, one or more known active ingredients compatible therewith.

* * * * *